(12) United States Patent
Alshina et al.

(10) Patent No.: US 10,404,982 B2
(45) Date of Patent: Sep. 3, 2019

(54) PER-SAMPLE PREDICTION ENCODING APPARATUS AND METHOD

(71) Applicant: SAMSUNG ELECTRONICS CO., LTD., Suwon-si (KR)

(72) Inventors: Elena Alshina, Suwon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 15/524,829

(22) PCT Filed: Nov. 4, 2015

(86) PCT No.: PCT/KR2015/011810
§ 371 (c)(1),
(2) Date: May 5, 2017

(87) PCT Pub. No.: WO2016/072753
PCT Pub. Date: May 12, 2016

(65) Prior Publication Data
US 2018/0309988 A1 Oct. 25, 2018

Related U.S. Application Data

(60) Provisional application No. 62/075,429, filed on Nov. 5, 2014.

(51) Int. Cl.
*H04N 19/119* (2014.01)
*H04N 19/102* (2014.01)
(Continued)

(52) U.S. Cl.
CPC ......... *H04N 19/119* (2014.11); *H04N 19/102* (2014.11); *H04N 19/124* (2014.11); *H04N 19/44* (2014.11); *H04N 19/61* (2014.11)

(58) Field of Classification Search
CPC .. H04N 19/119; H04N 19/102; H04N 19/124; H04N 19/44; H04N 19/61
(Continued)

(56) References Cited

U.S. PATENT DOCUMENTS 8,208,544 B2  6/2012  Song et al.
8,311,110 B2  11/2012  Alshina et al.
(Continued)

FOREIGN PATENT DOCUMENTS

CN  102007768 A  4/2011
CN  102047666 A  5/2011
(Continued)

OTHER PUBLICATIONS

Communication dated Jun. 7, 2017, issued by the European Patent Office in counterpart European Application No. 15857663.7.
(Continued)

*Primary Examiner* — Nguyen T Truong
(74) *Attorney, Agent, or Firm* — Sughrue Mion, PLLC

(57) ABSTRACT

A video decoding apparatus includes: a splitter configured to split an image into at least one block; a predictor configured to predict a current sample by using at least one of a value obtained by applying a first weight to a first sample predicted earlier than the current sample in a current block and being adjacent to the current sample in a horizontal direction and a value obtained by applying a first weight to a second sample predicted earlier than the current sample in the current block and being adjacent to the current sample in a vertical direction; and a decoder configured to decode the image by using a residual value of the current sample obtained from a bitstream and a prediction value of the current sample.

8 Claims, 41 Drawing Sheets

(51) Int. Cl.
*H04N 19/124* (2014.01)
*H04N 19/44* (2014.01)
*H04N 19/61* (2014.01)

(58) Field of Classification Search
USPC .................................................. 375/240.12
See application file for complete search history.

(56) References Cited

U.S. PATENT DOCUMENTS

| | | | |
|---|---|---|---|
| 8,406,708 | B2 | 3/2013 | Bai et al. |
| 8,976,862 | B2 | 3/2015 | Kim et al. |
| 8,995,525 | B2 | 3/2015 | Wiegand et al. |
| 9,083,974 | B2 | 7/2015 | Jeon et al. |
| 2011/0116544 | A1 | 5/2011 | Fu et al. |
| 2013/0229485 | A1 | 9/2013 | Rusanovskyy et al. |
| 2013/0251044 | A1 | 9/2013 | Lim et al. |
| 2013/0279583 | A1 | 10/2013 | Gao et al. |
| 2015/0350640 | A1 | 12/2015 | Jeong et al. |

FOREIGN PATENT DOCUMENTS

| | | |
|---|---|---|
| CN | 103020643 A | 4/2013 |
| CN | 103201950 A | 7/2013 |
| CN | 103891291 A | 6/2014 |
| KR | 10-2009-0058954 A | 6/2009 |
| KR | 10-2012-0065954 A | 6/2012 |
| KR | 10-1228020 B1 | 1/2013 |
| KR | 10-2013-0109963 A | 10/2013 |
| KR | 10-2014-0088059 A | 7/2014 |
| WO | 2014/003421 A1 | 1/2014 |

OTHER PUBLICATIONS

Yi Guo et al., "Priority-Based Template Matching Intra Prediction", Multimedia and Expo, 2008 IEEE International Conference on, Hannover, ICME 2008. (pp. 1117-1120).

International Search Report and Written Opinion, issued by International Searching Authority in corresponding International Application No. PCT/KR2015/011810, dated Feb. 24, 2016. (PCT/ISA/210 & PCT/ISA/237).

Communication dated Jun. 13, 2019, issued by the State Intellectual Property Office of P.R. China in counterpart Chinese Application No. 201580068754.3.

PARTITION MODE (800)

PREDICTION MODE (810)

TRANSFORMATION UNIT SIZE (820)

CODING UNIT (1010)

PER-SAMPLE PREDICTION ENCODING APPARATUS AND METHOD

TECHNICAL FIELD

The present disclosure relates to video encoding and decoding apparatuses and video encoding and decoding methods using prediction.

BACKGROUND ART

As hardware for reproducing and storing high resolution or high quality video content is being developed and supplied, a need for a video codec for effectively encoding or decoding the high resolution or high quality video content is increasing. Video content is encoded by transforming and quantizing a residual signal obtained by subtracting a prediction signal from an original signal. The encoded video content is decoded to reproduce the video content.

DETAILED DESCRIPTION OF THE INVENTION

Technical Problem

In the process of encoding video content, a residual signal corresponding to a difference between an original signal and a prediction signal is transformed, quantized, and transmitted in a bitstream. Thus, there is a need to minimize the residual signal through efficient prediction.

Technical Solution

A video decoding apparatus includes: a splitter configured to split an image into at least one block; a predictor configured to predict a current sample by using at least one of a value obtained by applying a first weight to a first sample predicted earlier than the current sample in a current block and being adjacent to the current sample in a horizontal direction and a value obtained by applying a second weight to a second sample predicted earlier than the current sample in the current block and being adjacent to the current sample in a vertical direction; and a decoder configured to decode the image by using a residual value of the current sample obtained from a bitstream and a prediction value of the current sample.

Advantageous Effects of the Invention

Encoding and decoding apparatuses and encoding and decoding methods, according to embodiments, may perform adaptive prediction according to a position of a current sample.

BEST MODE

Figure 1:
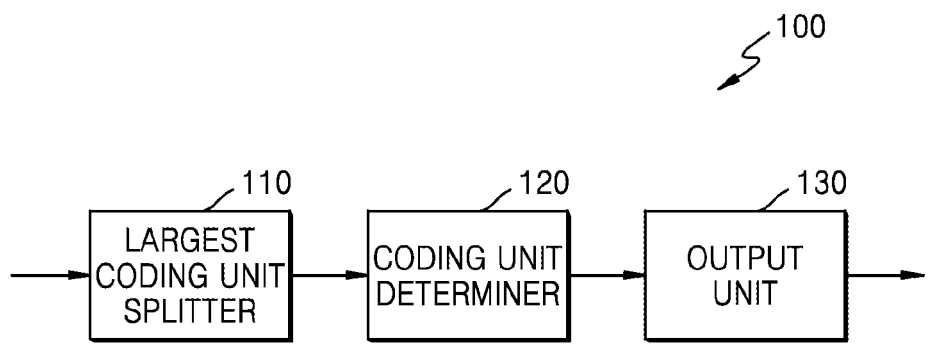
FIG. 1 illustrates a block diagram of a video encoding apparatus based on coding units according to a tree structure, according to an embodiment.

A video decoding apparatus includes: a splitter configured to split an image into at least one block; a predictor configured to predict a current sample by using at least one of a value obtained by applying a first weight to a first sample predicted earlier than the current sample in a current block and being adjacent to the current sample in a horizontal direction and a value obtained by applying a second weight to a second sample predicted earlier than the current sample in the current block and being adjacent to the current sample in a vertical direction; and a decoder configured to decode the image by using a residual value of the current sample obtained from a bitstream and a prediction value of the current sample.

The first weight may be proportional to a difference value between the first sample adjacent to the current sample in the horizontal direction and a third sample predicted earlier than the current sample in the current block and being adjacent to the current sample in a diagonal direction.

The second weight may be proportional to a difference value between the second sample adjacent to the current sample in the vertical direction and a third sample predicted earlier than the current sample in the current block and being adjacent to the current sample in a diagonal direction.

The first weight and the second weight may be equal to each other.

The first sample may be located at a boundary of the current sample, the first sample may be predicted by using at least one of a value obtained by applying a fourth weight to a first reference sample outside the current block and adjacent to the first sample in the horizontal direction and a value obtained by applying a fifth weight to a third sample predicted earlier than the current sample in the current block and being adjacent to the current sample in a diagonal direction, the fourth weight may be proportional to a difference value between the first reference sample and a second reference sample outside the current block and adjacent to the first sample in a diagonal direction, and the fifth weight may be proportional to a difference value between the third sample and the second reference sample.

The second sample may be located at a boundary of the current sample, the second sample may be predicted by using at least one of a value obtained by applying a fourth weight to a third sample predicted earlier than the current sample in the current block and being adjacent to the current sample in a diagonal direction and a value obtained by applying a fifth weight to a first reference sample outside the current block and adjacent to the second sample in a vertical direction, the fourth weight may be proportional to a difference value between the third sample and a second reference sample outside the current block and adjacent to the second sample in a diagonal direction, and the fifth weight may be proportional to a difference value between the first reference sample and the second reference sample.

A third sample may be located at a boundary of the current block, the third sample may be obtained by using at least one of a value obtained by applying a fourth weight to a first reference sample outside the current block and adjacent to the third sample in a horizontal direction and a value obtained by applying a fifth weight to a second reference sample outside the current block and adjacent to the third sample in a vertical direction, the fourth weight may be proportional to a difference value between the first reference sample and a third reference sample adjacent to the third sample in a diagonal direction, and the fifth weight may be proportional to a difference value between the second reference sample and the third reference sample.

A video decoding method includes: splitting an image into at least one block; predicting a current sample by using at least one of a value obtained by applying a first weight to a first sample predicted earlier than the current sample in a current block and being adjacent to the current sample in a horizontal direction and a value obtained by applying a second weight to a second sample predicted earlier than the current sample in the current block and being adjacent to the current sample in a vertical direction; and decoding the image by using a residual value of the current sample obtained from a bitstream and a prediction value of the current sample.

A video encoding apparatus includes: a splitter configured to split an image into at least one block; a predictor configured to predict a current sample by using at least one of a value obtained by applying a first weight to a first sample predicted earlier than the current sample in a current block and being adjacent to the current sample in a horizontal direction and a value obtained by applying a second weight to a second sample predicted earlier than the current sample in the current block and being adjacent to the current sample in a vertical direction; and an encoder configured to encode a residual value between an original value of the current sample and a prediction value of the current sample.

A video encoding method includes: splitting an image into at least one block; predicting a current sample by using at least one of a value obtained by applying a first weight to a first sample predicted earlier than the current sample in a current block and being adjacent to the current sample in a horizontal direction and a value obtained by applying a second weight to a second sample predicted earlier than the current sample in the current block and being adjacent to the current sample in a vertical direction; and encoding a residual value between an original value of the current sample and a prediction value of the current sample.

A video decoding apparatus includes: a splitter configured to split an image into at least one block; a candidate selector configured to select at least one adjacent sample adjacent to a current sample in a current block and select a first candidate sample adjacent to a candidate adjacent sample having a closest value to the adjacent sample from among a plurality of candidate samples included in at least one previous block reconstructed earlier than the current block; a predictor configured to predict the current sample by using the first candidate sample; and a decoder configured to decode the image by using a residual value of the current sample obtained from a bitstream and a prediction value of the current sample.

The candidate samples may be located within a predetermined distance from the current sample.

The first candidate sample may be selected based on a difference value between the adjacent sample adjacent to the current sample and each of candidate adjacent samples adjacent to the candidate samples and a distance between the current sample and each of the candidate samples.

A direction in which the candidate sample is adjacent to the candidate adjacent sample may be identical to a direction in which the current sample is adjacent to the adjacent sample.

The first candidate sample may be selected based on a difference value between the adjacent sample adjacent to the current sample and each of candidate adjacent samples adjacent to the candidate samples, a direction in which the current sample is adjacent to the adjacent sample, and a direction in which the candidate samples are adjacent to the candidate adjacent samples.

A video decoding method includes: splitting an image into at least one block; selecting at least one adjacent sample adjacent to a current sample in a current block and selecting a first candidate sample adjacent to a candidate adjacent sample having a closest value to the adjacent sample from among a plurality of candidate samples included in at least one previous block reconstructed earlier than the current block; predicting the current sample by using the first candidate sample; and decoding the image by using a residual value of the current sample obtained from a bitstream and a prediction value of the current sample.

A video encoding apparatus includes: a splitter configured to split an image into at least one block; a candidate selector configured to select at least adjacent sample predicted earlier than a current sample in a current block and being adjacent to the current sample and select a first candidate sample adjacent to a candidate adjacent sample having a closest value to the adjacent sample from among a plurality of candidate samples included in at least one previous block reconstructed earlier than the current block; a predictor configured to predict the current sample by using the first candidate sample; and an encoder configured to encode a residual value between an original value of the current sample and a prediction value of the current sample.

A video encoding method includes: splitting an image into at least one block; selecting at least adjacent sample predicted adjacent to a current sample in a current block and selecting a first candidate sample adjacent to a candidate adjacent sample having a closest value to the adjacent sample from among a plurality of candidate samples included in at least one previous block reconstructed earlier than the current block; predicting the current sample by using the first candidate sample; and encoding a residual value between an original value of the current sample and a prediction value of the current sample.

MODE OF THE INVENTION

Hereinafter, an "image" may refer to a still image or a moving image of a video, or a video itself.

Hereinafter, a "sample" refers to data that is assigned to a sampling location of an image and is to be processed. For example, pixels in an image of a spatial domain may be samples.

Hereinafter, a "layer image" denotes specific-view images or specific-type images. One layer image in a multiview video denotes color images or depth images input at a specific view.

Hereinafter, a video encoding scheme and a video decoding scheme based on coding units of a tree structure, according to various embodiments, will be disclosed with reference to FIGS. 1 through 13.

FIG. 1 illustrates a block diagram of a video encoding apparatus 100 based on coding units of a tree structure, according to an embodiment.

The video encoding apparatus involving video prediction based on coding units of the tree structure 100 includes a coding unit determiner 120 and an output unit 130. Hereinafter, for convenience of description, the video encoding apparatus 100 involving video prediction based on coding units of the tree structure is referred to as the "video encoding apparatus 100".

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to the embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. A partition obtained by splitting a coding unit may include a coding unit and a data unit obtained by splitting at least one of a height and a width of the coding unit. A partition may include a data unit where a coding unit is split, and a data unit having the same size as the coding unit. A partition that is a base of prediction may be referred to as a 'prediction unit'.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to an embodiment include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to the embodiment may also perform the transformation on the image data in a coding unit based on not only the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth but also requires information related to prediction and transformation.

Accordingly, the coding unit determiner 120 may determine not only a depth generating a minimum encoding error but may also determine a partition mode in which a prediction unit is split to partitions, a prediction mode according to prediction units, and a size of a transformation unit for transformation.

A method of determining the coding unit, the prediction unit, the partition, and the transformation unit according to the tree structure of the largest coding unit, according to an embodiment, will be described below in detail with reference to FIGS. 3 through 13.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one depth determined by the coding unit determiner 120, and split information according to the depth, in bitstreams.

The encoded image data may be obtained by encoding residual data of an image.

The split information according to depth may include information about the depth, about the partition mode in the prediction unit, about the prediction mode, and about split of the transformation unit.

Final-depth information may be defined by using split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, data of the largest coding unit may vary according to locations since the data is hierarchically split according to depths, and thus a depth and split information may be set for the data.

Accordingly, the output unit 130 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

In the video encoding apparatus 100 according to the simplest embodiment, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

Figure 2:
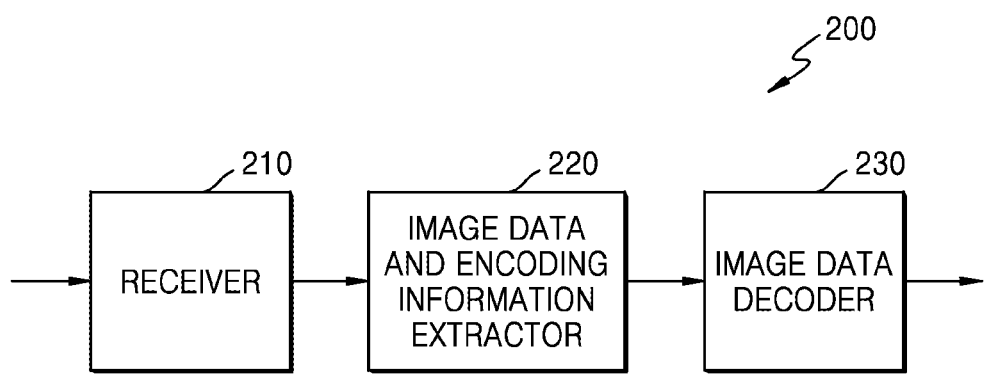
FIG. 2 illustrates a block diagram of a video decoding apparatus based on coding units according to a tree structure, according to an embodiment.

FIG. 2 is a block diagram of a video decoding apparatus 200 based on coding units according to tree structure, according to various embodiments.

The video decoding apparatus 200 involving video prediction based on coding units of the tree structure according to the embodiment includes a receiver 210, an image data and encoding information extractor 220, and an image data decoder 230. Hereinafter, for convenience of description, the video decoding apparatus 200 involving video prediction based on coding units of the tree structure according to the embodiment is referred to as the "video decoding apparatus 200".

Definitions of various terms, such as a coding unit, a depth, a prediction unit, a transformation unit, and various types of split information for decoding operations of the video decoding apparatus 200 according to the embodiment are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each largest coding unit, from the parsed bitstream. The extracted final depth and split information are output to the image data decoder 230. That is, the image data in a bitstream is split into the largest coding unit so that the image data decoder 230 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 may reconstruct the current picture by decoding the image data in each largest coding unit based on the depth and the split information according to the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial region of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The image decoding apparatus 30 described above with reference to FIG. 3A may include the video decoding apparatuses 200 corresponding to the number of views, so as to reconstruct first layer images and second layer images by decoding a received first layer image stream and a received second layer image stream.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 3:
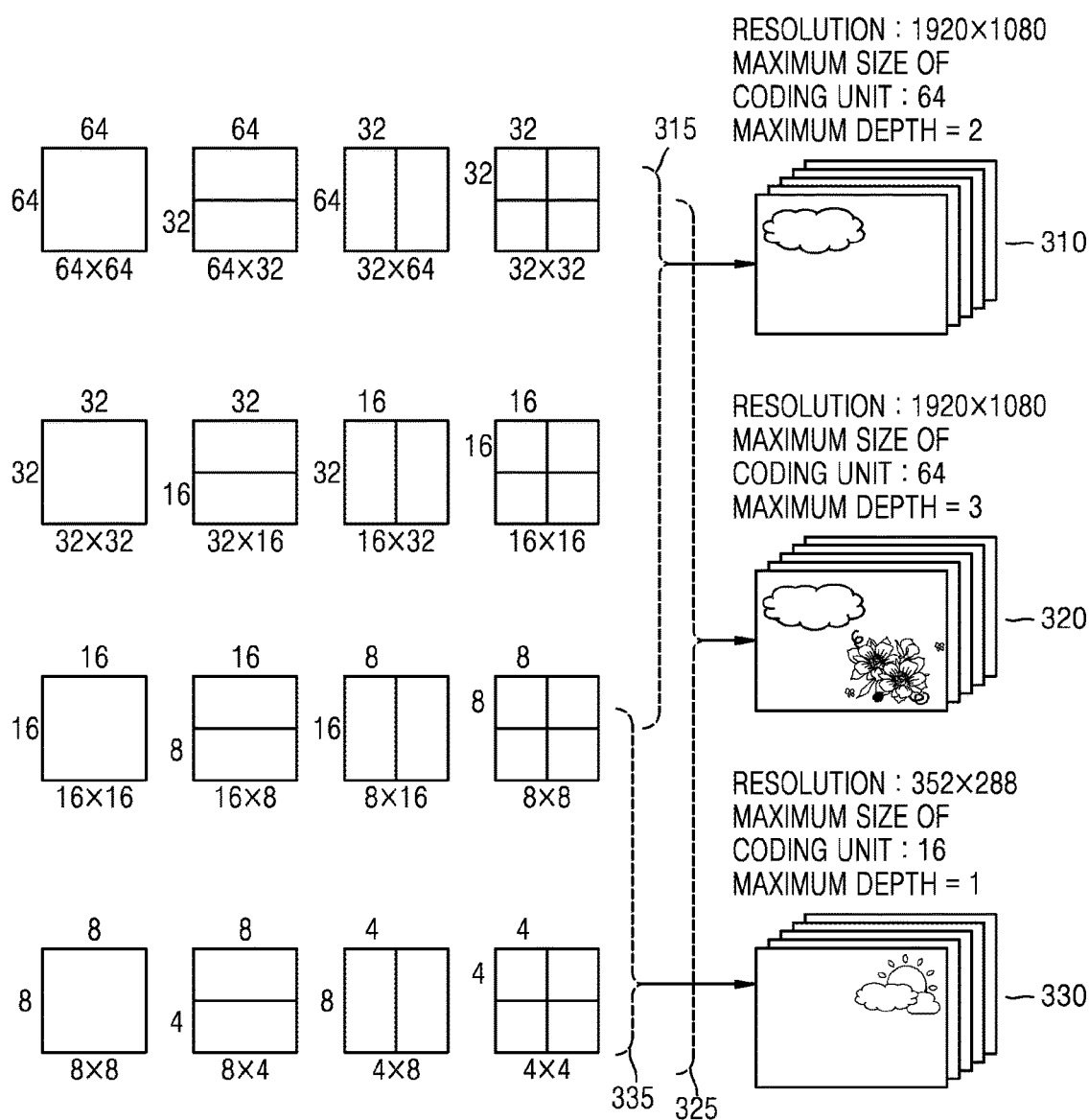
FIG. 3 illustrates a concept of coding units, according to an embodiment.

FIG. 3 illustrates a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 4:
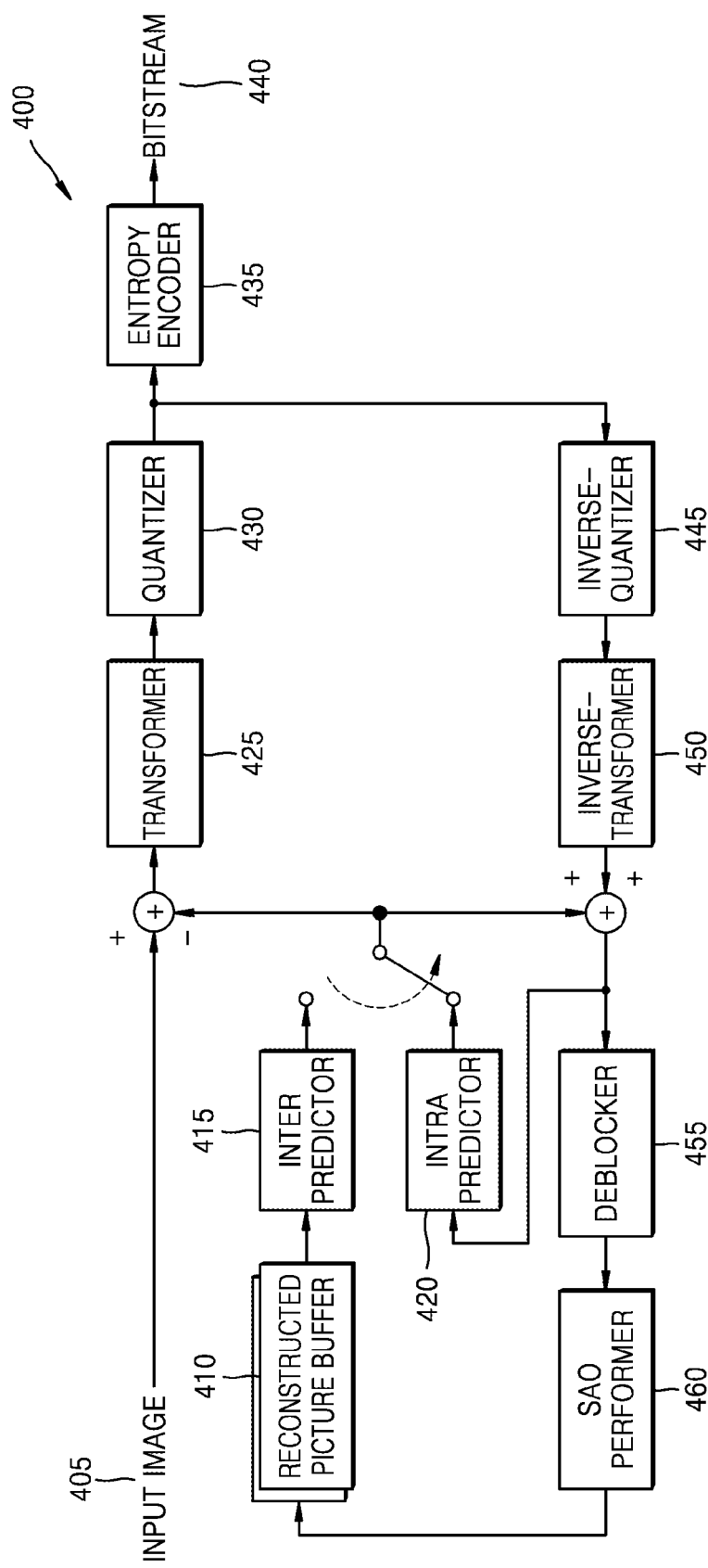
FIG. 4 illustrates a block diagram of an image encoder based on coding units, according to an embodiment.

FIG. 4 is a block diagram of an image encoder 400 based on coding units, according to various embodiments.

The image encoder 400 according to an embodiment performs operations of the coding unit determiner 120 of the video encoding apparatus 100 so as to encode image data. In other words, an intra predictor 420 performs intra prediction on coding units in an intra mode, from among a current image 405, per prediction unit, and an inter predictor 415 performs inter prediction on coding units in an inter mode by using the current image 405 and a reference image obtained by a reconstructed picture buffer 410, per prediction unit. The current picture 405 may be split into largest coding units, and then the largest coding units may be sequentially encoded. In this regard, the largest coding unit that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is reconstructed to residual data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The data in the spatial domain passes through a deblocker 455 and a sample adaptive offset (SAO) performer 460 and thus a reconstructed image is generated. The reconstructed image is stored in the reconstructed picture buffer 410. Reconstructed images stored in the reconstructed picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the deblocker 455, and the SAO performer 460, may perform operations based on each coding unit among coding units having a tree structure according to each largest coding unit.

In particular, the intra predictor 420 and the inter predictor 415 may determine partitions and a prediction mode of each coding unit from among the coding units having a tree structure while considering the maximum size and the maximum depth of a current largest coding unit, and the transformer 425 may determine whether to split a transformation unit according to a quad-tree in each coding unit from among the coding units having the tree structure.

Figure 5:
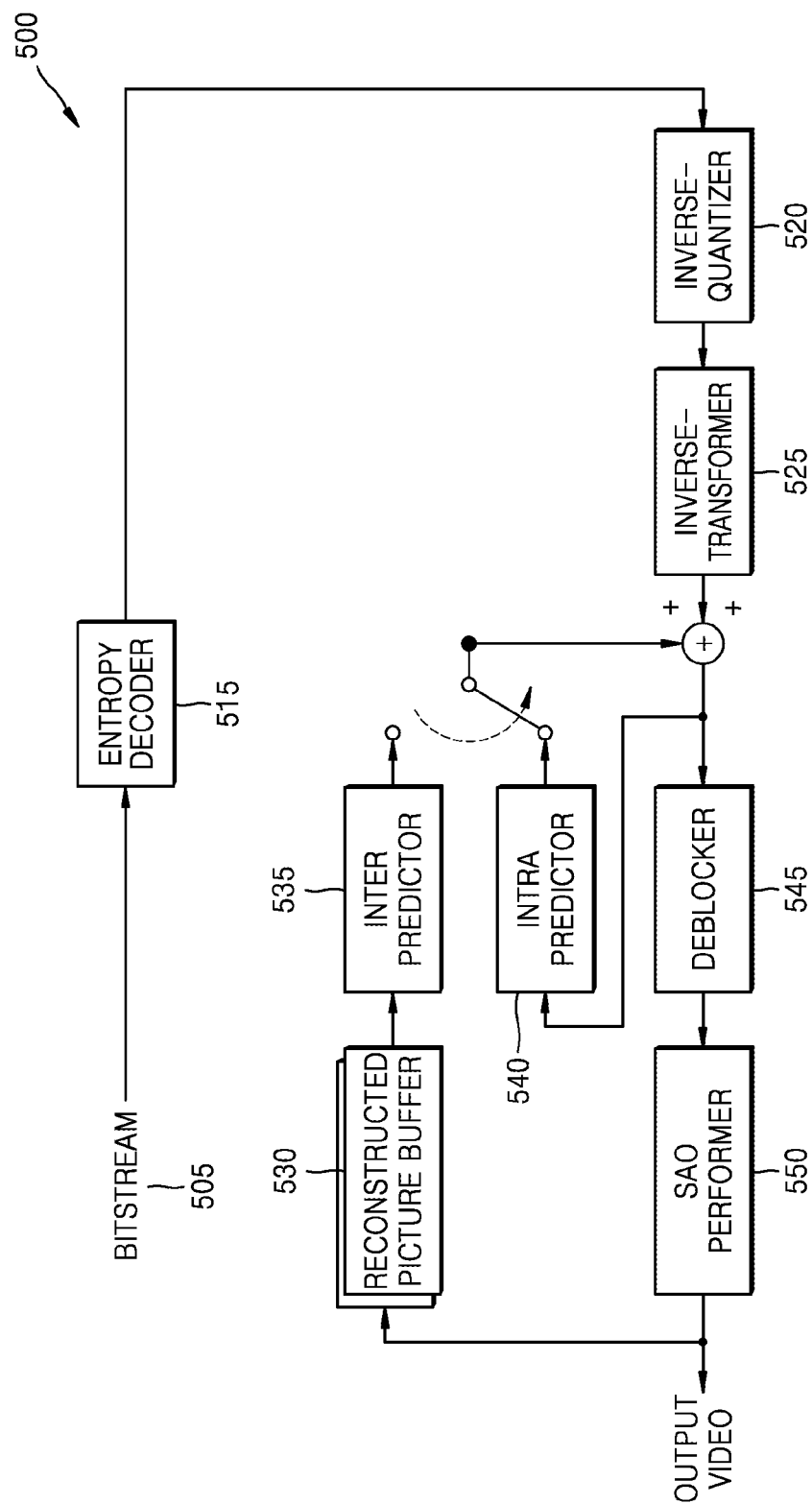
FIG. 5 illustrates a block diagram of an image decoder based on coding units, according to an embodiment.

FIG. 5 is a block diagram of an image decoder 500 based on coding units according to various embodiments.

An entropy decoder 515 parses encoded image data that is to be decoded and encoding information required for decoding from a bitstream 505. The encoded image data is a quantized transformation coefficient, and an inverse-quantizer 520 and an inverse-transformer 525 reconstructs residual data from the quantized transformation coefficient.

An intra predictor 540 performs intra prediction on a coding unit in an intra mode according to prediction units. An inter predictor 535 performs inter prediction on a coding unit in an inter mode from a current image according to prediction units, by using a reference image obtained by a reconstructed picture buffer 530.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocker 545 and an SAO performer 550. Also, reconstructed images that are stored in the reconstructed picture buffer 530 may be output as reference images.

In order for a image data decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the deblocker 545, and the SAO performer 550 may perform operations based on coding units having a tree structure for each largest coding unit.

In particular, the intra predictor 540 and the inter predictor 535 determine a partition mode and a prediction mode according to each of coding units having a tree structure, and the inverse-transformer 525 may determine whether to split a transformation unit according to a quad-tree structure per coding unit.

Figure 6:
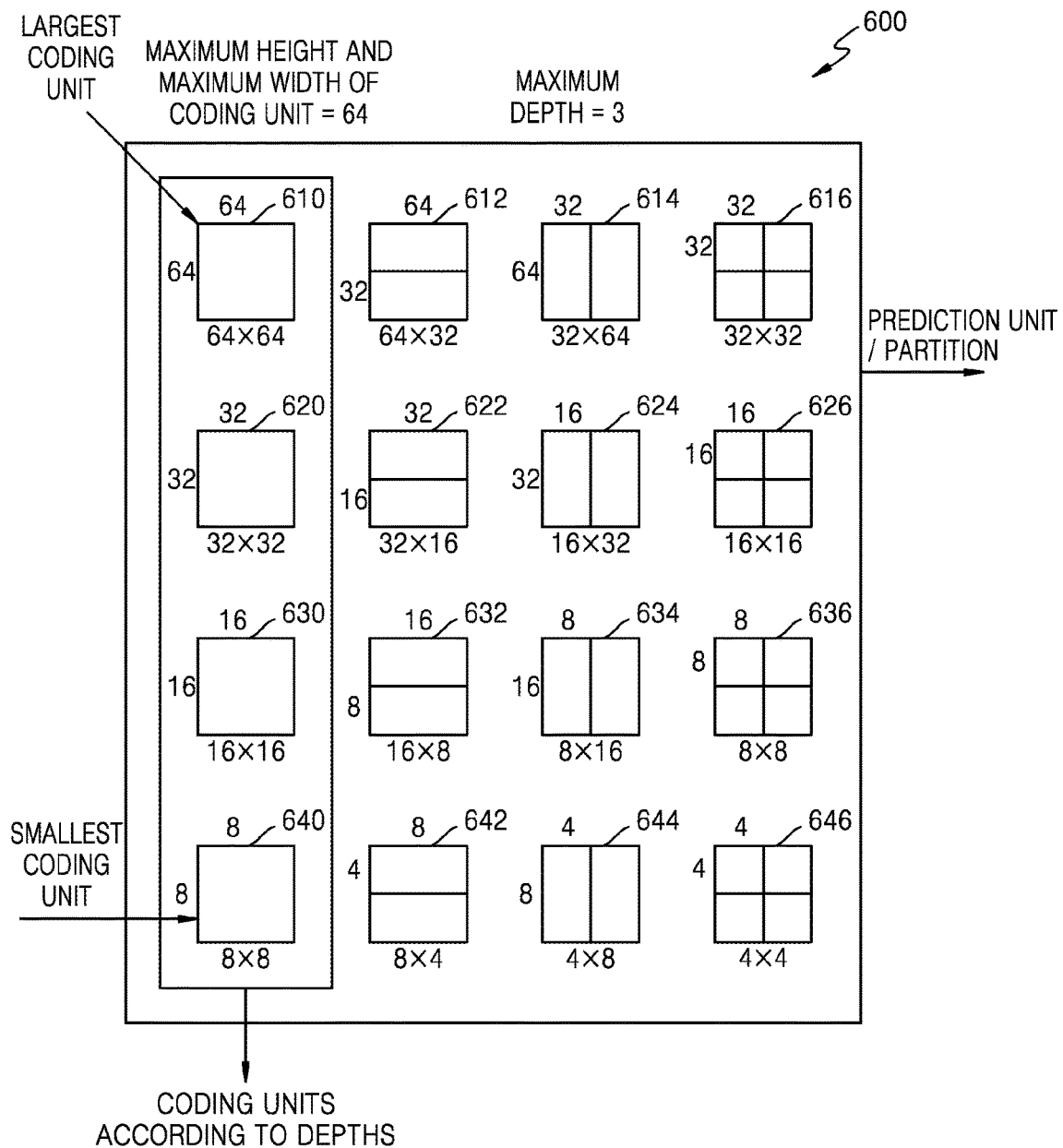
FIG. 6 illustrates deeper coding units according to depths, and partitions, according to an embodiment.

FIG. 6 illustrates coding units according to depths and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the coding unit 610 having a size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having a size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having a size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having a size of 8×8, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the largest coding unit 610 may be selected as the depth and a partition mode of the largest coding unit 610.

Figure 7:
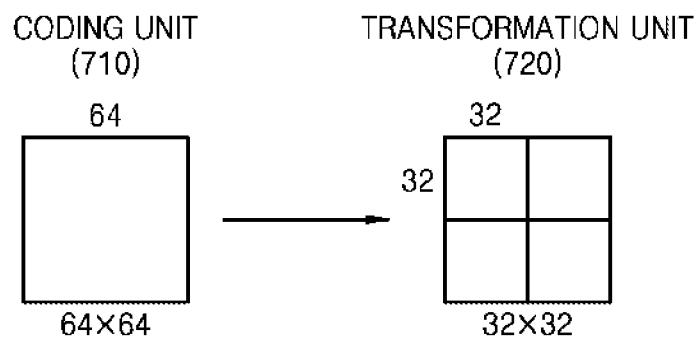
FIG. 7 illustrates a relationship between a coding unit and transformation units, according to an embodiment.

FIG. 7 illustrates a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error may be selected.

Figure 8:
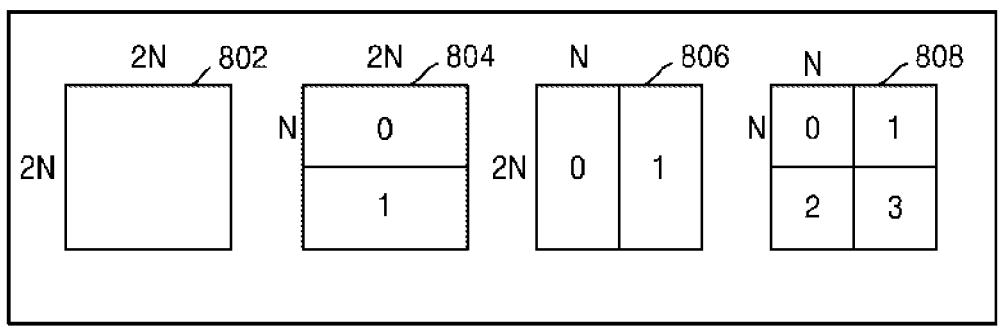
FIG. 8 illustrates a plurality of pieces of encoding information according to depths, according to an embodiment.
Figure 8:
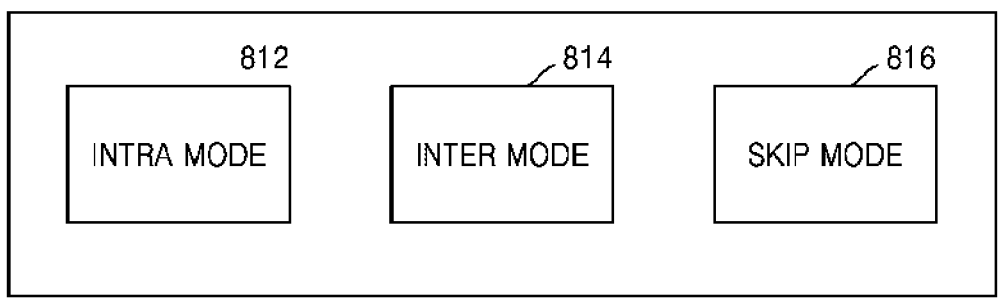
Figure 8:
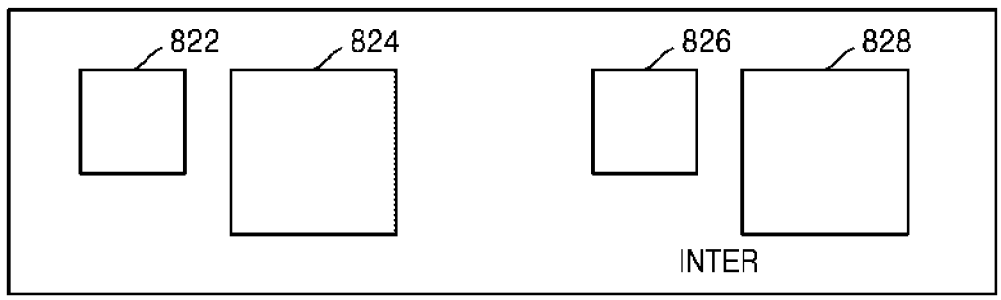

FIG. 8 illustrates a plurality of pieces of encoding information according to depths, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the partition mode information 800, the prediction mode information 810, and the transformation unit size information 820 for each deeper coding unit.

Figure 9:
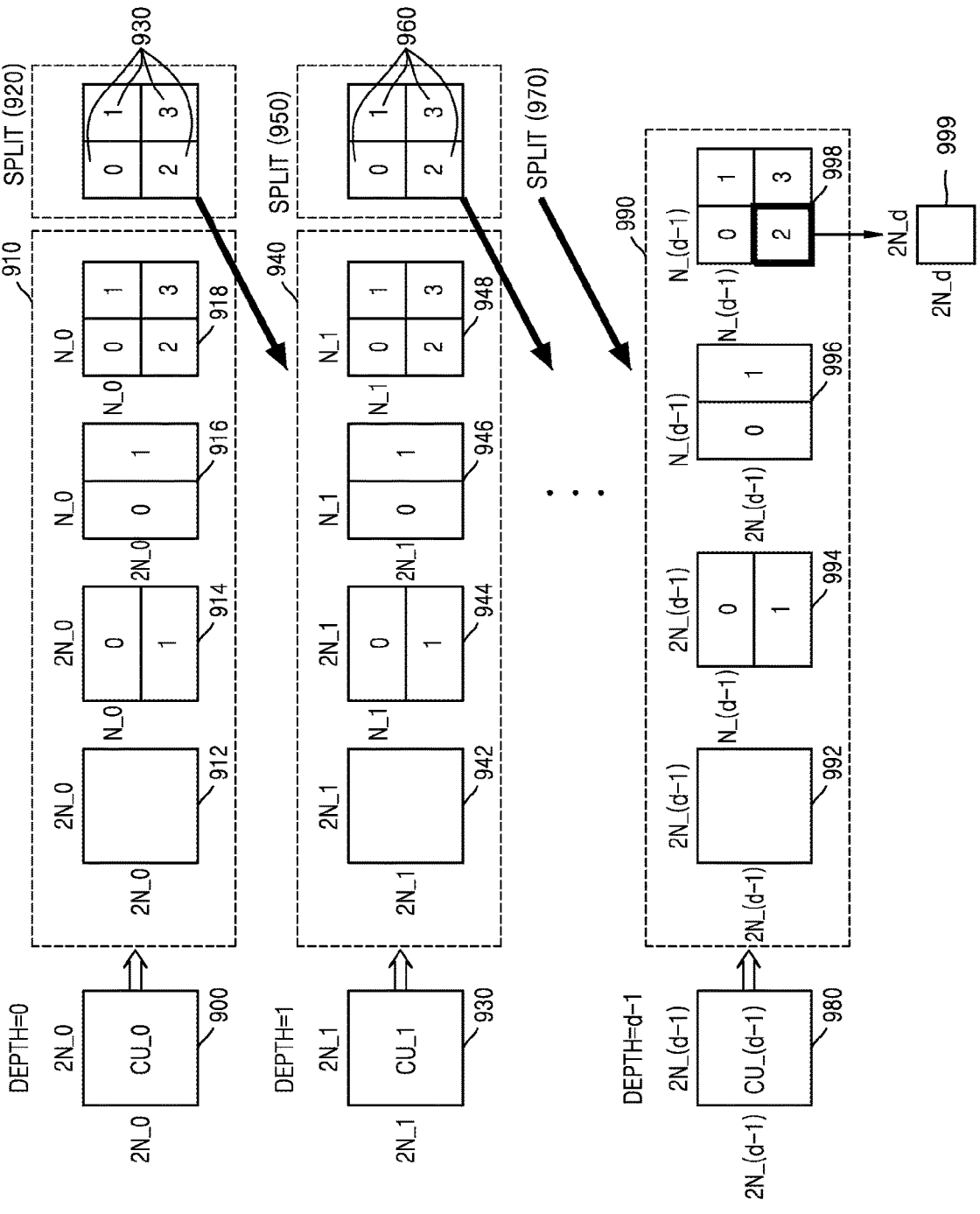
FIG. 9 illustrates deeper coding units according to depths, according to an embodiment.

FIG. 9 is a diagram of coding units according to depths, according to various embodiments.

Split information may be used to indicate a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode having a minimum encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth having the minimum encoding error by comparing encoding errors according to depths of the coding unit 900 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, split information about the corresponding depth.

Figure 10:
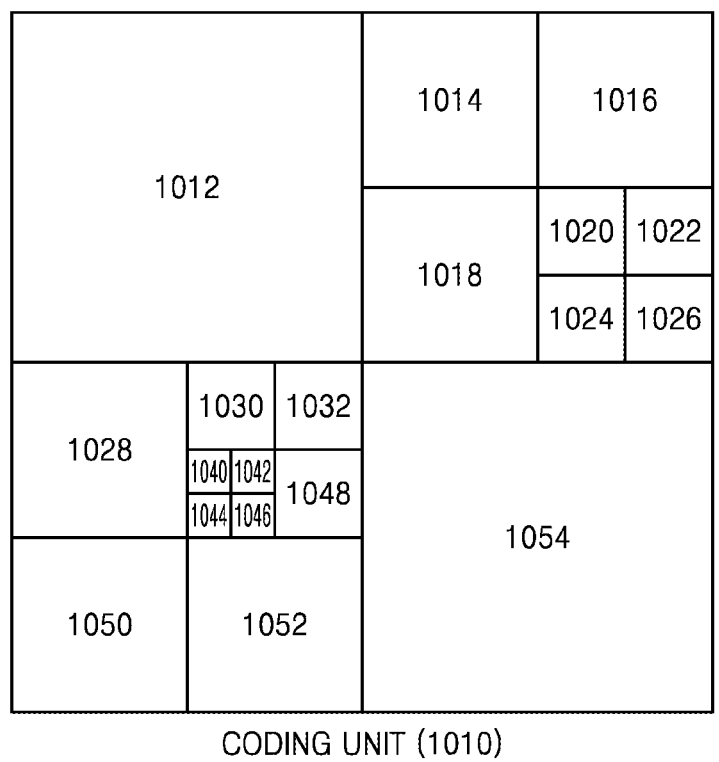
FIGS. 10, 11, and 12 illustrate a relationship between coding units, prediction units, and transformation units, according to an embodiment.
Figure 11:
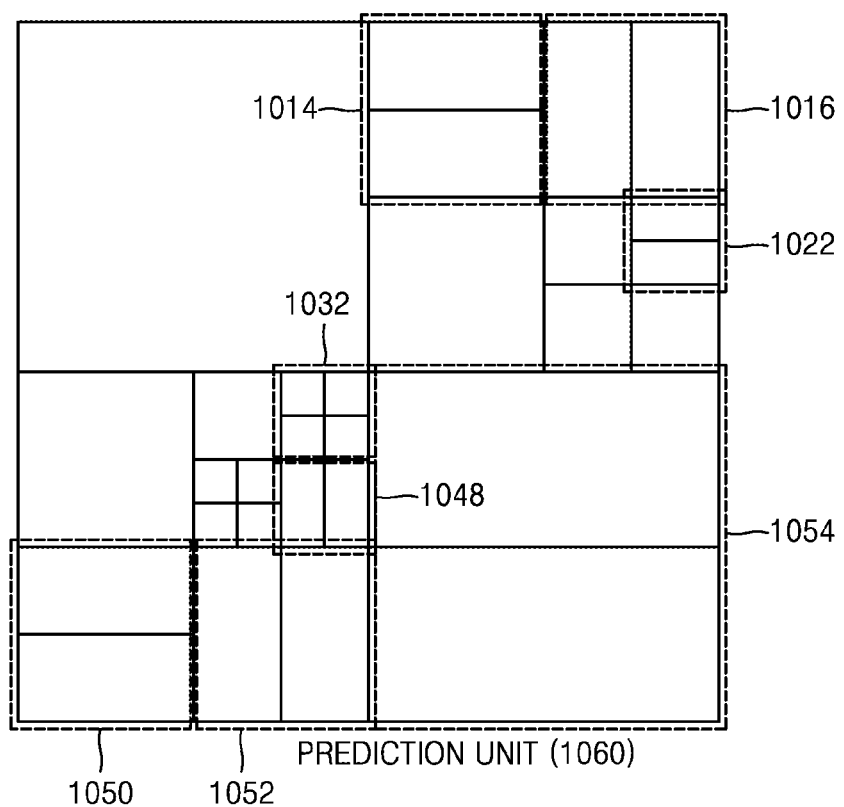
Figure 12:
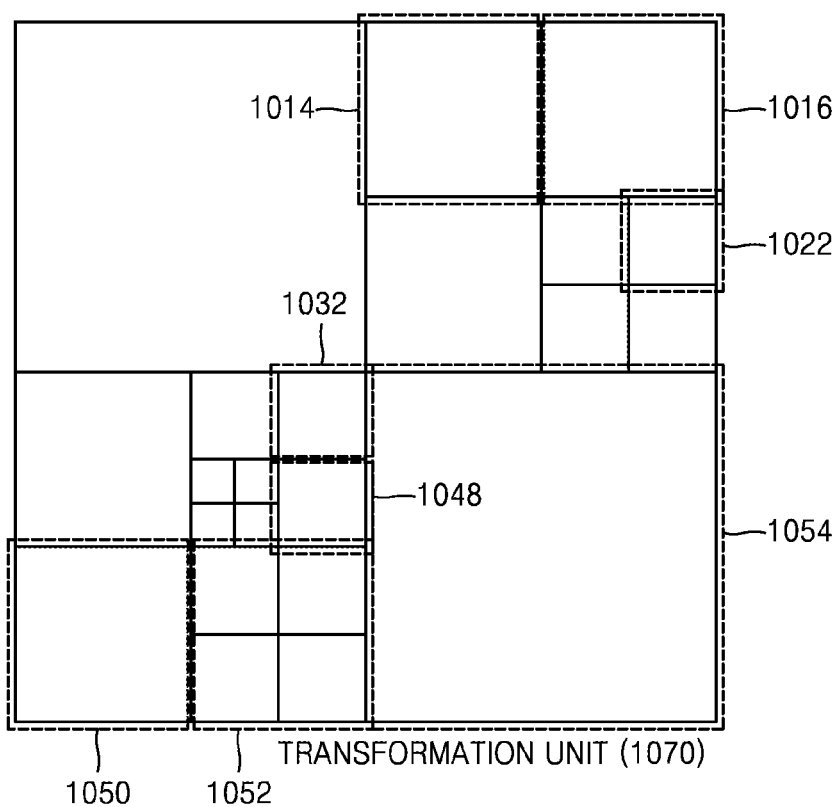

FIGS. 10, 11, and 12 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to the embodiments.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Mode | | Size of Transformation Unit | | |
| Intra Inter Skip (Only 2N × 2N) | Symmetrical Partition Mode | Asymmetrical Partition Mode | Split Information 0 of Transformation Unit | Split Information 1 of Transformation Unit | Repeatedly Encode Coding Units having Lower Depth of d + 1 |
| | 2N × 2N 2N × N N × 2N N × N | 2N × nU 2N × nD nL × 2N nR × 2N | 2N × 2N | N × N (Symmetrical Partition Mode) N/2 × N/2 (Asymmetrical Partition Mode) | |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 13:
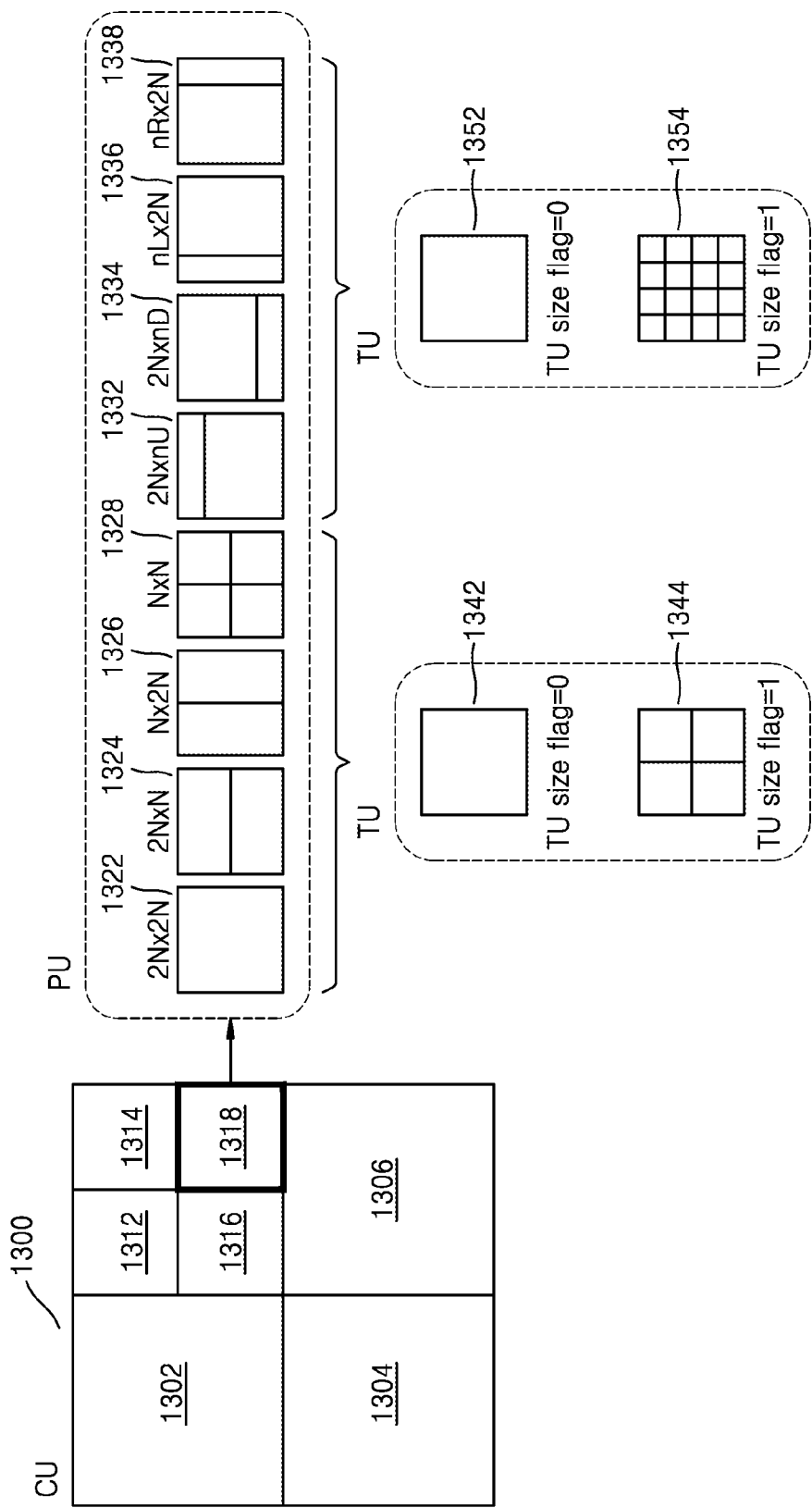
FIG. 13 illustrates a relationship between a coding unit and transformation units, according to various embodiments.

FIG. 13 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 13 is a flag having a value or 0 or 1, but the transformation unit split information according to an embodiment is not limited to a flag having 1 bit, and the transformation unit may be hierarchically split while the transformation unit split information increases in a manner of 0, 1, 2, 3, etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=min(MaxTransformSize,PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=min(MaxTransformSize,PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 1 through 13, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

Figure 14:
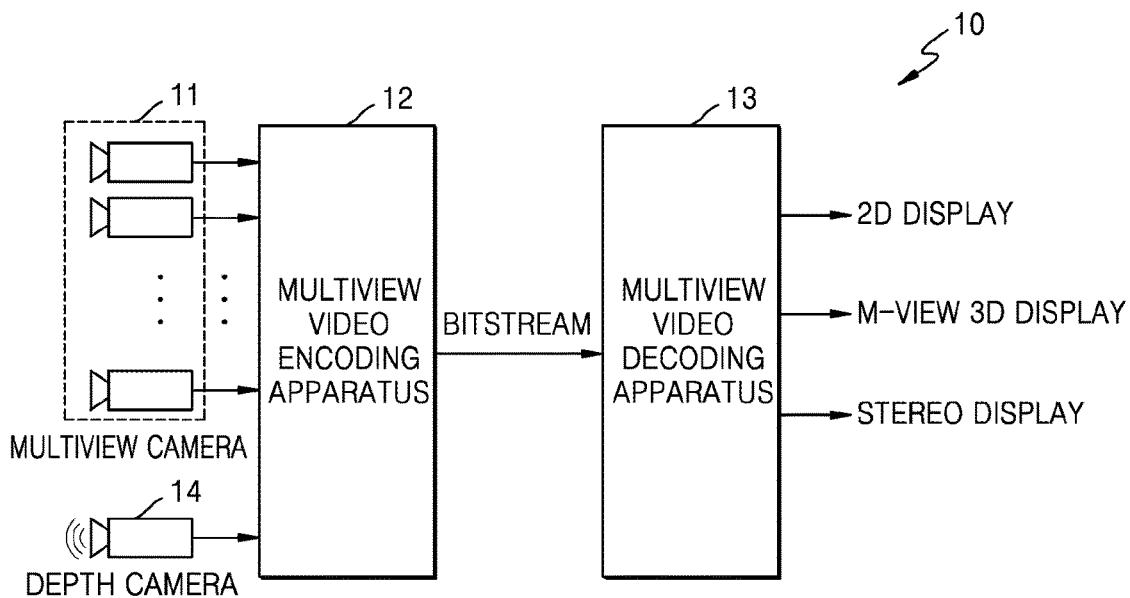
FIG. 14 illustrates a multiview video system according to an embodiment.

FIG. 14 illustrates a multiview video system according to an embodiment.

The multiview video system 10 includes: a multiview video encoding apparatus 12 that generates a bitstream by encoding a multiview video image obtained through two or more multiview cameras 11, a depth image of a multiview image obtained through a depth camera 14, and camera parameter information related to the multiview cameras 11, and a multiview video decoding apparatus 13 that decodes the bitstream and provides a decoded multiview video frame in various formats according to a viewer's demand.

The multiview cameras 11 are configured by connecting a plurality of cameras having different views and provide a multiview video image at each frame. In the following description, a color image obtained at each view according to a predetermined color format, such as a YUV format or a YCbCr format, may be referred to as a texture image.

The depth camera 14 provides a depth image that expresses depth information of a scene as an 8-bit image of 256 levels. The number of bits for expressing one pixel of the depth image is not limited to 8 bits and may be changed. The depth camera 14 may measure a distance from a camera to a subject and a background by using infrared ray and provide a depth image having a value proportional or inversely proportional to the distance. As described above, an image of one view includes a texture image and a depth image.

When the multiview video encoding apparatus 12 encodes the multiview texture image and the depth image corresponding thereto and transmits the texture image and the depth image, the multiview video decoding apparatus 13 may provide a 3D effect through an existing stereo image or 3D image by using the multiview texture image and the depth image included in the bitstream and may also combine 3D images of a certain view desired by a viewer and provide the combined image. Information indicating whether information about the depth image is included in a data packet and information indicating whether each data packet is for a texture image, a depth image, or an image type may be included in a bitstream of the multiview video data. According to hardware performance of a receiver side, the multiview video decoding apparatus 13 may decode the multiview video by using the received depth image when the depth image is used to reconstruct the multiview video, and the multiview video decoding apparatus 13 may discard the data packet received in relation to the depth image when hardware of the receiver side does not support the multiview video and thus cannot use the depth image. As such, when the multiview video decoding apparatus 13 cannot display the multiview image, the receiver side may display an image of one view from among the multiview images as a two-dimensional (2D) image.

A data amount to be encoded in the multiview video data increases in proportion to the number of views, and the depth image for realizing a 3D effect needs to be encoded. Thus, as illustrated in FIG. 14, it is necessary to efficiently compress a large amount of multiview video data so as to implement a multiview video system.

Figure 15:
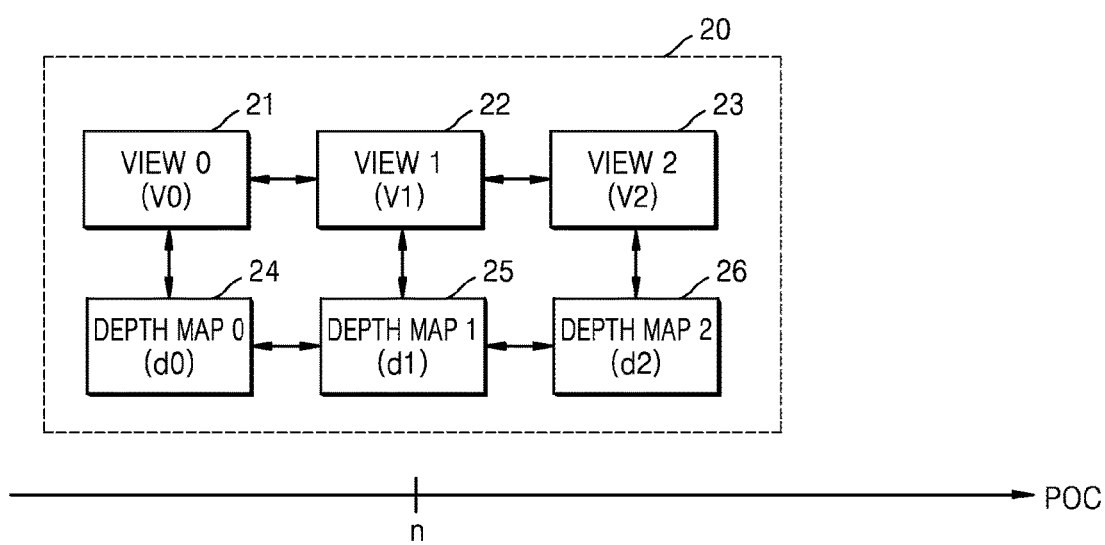
FIG. 15 illustrates texture images and depth images constituting a multiview video.

FIG. 15 illustrates texture images and depth images constituting a multiview video.

FIG. 15 illustrates a texture picture v0 21 of a first view (view 0), a depth image picture d0 24 corresponding to the texture picture v0 21 of the first view (view 0), a texture picture v1 22 of a second view (view 1), a depth image picture d1 25 corresponding to the texture picture v1 22 of the second view (view 1), a texture picture v2 23 of a third view (view 2), and a depth image picture d2 26 corresponding to the texture picture v2 23 of the third view (view 2). Although FIG. 15 illustrates the multiview texture pictures (v0, v1, and v2) 21, 22, and 23 at three views (view 0, view 1, and view 2) and the corresponding depth images (d0, d1, and d2) 24, 25, and 26, the number of views is not limited thereto and may be changed. The multiview texture pictures (v0, v1, and v2) 21, 22, and 23 and the corresponding depth images (d0, d1, and d2) 24, 25, and 26 are pictures that are obtained at the same time and have the same picture order count (POC). In the following description, a picture group 1500 having the same POC value of n (n is an integer) as the multiview texture pictures (v0, v1, and v2) 21, 22, and 23 and the corresponding depth image pictures (d0, d1, and d2) 24, 25, and 26 may be referred to as an $n^{th}$ picture group

1500. A picture group having the same POC may constitute one access unit. Encoding order of access units need not be necessarily the same as capture order (acquisition order) or display order of images. The encoding order of access units may be different from the capture order or the display order by taking into account reference relationship.

A view identifier (ViewId), which is a view order index, may be used to specify the texture image of each view and the view of the depth image. The texture image and the depth image of the same view have the same view identifier. The view identifier may be used to determine the encoding order. For example, the multiview video encoding apparatus 12 may encode a multiview video in ascending order of values of view identifiers. That is, the multiview video encoding apparatus 12 may encode a texture image and a depth image having ViewId of 0 and then encode a texture image and a depth image having ViewId of 1. When the encoding order is determined based on the view identifier as described above, the multiview video decoding apparatus 13 may identify error occurrence or non-occurrence of received data by using the view identifier in an environment where an error easily occurs. However, the encoding or decoding order of images of each view may be changed without depending on the magnitude order of the view identifiers.

Hereinafter, video encoding and decoding apparatuses and video encoding and decoding methods, which can perform sample-wise prediction, will be described with reference to FIGS. 16 through 41.

Specifically, intra prediction encoding and decoding apparatuses and intra prediction encoding and decoding methods, which perform intra prediction of a current sample based on an already predicted adjacent sample, will be described with reference to FIGS. 16 through 24. Then, intra prediction encoding and decoding apparatuses and intra prediction encoding and decoding methods, which perform intra prediction of a current sample based on an already reconstructed sample, will be described with reference to FIGS. 29 through 41.

Figure 16:
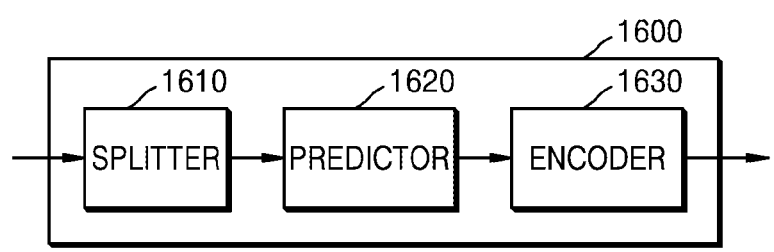
FIG. 16 illustrates a block diagram of a video encoding apparatus that can perform sample-wise prediction based on an already predicted adjacent sample.

FIG. 16 illustrates a block diagram of a video encoding apparatus that can perform sample-wise prediction based on an already predicted adjacent sample.

The video encoding apparatus 1600 may include a splitter 1610, a predictor 1620, and an encoder 1630. The video encoding apparatus 1600 may include a central processor (not illustrated) that collectively controls the splitter 1610, the predictor 1620, and the encoder 1630. Alternatively, the splitter 1610, the predictor 1620, and the encoder 1630 may be driven by their individual processors (not illustrated) that interoperate with one another to collectively control the video encoding apparatus 1600. Alternatively, the splitter 1610, the predictor 1620, and the encoder 1630 may be controlled under control of an external processor (not illustrated) disposed outside the video encoding apparatus 1600.

The video encoding apparatus 1600 may include one or more data storages (not illustrated) that store input and output data of the splitter 1610, the predictor 1620, and the encoder 1630. The video encoding apparatus 1600 may include a memory controller (not illustrated) that manages data input and output of the data storages (not illustrated).

In order to output a result of video encoding, the video encoding apparatus 1600 may operate in connection with an internal video encoding processor or an external video encoding processor, so as to perform a video encoding operation including prediction. The internal video encoding processor of the video encoding apparatus 1600 may be an independent processor for performing a video encoding operation. Also, the video encoding apparatus 1600, the central processor, or a graphic processor may include a video encoding processing module to perform a basic video encoding operation.

The video encoding apparatus 1600 may be included in the video encoding apparatus 100 of FIG. 1. Specifically, the splitter 1610 may be included in the largest coding unit splitter 110 and the coding unit determiner 120, the predictor 1620 may be included in the intra predictor 420, and the encoder 1630 may be included in the transformer 425, the quantizer 430, and the entropy encoder 435. Therefore, the descriptions provided above with reference to FIGS. 1 and 4 will be omitted.

The splitter 1610 splits an image into at least one block. The term 'block' may refer to a largest coding unit, a coding unit, a transformation unit, or a prediction unit, which is split from an image to be encoded or decoded.

Specifically, the block may be a largest coding unit split from an image based on size information of a coding unit for determining a maximum size of the coding unit. The largest coding unit including the coding units of the tree structure may be variously referred to as coding tree unit, coding block tree, block tree, root block tree, coding tree, coding root, or tree trunk.

Alternatively, the block may be a coding unit split from a largest coding unit based on coding unit split information indicating whether or not a coding unit is split.

Alternatively, the block may be a prediction unit split from a coding unit of a final depth, that is, a coding unit that cannot be split any more. For example, the block may include a coding unit of a final depth, and a first prediction unit and a second prediction unit obtained by splitting at least one of a height and a width of the coding unit of the final depth, based on a partition mode. The prediction unit may be a data unit obtained by splitting the coding unit of the final depth, and the prediction unit may have the same size as that of the coding unit of the final depth. The partition mode may indicate a type of at least one prediction unit split from the coding unit. For example, when the partition mode indicates 2N×N, the splitter 1610 may split the coding unit of the final depth having a size of 2N×2N into two prediction units each having a size of 2N×N.

Alternatively, the block may be a transformation unit split from a coding unit of a final depth. For example, the block may be a transformation unit split from a transformation unit to a quad tree structure based on transformation unit split information.

The type of the block may be a square, a rectangle, or any geometric shape. The block is not limited to a data unit having a constant size.

The predictor 1620 obtains a prediction value of a current sample by using at least one sample predicted earlier than the current sample in a current block split from an image. Specifically, the predictor 1620 may predict the current sample by using at least one of a value obtained by applying a first weight to a first sample predicted earlier than the current sample in the current block and being adjacent to the current sample in a horizontal direction and a value obtained by applying a second weight to a second sample predicted earlier than the current sample and being adjacent to the current sample in a vertical direction.

The encoder 1630 encodes a residual value of the current sample. Specifically, the encoder 1630 may obtain a residual value between an original value of the current sample and a prediction value of the current sample obtained by the predictor 1620, transform the residual value of the current sample, perform entropy encoding on the transformed residual value, and output the entropy-encoded residual value in a bitstream.

Figure 17:
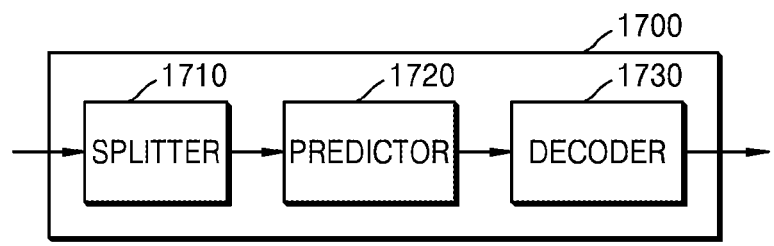
FIG. 17 illustrates a block diagram of a video decoding apparatus that can perform sample-wise prediction based on an already predicted adjacent sample.

FIG. 17 illustrates a block diagram of a video decoding apparatus that can perform sample-wise prediction based on an already predicted adjacent sample.

The video decoding apparatus 1700 may include a splitter 1710, a predictor 1720, and a decoder 1730. The video decoding apparatus 1700 may include a central processor (not illustrated) that collectively controls the splitter 1710, the predictor 1720, and the decoder 1730. Alternatively, the splitter 1710, the predictor 1720, and the decoder 1730 may be driven by their individual processors (not illustrated) that interoperate with one another to collectively control the video decoding apparatus 1700. Alternatively, the splitter 1710, the predictor 1720, and the decoder 1730 may be controlled under control of an external processor (not illustrated) disposed outside the video decoding apparatus 1700.

The video decoding apparatus 1700 may include one or more data storages (not illustrated) that store input and output data of the splitter 1710, the predictor 1720, and the decoder 1730. The video decoding apparatus 1700 may include a memory controller (not illustrated) that manages data input and output of the data storages (not illustrated).

In order to output a result of video decoding, the video decoding apparatus 1700 may operate in connection with an internal video decoding processor or an external video decoding processor, so as to perform the video decoding operation including filtering. The internal video encoding processor of the video decoding apparatus 1700 may be an independent processor for performing a video decoding operation. Also, the video decoding apparatus 1700, the central processor, or a graphic processor may include a video decoding processing module to perform a basic video decoding operation.

The video decoding apparatus 1700 may be included in the video decoding apparatus 200 of FIG. 2. Specifically, the splitter 1710 may be included in the receiver 210, and the predictor 1720 and the decoder 1730 may be included in the image data decoder 230. Therefore, the descriptions provided above with reference to FIG. 2 will be omitted.

The splitter 1710 splits an image into at least one block. The term 'block' may refer to a largest coding unit, a coding unit, a transformation unit, or a prediction unit, which is split from an image to be encoded or decoded.

The predictor 1720 obtains a prediction value of a current sample by using a sample predicted earlier than the current sample in a current block split from an image. Specifically, the predictor 1720 may predict the current sample by using at least one of a value obtained by applying a first weight to a first sample predicted earlier than the current sample in the current block and being adjacent to the current sample in a horizontal direction and a value obtained by applying a second weight to a second sample predicted earlier than the current sample and being adjacent to the current sample in a vertical direction.

The decoder 1730 decodes an image. Specifically, the decoder 1730 may reconstruct the image by using the residual value of the current sample obtained from the bitstream and the prediction value of the current sample obtained by the predictor 1720.

Figure 18A:
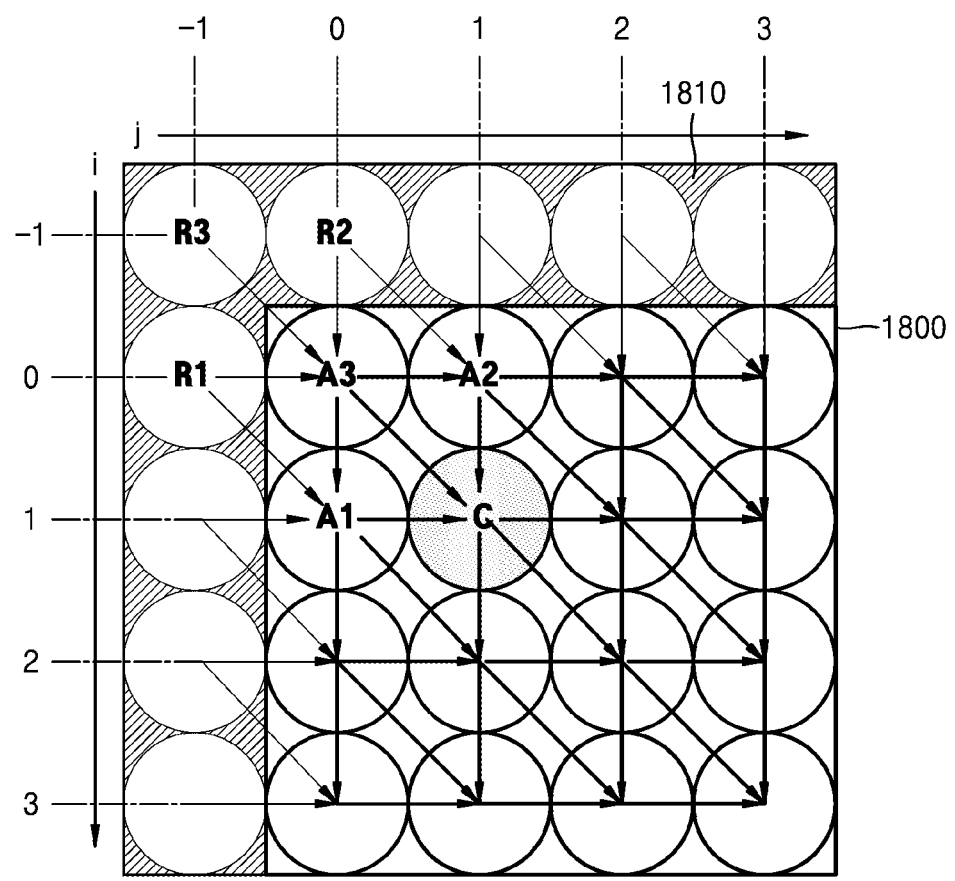
FIG. 18A illustrates an operation of sample-wise prediction to predict a current sample based on a sample already predicted in a current block.

FIG. 18A illustrates an operation of sample-wise prediction to predict a current sample based on a sample already predicted in a current block.

The predictors 1620 and 1720 may predict a current sample C based on at least one of samples A1, A2, and A3 adjacent to the current sample C in a current block 1800 split from an image and predicted earlier than the current sample C.

At least one adjacent sample used for predicting the current sample C from among the samples adjacent to the current sample C may change according to a prediction direction of the current block 1800 and a position of the current sample C in the current block 1800. For example, as illustrated in FIG. 18A, if the prediction is performed from a left upper side to a right lower side of the current block 1800, the current sample C may be predicted based on a prediction value of a sample A1 adjacent to a left side of the current sample C, a prediction value of a sample A2 adjacent to an upper side of the current sample C, and a prediction value of a sample A3 adjacent to a left upper side of the current sample C. Specifically, the predictors 1620 and 1720 may obtain a prediction value of the current sample C based on Equation 1 below:

$$p\text{Dest}[i,j]=(w_L(p\text{Dest}[i,j]) \cdot p\text{Dest}[i,j-1]+w_A(p\text{Dest}[i,j]) \cdot p\text{Dest}[i-1,j]+w_{AL}(p\text{Dest}[i,j]) \cdot p\text{Dest}[i-1,j-1]+ \text{offset})>>\text{shift(weighted average)};$$

$$(w_L(\text{pDest}[i,j])+w_A(\text{pDest}[i,j])+w_{AL}(\text{pDest}[i,j]))=(1<<\text{shift});$$

$$\text{offset}=(1<<(\text{shift}-1));$$

$$0 \le i \le H-1; 0 \le j \le W-1; \quad \text{[Equation 1]}$$

In Equation 1, pDest[i, j] may denote a sample of an $i^{th}$ row and a $j^{th}$ column in the current block. For example, the current sample C, the sample A1, the sample A2, and the sample A3 in FIG. 18A may correspond to pDest[1,1], pDest[0,1], pDest[1,0], and pDest[0,0], respectively. wL, wA, and wAL may denote weights applied to adjacent samples used to predict the current sample. The weights will be described below in detail with reference to FIGS. 21, 22, and 23. Also, shift and offset may correspond to parameters for compensating the weights. H may denote a height of the current block 1800, and W may denote a width of the current block 1800.

When the current sample is located at a boundary of the current block 1800, a sample used to predict the current sample may be a reference sample 1810 of the current block 1800. The reference sample 1810 may include a reconstructed sample included in at least one previous block reconstructed earlier than the current block 1800. Also, the reference sample 1810 may be adjacent to the boundary of the current block 1800. For example, as illustrated in FIG. 18A, if the prediction is performed from a left upper side to a right lower side of the current block 1800, the sample A3 may be predicted based on a reconstruction value of a reference sample R1 adjacent to a left side of the Sample A3, a reconstruction value of a reference sample R2 adjacent to an upper side of the sample A3, and a reconstruction value of a reference sample R3 adjacent to a left upper side of the sample A3.

If the reference sample 1810 is unavailable, the predictors 1620 and 1720 may perform reference sample padding. For example, the predictors 1620 and 1720 may fill an unavailable reference sample by using an available reference sample closest to the unavailable reference sample. As another example, if all reference samples are unavailable, the predictors 1620 and 1720 may fill all reference samples with a median value of an expressible brightness value range. As another example, the predictors 1620 and 1720 may perform reference sample padding based on Equation 2 below:

left boundary:$i=-1; 0 \leq j \leq H-1$;  (1)

$p\text{Dest}[i,j] = \Sigma f[m] \cdot p\text{Src}[-1, j+m]$;

top boundary:$j=-1; 0 \leq i \leq W-1$;  (2)

$p\text{Dest}[i,j] = \Sigma f[m] \cdot p\text{Src}[i+m, -1]$;

corner:$i=-1; j=-1$;  (3)

$p\text{Dest}[i,j] = (p\text{Dest}[0,-1] + p\text{Dest}[-1,0] + 1) >> 1$;  [Equation 2]

In Equation 2, pSrc[i, j] may denote a sample included in at least one previous block reconstructed earlier than the current block. pDest[i, −1] may denote reference samples adjacent to an upper side of the current block 1800, pDest [−1, j] may denote reference samples adjacent to a left side of the current block 1800, and pDest[−1, −1] may denote a reference sample adjacent to a left upper side of the current block 1800. For example, the reference sample R1, the reference sample R2, and the reference sample R3 may correspond to pDest[−1.0], pDest[0, −1], and pDest[−1, −1], respectively. Also, f[m] may correspond to a filter function, and m may correspond to an index indicating a filter coefficient. Therefore, the reference sample 1810 of the current block 1800 may be filled by filtering a reconstruction value of at least one sample included in a previous block. Characteristics of the filter function f[m] may be changed based on characteristics of an image. For example, the filter function f[m] may correspond to a low-pass filter, a high-pass filter, a band-pass filter, or the like. Also, the reference sample R3 may be filled with an average value of the reference sample R1 and the reference sample R2 closest to the reference sample R3.

If the current sample is predicted based on the sample already predicted in the same block, the encoding and decoding apparatuses and the encoding and decoding methods may perform adaptive prediction according to the position of the current sample, and encoding and decoding performance may be improved.

Figure 18B:
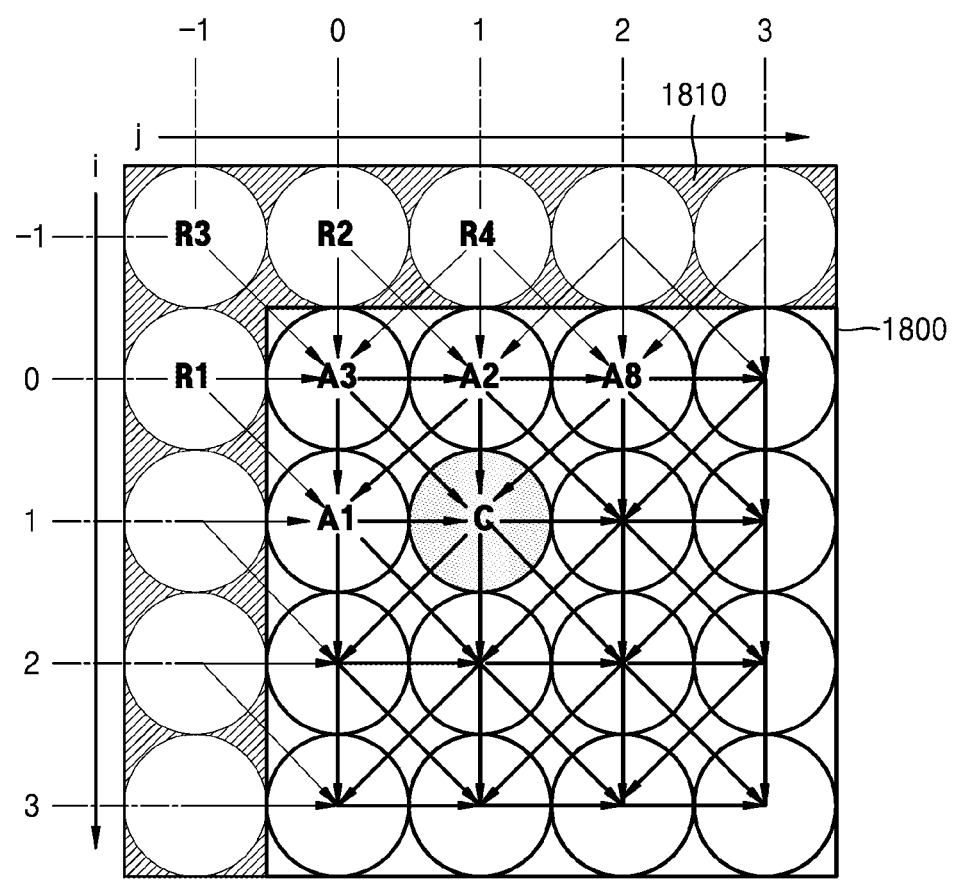
FIG. 18B illustrates another operation of sample-wise prediction to predict a current sample based on a sample already predicted in a current block.

FIG. 18B illustrates an operation of another sample-wise prediction to predict a current sample based on a sample already predicted in a current block.

The predictors 1620 and 1720 may predict a current sample C based on at least one of samples A1, A2, A3, and A8 adjacent to the current sample C in a current block 1800 split from an image and predicted earlier than the current sample C.

At least one adjacent sample used to predict the current sample C from among the samples adjacent to the current sample C may change according to a prediction direction of the current block 1800 and a position of the current sample C in the current block 1800. For example, as illustrated in FIG. 18B, if the prediction is performed from a left upper side to a right lower side of the current block 1800, the current sample C may be predicted based on a prediction value of the sample A1 adjacent to a left side of the current sample C, a prediction value of the sample A2 adjacent to an upper side of the current sample C, a prediction value of the sample A3 adjacent to a left upper side of the current sample C, and a prediction value of the sample A8 adjacent to a right upper side of the current sample C. Specifically, the predictors 1620 and 1720 may obtain a prediction value of the current sample C based on Equation 3 below:

$p\text{Des}[i,j] = w_L(p\text{Dest}[i,j]) \cdot p\text{Dest}[i, j-1] + w_A(p\text{Dest}[i,j])$
$\cdot p\text{Dest}[i-1, j] + w_{AL1}(p\text{Dest}[i,j]) \cdot p\text{Dest}[i-1, j-1] +$
$w_{AL2}(p\text{Dest}[i,j]) \cdot p\text{Dest}[i-1, j+1] + \text{offset}) >> \text{shift}$
(weighted average);

$w_L(p\text{Dest}[i,j]) + w_A(p\text{Dest}[i,j]) + w_{AL1}(p\text{Dest}[i,j]) + w_{AL2}$
$(p\text{Dest}[i,j])) = (1 << \text{shift})$;

offset$=(1<<(\text{shift}-1))$;

$0 \leq i \leq H-1; 0 \leq j \leq W-1$;  [Equation 3]

In Equation 3, pDest[i, j] may denote a sample of an $i^{th}$ row and a $j^{th}$ column in the current block. For example, the current sample C, the sample A1, the sample A2, the sample A3, and the sample A8 in FIG. 18B may correspond to pDest[1,1], pDest[0,1], pDest[1,0], pDest[0,0], and pDest[0, 2], respectively. wL, wA, wAL1, and wAL2 may denote weights applied to adjacent samples used to predict the current sample. The weights will be described below in detail with reference to FIGS. 21, 22, and 23. Also, shift and offset may correspond to parameters for compensating the weights. H may denote a height of the current block 1800, and W may denote a width of the current block 1800.

When the current sample is located at a boundary of the current block 1800, a sample used to predict the current sample may be a reference sample 1810 of the current block 1800. The reference sample 1810 may include a reconstructed sample included in at least one previous block reconstructed earlier than the current block 1800. Also, the reference sample 1810 may be adjacent to the boundary of the current block 1800. For example, as illustrated in FIG. 18A, if the prediction is performed from a left upper side to a right lower side of the current block 1800, the sample A3 may be predicted based on a reconstruction value of the reference sample R1 adjacent to a left side of the Sample A3, a reconstruction value of the reference sample R2 adjacent to an upper side of the sample A3, a reconstruction value of the reference sample R3 adjacent to a left upper side of the sample A3, and a reconstruction value of a reference sample A4 adjacent to a right upper side of the sample A3.

Figure 19:
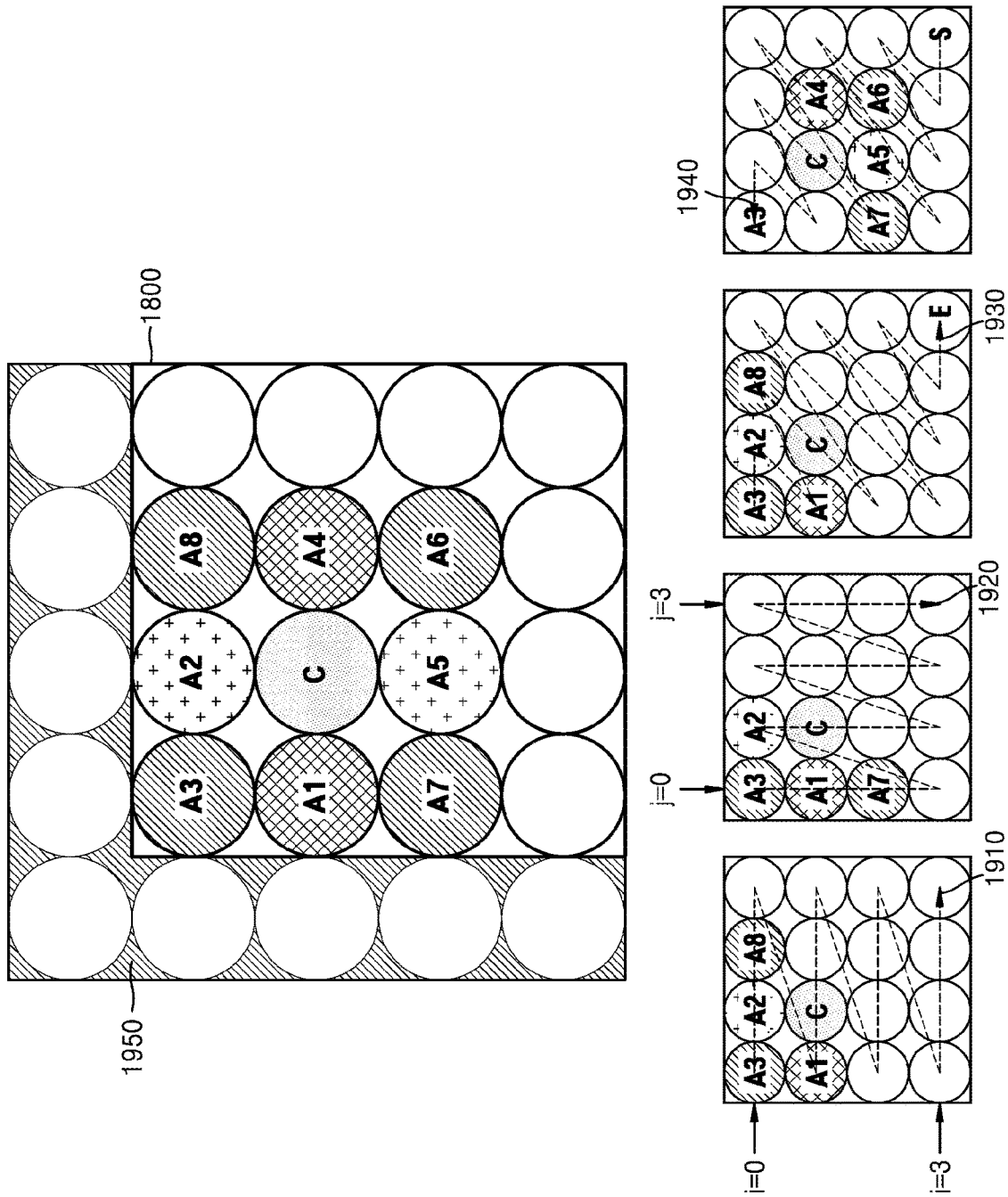
FIG. 19 illustrates adjacent samples available for predicting a current sample.

FIG. 19 illustrates adjacent samples available for predicting a current sample.

As described above, the current sample C may be predicted by using at least one of the adjacent samples A1, A2, A3, A4, A5, A6, A7, and A8 of the current sample C. The adjacent samples A1, A2, A3, A4, A5, A6, A7, and A8 of the current sample C may include samples closest to the current sample C, such as the samples A1 and A4 adjacent to the current sample C in a horizontal direction and the samples A2 and A5 adjacent to the current sample C in a vertical direction. Also, the adjacent samples of the current sample C may include samples adjacent to the current sample C in a diagonal direction, such as the sample A3 adjacent to a left upper side of the current sample C, the sample A6 adjacent to a right lower side of the current sample C, the sample A7 adjacent to a left lower side of the current sample C, and the sample A8 adjacent to a right upper side of the current sample C.

The predictors 1620 and 1720 may determine at least one sample for predicting the current sample C from among the adjacent samples A1, A2, A3, A4, A5, A6, A7, and A8 of the current sample C within the current block 1800 and reference samples 1950 of the current block 1800 outside the current block 1800 For example, as illustrated in FIG. 19, when the current sample C in the current block 1800 is not located at the boundary of the current block 1800 having a size of 4×4, the predictors 1620 and 1720 may determine at least one adjacent sample for predicting the current sample C from among a left adjacent sample A1, an upper adjacent sample A2, a left upper adjacent sample A3, a right adjacent sample A4, a lower adjacent sample A5, a right lower adjacent sample A6, a left lower adjacent sample A7, and a right upper adjacent sample A8, which are located in the current block 1800. In another example, when the current sample C is located at the boundary of the current block 1800 like the sample A3, the predictors 1620 and 1720 may determine at least one adjacent sample for predicting the current sample C from among the reference samples 1950 of the current block 1800. The prediction using the reference sample will be described in detail with reference to FIGS. 23 through 26.

The predictors 1620 and 1720 may determine at least one adjacent sample for predicting the current sample C from among the adjacent samples A1, A2, A3, A4, A5, A6, A7, and A8 of the current sample C based on the prediction order in the current block 1800. Since the current sample c can be predicted by using the sample whose prediction order is ahead of the prediction order of the current sample C, the adjacent sample available for predicting the current sample may change according to the prediction order in the current block.

For example, when horizontal prediction 1910 is sequentially performed from an uppermost row (i=0) to a lowermost row (i=3) in the current block 1800 having a size of 4×4, at least one of the left adjacent sample A1, the upper adjacent sample A2, the left upper adjacent sample A3, and the right upper adjacent sample A8 of the current sample C may be used to predict the current sample C.

In another example, when vertical prediction 1920 is sequentially performed from a leftmost column (j=0) to a rightmost column (j=3) in the current block 1800 having a size of 4×4, at least one of the left adjacent sample A1, the upper adjacent sample A2, the left upper adjacent sample A3, and the left lower adjacent sample A7 of the current sample C may be used to predict the current sample C.

In another example, when left lower diagonal prediction 1930 is sequentially performed from a leftmost upper sample A3 to a rightmost lower sample E in the current block 1800 having a size of 4×4, at least one of the left adjacent sample A1, the upper adjacent sample A2, the left upper adjacent sample A3, and the right upper adjacent sample A8 of the current sample C may be used to predict the current sample C.

In another example, when right upper diagonal prediction 1940 is sequentially performed from a rightmost lower sample S to a leftmost upper sample A3 in the current block 1800 having a size of 4×4, at least one of the right adjacent sample A4, the lower adjacent sample A5, the right lower adjacent sample 63, and the left lower adjacent sample A7 of the current sample C may be used to predict the current sample C.

The prediction direction of the current block 1800 is not limited to the horizontal prediction 1910, the vertical prediction 1920, the left lower diagonal prediction 1930, and the right upper diagonal prediction 1940 of FIG. 19. The samples used to predict the current sample C may change based on the position of the current sample C in the current block 1800 and the prediction direction of the current block 1800.

Figure 20:
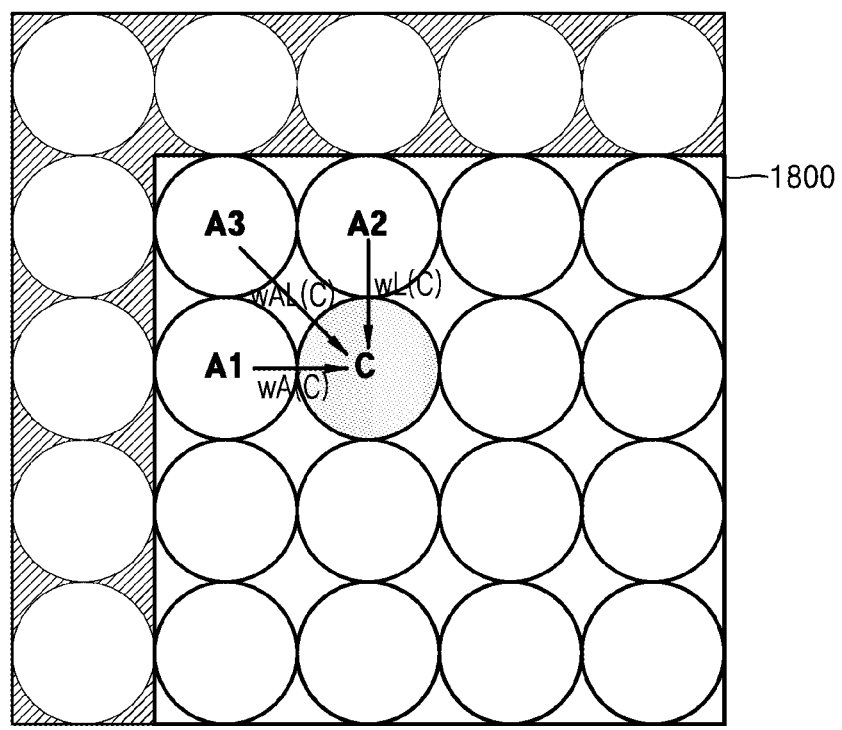
FIG. 20 illustrates weights applied to adjacent samples.

FIG. 20 illustrates weights applied to adjacent samples.

The predictors 1620 and 1720 may predict the current sample C by using the value obtained by applying the weight to the adjacent sample.

The predictors 1620 and 1720 may predict the current sample C by applying a preset weight to the adjacent sample of the current sample C. For example, the predictors 1620 and 1720 may predict the current sample C by applying the same weight to the sample adjacent to the current sample C in a horizontal direction and the sample adjacent to the current sample C in a vertical direction.

The predictors 1620 and 1720 may determine the weight applied to the adjacent samples based on a direction in which the adjacent sample of the current sample C is adjacent to the current sample C. The weight applied to the sample adjacent to the current sample C in a horizontal direction and the weight applied to the sample adjacent to the current sample C in a vertical direction may be independent of each other. The predictors 1620 and 1720 may obtain a vertical gradient in the current block 1800 and determine the weight applied to the sample adjacent to the current sample C in a horizontal direction based on the obtained vertical gradient. The vertical gradient of the current block 1800 may denote a numerical index indicating whether samples in the current block 1800 has consistency in a vertical direction. For example, the predictors 1620 and 1720 may obtain the vertical gradient in the current block 1800 by using a difference value of samples adjacent in a vertical direction in the current block 1800. The predictors 1620 and 1720 may obtain a vertical gradient in the current block 1800 and determine the weight applied to the sample adjacent to the current sample C in a horizontal direction based on the obtained vertical gradient. The horizontal gradient of the current block 1800 may denote a numerical index indicating whether samples in the current block 1800 has consistency in a horizontal direction. For example, the indictors 1620 and 1720 may obtain the horizontal gradient in the current block 1800 by using a difference value of samples adjacent in a horizontal direction in the current block 1800. The vertical gradient and the horizontal gradient of the current block 1800 will be described in detail with reference to FIGS. 21 through 22.

For example, when the horizontal prediction 1910, the vertical prediction 1920, or the left lower diagonal prediction 1930 are performed on the current block 1800, the predictors 1620 and 1720 may predict the current sample C by using at least one of a value obtained by applying a first weight wA(C) to a left adjacent sample A1 of the current sample C, a value obtained by applying a second weight wL(C) to an upper adjacent sample A2 of the current sample C, and a value obtained by applying a third weight wAL(C) to a left upper sample A3 of the current sample C.

The predictors 1620 and 1720 may predict the current sample C by using the preset first weight wA(C), the preset second weight wL(C), and the preset third weight wAL(C). For example, the predictors 1620 and 1720 may set the first weight wA(C), the second weight wL(C), and the third weight wAL(C) of Equation 1 based on Equation 4 below:

$$w_L(p\text{Dest}[i,j])=w_A(p\text{Dest}[i,j])=w;$$

$$(w_L(p\text{Dest}[i,j])+w_A(p\text{Dest}[i,j])+w_{AL}(p\text{Dest}[i,j]))=<<\text{shift});$$

$$w_{AL}=2^{shift}-2w; \quad\quad \text{[Equation 4]}$$

In Equation 4, shift may be the same as shift of Equation 1 and may be a parameter for compensating the weights applied to the adjacent samples A1, A2, and A3 of the current sample C. Specifically, the predictors 1620 and 1720 may preset the first weight wA(C) and the second weight wL(C) to have the same value and set the third weight wAL(C) based on the first weight wL(C), the second weight WA(C), and the weight compensation parameter shift.

The predictors 1620 and 1720 may set the first weight wA(C), the second weight wL(C), and the third weight wAL(C) based on a direction in which the adjacent sample of the current sample C is adjacent to the current sample C. For example, the predictors 1620 and 1720 may set the first weight wA(C), the second weight wL(C), and the third weight wAL(C) based on Equation 5 below:

$$w_L(p\text{Dest}[i,j]) \propto p\text{Dest}[i,j-1] - p\text{Dest}[i-1,j-1];$$

$$w_A(p\text{Dest}[i,j]) \propto p\text{Dest}[i,-1j] - p\text{Dest}[i-1,j-1];$$

$$(w_L(p\text{Dest}[i,j]) + w_A(p\text{Dest}[i,j]) + w_{AL}(p\text{Dest}[i,j])) = (1 << \text{shift});$$

$$w_{AL}(p\text{Dest}[i,j]) = 2^{shift} - w_L(p\text{Dest}[i,j]) - w_A(p\text{Dest}[i,j]); \quad [\text{Equation 5}]$$

Specifically, the predictors 1620 and 1720 may determine the first weight wA(C) applied to the left adjacent sample A1 of the current sample C based on a vertical gradient between the left adjacent sample A3 of the current sample C and the left upper adjacent sample A3 of the current sample C. As the vertical gradient value of the current block 1800 increases, the vertical consistency of the samples in the current block 1800 decreases. Thus, the first weight wA(C), which is the horizontal weight, may increase. Also, the predictors 1620 and 1720 may determine the second weight wL(C) applied to the upper sample A2 of the current sample C based on a horizontal gradient between the upper adjacent sample A2 of the current sample C and the left upper adjacent sample A3 of the current sample C. As the horizontal gradient value of the current block 1800 increases, the horizontal consistency of the samples in the current block 1800 decreases. Thus, the second weight wL(C), which is the vertical weight, may increase. In Equation 5, shift may be the same as shift of Equation 1 and may be a parameter for compensating the weights applied to the adjacent samples A1, A2, and A3 of the current sample C. Also, the predictors 1620 and 1720 may set the third weight wAL(C) based on the first weight wL(C), the second weight wA(C), and the weight compensation parameter shift.

As in Equation 3, when a plurality of diagonal adjacent samples A3 and A8 that are adjacent to the current sample C in a diagonal direction are used to predict the current sample C, the predictors may apply the same weight to the diagonal weight adjacent samples A3 and A8. For example, the weight wAL1 applied to the sample A3 adjacent to the current sample C in a left upper diagonal direction and the weight wAL2 applied to the sample A8 adjacent to the current sample C in a right upper diagonal direction may be set to have the same value.

Figure 21:
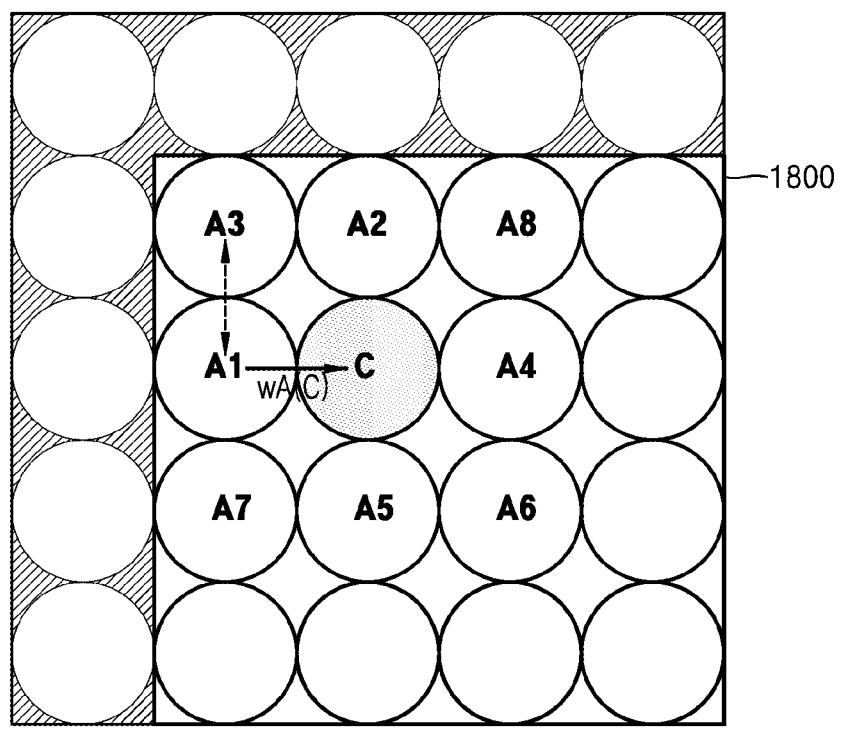
FIG. 21 illustrates a first weight applied to a sample adjacent to a current sample in a horizontal direction.

FIG. 21 illustrates the first weight applied to the sample adjacent to the current sample in the horizontal direction.

The first weight wA(C) may be proportional to a difference value between the sample A1 predicted earlier than the current sample C in the current block 1800 and being adjacent to the current sample C in the horizontal direction and the sample A3 predicted earlier than the current sample C in the current block 1800 and being adjacent to the current sample in the diagonal direction.

For example, when the prediction is performed from a left upper side to a right lower side of the current block 1800 as illustrated in FIG. 18A, the predictors 1620 and 1720 may obtain a vertical gradient based on the left adjacent sample A1 of the current sample C and the left upper adjacent sample A3 of the current block C and obtain the first weight wA(C) applied to the left adjacent sample A1 of the current sample C based on the obtained vertical gradient. As the vertical gradient of the current block 1800 increases, the first weight wA(C) may increase.

The vertical gradient of the current block 1800 may change according to a prediction direction of the current block 1800. Specifically, the vertical gradient of the current block 1800 may be obtained by using samples predicted earlier than the current sample C in the current block 1800. For example, the vertical gradient may be a difference between the left adjacent sample A1 and the left upper adjacent sample A3 of the current sample C, a difference between the left adjacent sample A1 and the left lower adjacent sample A7, a difference between the upper adjacent sample A2 and the lower adjacent sample A5, a difference between the right adjacent sample A4 and the right upper adjacent sample A8, or a difference between the right adjacent sample A4 and the right lower adjacent sample A6, according to the prediction direction of the current block 1800.

Figure 22:
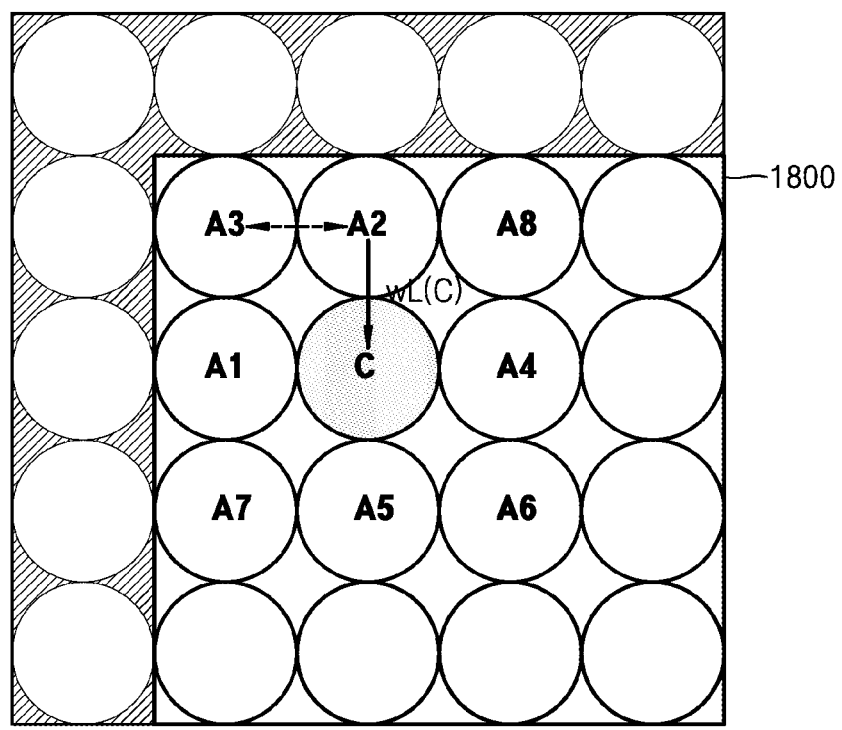
FIG. 22 illustrates a second weight applied to a sample adjacent to a current sample in a vertical direction.

FIG. 22 illustrates the second weight applied to the sample adjacent to the current sample in the vertical direction.

The second weight wL(C) may be proportional to a difference value between the sample A2 predicted earlier than the current sample C in the current block 1800 and being adjacent to the current sample C in the vertical direction and the sample A3 predicted earlier than the current sample C in the current block 1800 and being adjacent to the current sample in the diagonal direction.

For example, when the prediction is performed from a left upper side to a right lower side of the current block 1800 as illustrated in FIG. 18A, the predictors 1620 and 1720 may obtain a horizontal gradient based on the upper adjacent sample A2 of the current sample C and the left upper adjacent sample A3 of the current block C and obtain the second weight wL(C) applied to the upper adjacent sample A2 of the current sample C based on the obtained horizontal gradient. As the horizontal gradient of the current block 1800 increases, the second weight wL(C) may increase.

The horizontal gradient of the current block 1800 may change according to a prediction direction of the current block 1800. Specifically, the horizontal gradient of the current block 1800 may be obtained by using samples predicted earlier than the current sample C in the current block 1800. For example, the horizontal gradient may be a difference between the upper adjacent sample A2 and the left upper adjacent sample A3 of the current sample C, a difference between the upper adjacent sample A2 and the right upper adjacent sample A8, a difference between the left adjacent sample A1 and the right adjacent sample A4, a difference between the left lower adjacent sample A7 and the lower upper adjacent sample A5, or a difference between the lower adjacent sample A5 and the right lower adjacent sample A6, according to the prediction direction of the current block 1800.

Figure 23:
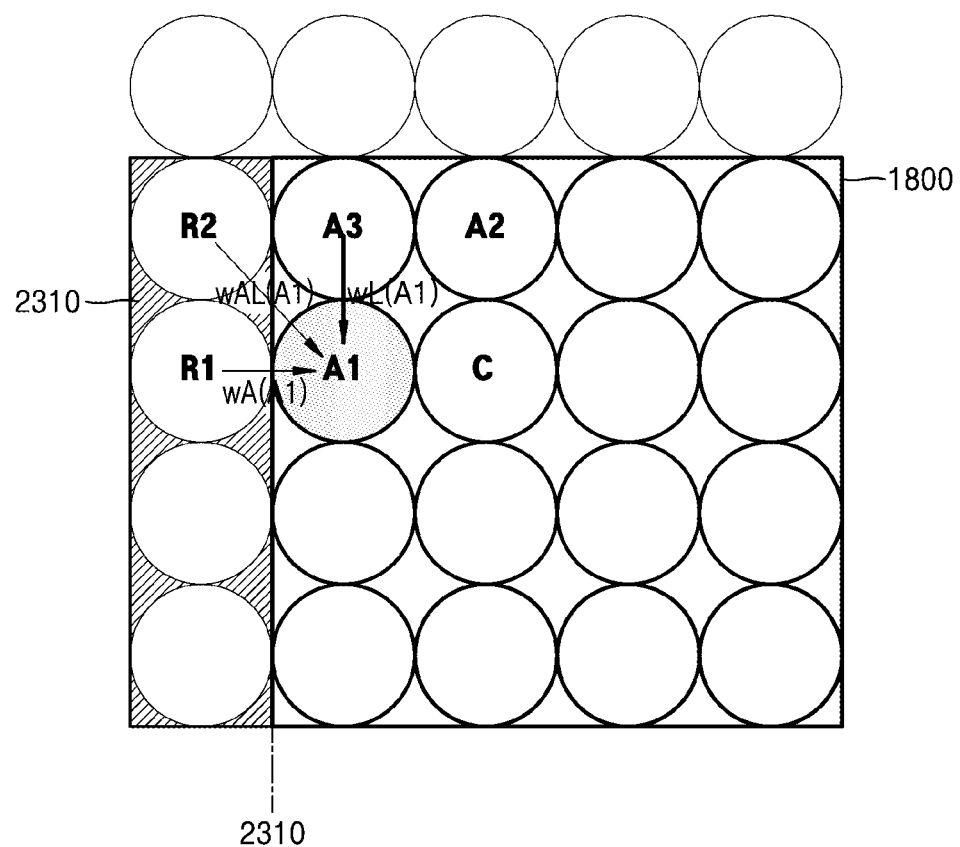
FIG. 23 illustrates an operation of predicting a sample located at a vertical boundary of a current block.

FIG. 23 illustrates an operation of predicting a sample located at a vertical boundary of a current block.

A sample located at a vertical boundary 2310 of a current block 1800 may be predicted by using at least one reference sample 2320 adjacent to the vertical boundary 2310 of the current block 1800. Specifically, the sample located at the vertical boundary 2310 of the current block 1800 may be predicted by using a value obtained by applying a weight to at least one reference sample 2320 outside the current block 1800 and adjacent to the sample in the horizontal direction.

For example, when the left adjacent sample A1 (hereinafter, referred to as an A1 sample) of the current sample C is located at the vertical boundary 2310 on the left side of the current block 1800, the A1 sample may be predicted by using at least one of a value obtained by applying a fourth weight wA(A1) to a first reference sample R1 (hereinafter, referred to as an R1 sample) outside the current block 1800 and adjacent to the A1 sample in the horizontal direction and a value obtained by applying a fifth weight wL(A1) to an upper adjacent sample A3 (hereinafter, referred to as an A3 sample) of the current sample C.

The fourth weight wA(A1) may be obtained based on the vertical gradient of the current block 1800. For example, the fourth weight wA(A1) may be proportional to a difference value between a second reference sample R2 (hereinafter, referred to as an R2 sample) outside the current block 1800 and adjacent to a left upper side of the A1 sample and the R1 sample.

Also, the fifth weight wL(A1) may be obtained based on the horizontal gradient of the current block 1800. For example, the fifth weight wL(A1) may be proportional to a difference value between the A3 sample and the R2 sample.

Also, the predictors 1620 and 1720 may determine a sixth weight wAL(A1) based on the fourth weight wA(A1) and the fifth weight wL(A1) and predict the A1 sample by using the value obtained by applying the sixth weight wAL(A1) to the R2 sample.

Figure 24:
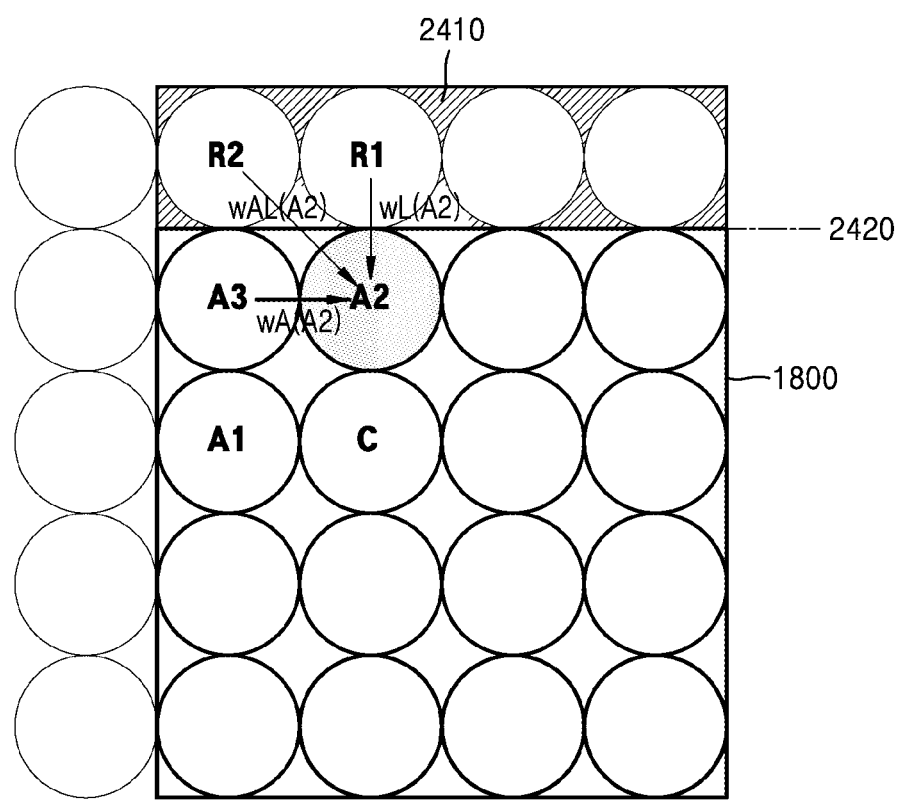
FIG. 24 illustrates an operation of predicting a sample located at a horizontal boundary of a current block.

FIG. 24 illustrates an operation of predicting a sample located at a horizontal boundary of a current block.

A sample located at a horizontal boundary 2420 of a current block 1800 may be predicted by using at least one reference sample 2421 adjacent to the horizontal boundary 2420 of the current block 1800. Specifically, the sample located at the horizontal boundary 2420 of the current block 1800 may be predicted by using a value obtained by applying a weight to at least one reference sample 2410 outside the current block 1800 and adjacent to the sample in the vertical direction.

For example, when an upper adjacent sample A2 (hereinafter, referred to as an A2 sample) of the current sample C is located at the horizontal boundary 2420 on an upper side of the current block 1800, the A2 sample may be predicted by using at least one of a value obtained by applying a fourth weight wA(A2) to a first reference sample R1 (hereinafter, referred to as an R1 sample) outside the current block 1800 and adjacent to the A2 sample in the vertical direction and a value obtained by applying a fifth weight wL(A2) to a left upper adjacent sample A3 (hereinafter, referred to as an A3 sample) of the current sample C.

The fourth weight wA(A2) may be obtained based on a vertical gradient of the current block 1800. For example, the fourth weight wA(A2) may be proportional to a difference value between a second reference sample R2 (hereinafter, referred to as an R2 sample) outside the current block 1800 and adjacent to a left upper side of the A2 sample and the R1 sample.

Also, the fifth weight wL(A2) may be obtained based on the horizontal gradient of the current block 1800. For example, the fifth weight wL(A2) may be proportional to a difference value between the R1 sample and the R2 sample.

Also, the predictors 1620 and 1720 may determine a sixth weight wAL(A2) based on the fourth weight wA(A2) and the fifth weight wL(A2) and predict the A2 sample by using the value obtained by applying the sixth weight wAL(A) to the R2 sample.

Figure 25:
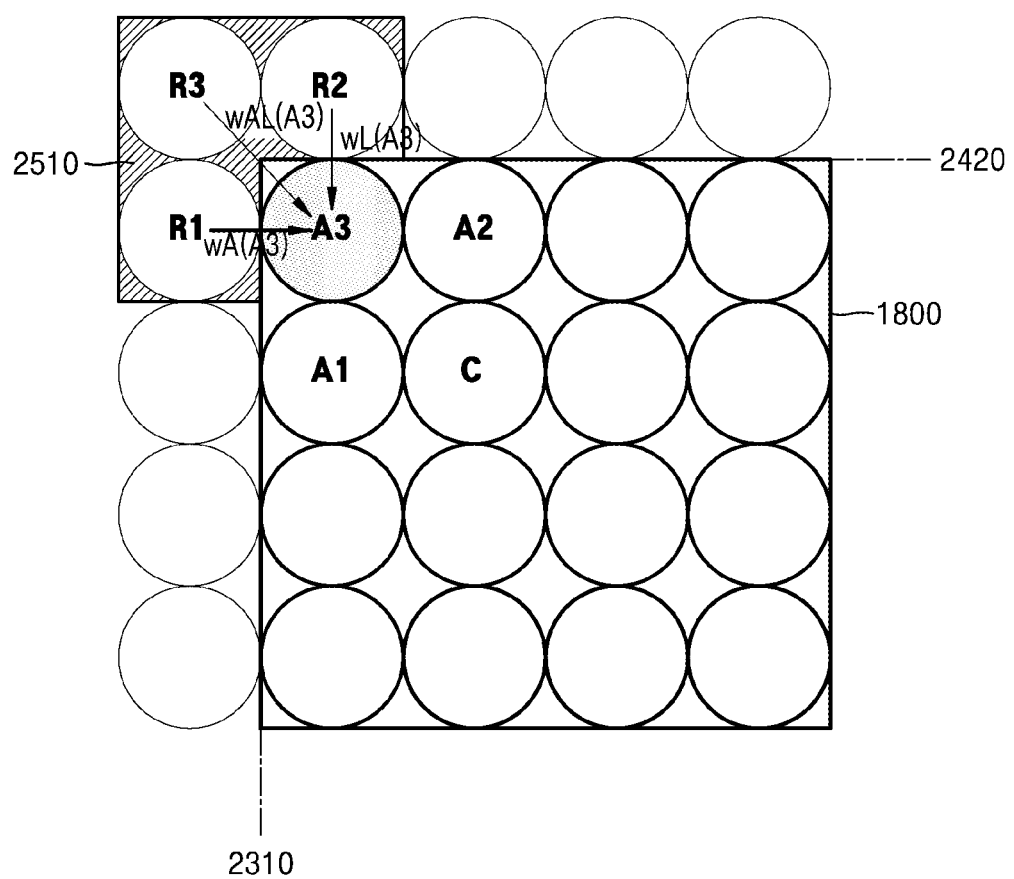
FIG. 25 illustrates an operation of predicting a sample located at a corner of a current block.

FIG. 25 illustrates an operation of predicting a sample located at a corner of a current block.

A sample located at a corner of a current block 1800 may be predicted by using at least one reference sample 2510 adjacent to a horizontal boundary 2420 or a vertical boundary 2310 of the current block 1800. Specifically, the sample located at the corner of the current block 1800 may be predicted by using a value obtained by applying a weight to at least one reference sample 2510 outside the current block 1800 and adjacent to the sample in the vertical direction or the horizontal direction.

For example, when a left upper adjacent sample A3 (hereinafter, referred to as an A3 sample) of the current sample C is located at a corner where the horizontal boundary 2420 on an upper side of the current block 1800 and the vertical boundary 2310 on a left side of the current block 1800 meet each other, the A3 sample may be predicted by using at least one of a value obtained by applying a fourth weight wA(A3) to a first reference sample R1 (hereinafter, referred to as an R1 sample) outside the current block 1800 and adjacent to the A3 sample in a horizontal direction and a value obtained by applying a fifth weight wL(A3) to a second reference sample R2 (hereinafter, referred to as an R2 sample) outside the current block 1800 and adjacent to the A3 sample in a vertical direction.

The fourth weight wA(A3) may be obtained based on a vertical gradient of the current block 1800. For example, the fourth weight wA(A3) may be proportional to a difference value between a third reference sample R3 (hereinafter, referred to as an R3 sample) outside the current block 1800 and adjacent to a left upper side of the A3 sample and the R1 sample.

Also, the fifth weight wL(A3) may be obtained based on a horizontal gradient of the current block 1800. For example, the fifth weight wL(A3) may be proportional to a difference value between the R1 sample and the R3 sample.

Also, the predictors 1620 and 1720 may determine a sixth weight wAL(A3) based on the fourth weight wA(A3) and the fifth weight wL(A3) and predict the A3 sample by using the value obtained by applying the sixth weight wAL(A) to the R3 sample.

Figure 26:
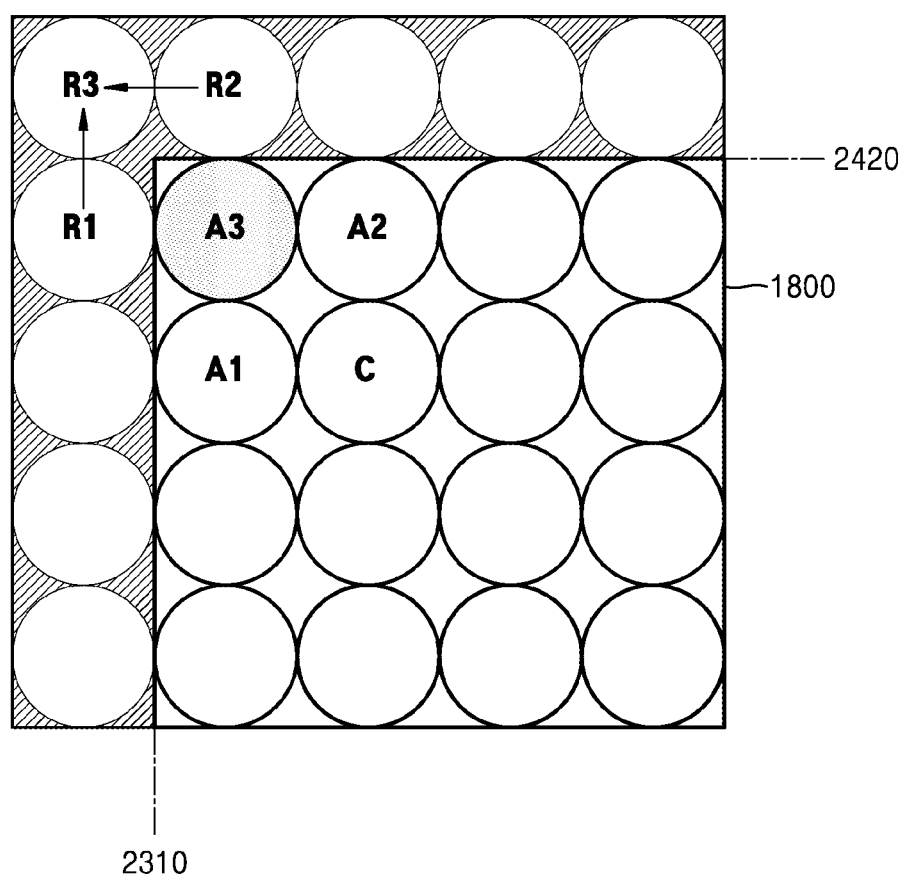
FIG. 26 illustrates an operation of performing reference sample padding.

FIG. 26 illustrates an operation of performing reference sample padding.

As described above with reference to FIG. 18A, if the reference sample is unavailable, the predictors 1620 and 1720 may perform reference sample padding. For example, if a reference sample R3 adjacent to the corner where the horizontal boundary 2420 on the upper side of the current block 1800 and the vertical boundary 2310 on the left side of the current block 1800 meet each other (hereinafter, referred to as an R3 reference sample) is unavailable, the R3 reference sample may be filled with an average value of the R1 reference sample and the R2 reference sample closest to the R3 reference sample.

Figure 27:
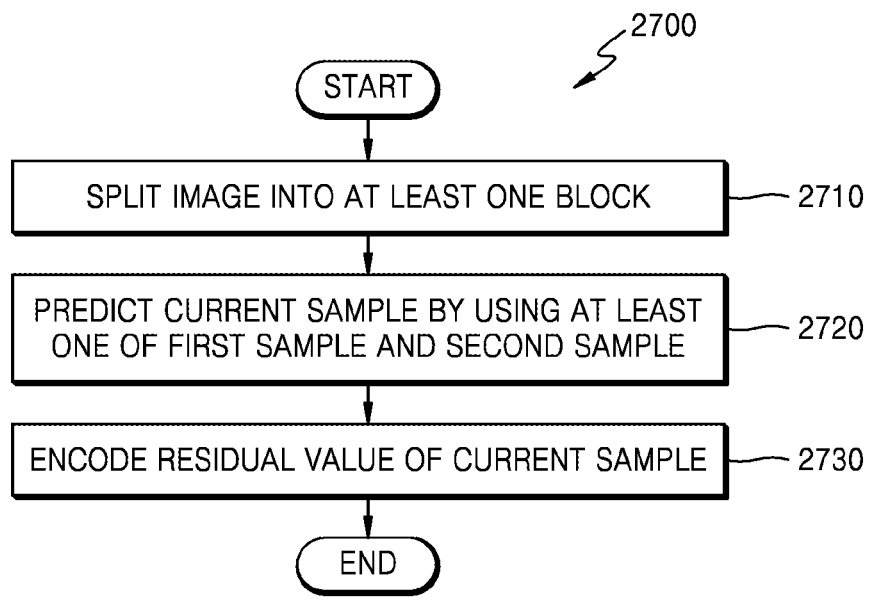
FIG. 27 is a flowchart of a video encoding method that can perform sample-wise prediction based on an already predicted adjacent sample.

FIG. 27 is a flowchart of a video encoding method that can perform sample-wise prediction based on an already predicted adjacent sample.

In operation 2710, a video encoding method 2700 splits an image into at least one block. The term 'block' may refer to a largest coding unit, a coding unit, a transformation unit, or a prediction unit, which is split from an image to be encoded or decoded. The type of the block may be a square, a rectangle, or any geometric shape. The block is not limited to a data unit having a constant size. Operation 2710 may be performed by the splitter 1610 of the video encoding apparatus 1600.

In operation 2720, the video encoding method 2700 obtains a prediction value of a current sample by using at least one sample predicted earlier than the current sample in a current block split from an image. Specifically, the current sample may be predicted by using at least one of a value obtained by applying a first weight to a first sample predicted earlier than the current sample in the current block and being adjacent to the current sample in a horizontal direction and a value obtained by applying a second weight to a second sample predicted earlier than the current sample and being adjacent to the current sample in a vertical direction. Operation 2720 may be performed by the predictor 1620 of the video encoding apparatus 1600.

In operation 2730, the video encoding method 2700 encodes a residual value of the current sample. Specifically, the video encoding method 2700 may obtain a residual value between an original value of the current sample and a prediction value of the current sample obtained in operation 2730, transform the residual value of the current sample, perform entropy encoding on the transformed residual value, and output the entropy-encoded residual value in a bitstream. Operation 2730 may be performed by the encoder 1630 of the video encoding apparatus 1600.

Figure 28:
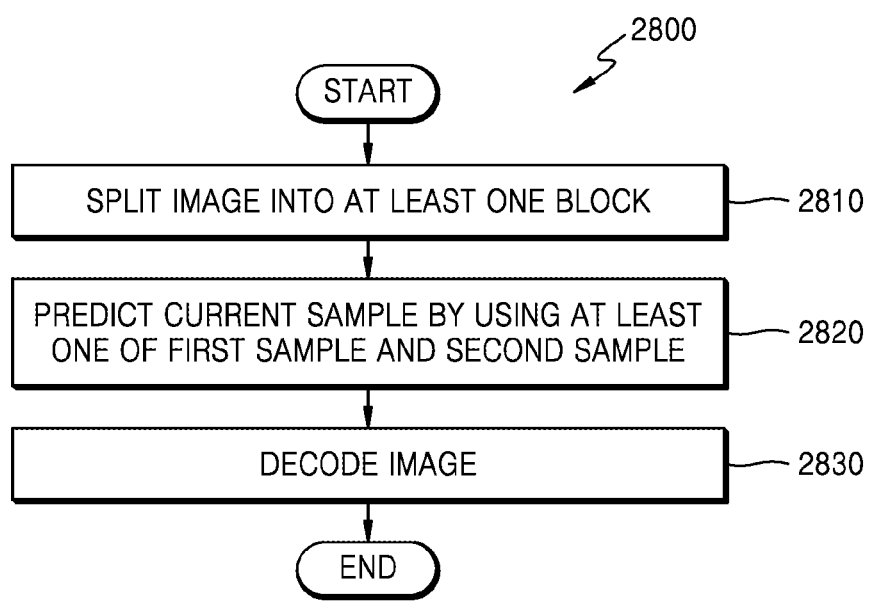
FIG. 28 is a flowchart of a video decoding method that can perform sample-wise prediction based on an already predicted adjacent sample.

FIG. 28 is a flowchart of a video decoding method that can perform sample-wise prediction based on an already predicted adjacent sample.

In operation 2810, a video decoding method 2800 splits an image into at least one block. The term 'block' may refer to a largest coding unit, a coding unit, a transformation unit, or a prediction unit, which is split from an image to be encoded or decoded. The type of the block may be a square, a rectangle, or any geometric shape. The block is not limited to a data unit having a constant size. Operation 2810 may be performed by the splitter 1710 of the video decoding apparatus 1700.

In operation 2820, the video decoding method 2800 obtains a prediction value of a current sample by using at least one sample predicted earlier than the current sample in a current block split from an image. Specifically, the current sample may be predicted by using at least one of a value obtained by applying a first weight to a first sample predicted earlier than the current sample in the current block and being adjacent to the current sample in a horizontal direction and a value obtained by applying a second weight to a second sample predicted earlier than the current sample and being adjacent to the current sample in a vertical direction. Operation 2820 may be performed by the predictor 1720 of the video decoding apparatus 1700.

In operation 2830, the video decoding method 2800 decodes the image Specifically, the video decoding method may reconstruct the image by using the residual value of the current sample obtained from the bitstream and the prediction value of the current sample obtained in operation 2820. Operation 2830 may be performed by the decoder 1730 of the video decoding apparatus 1700.

Figure 29:
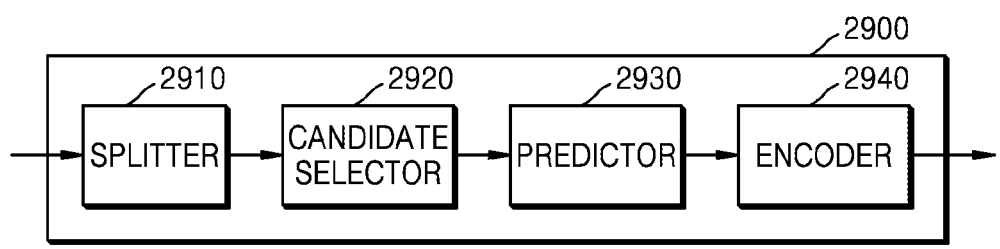
FIG. 29 illustrates a block diagram of a video encoding apparatus that can perform sample-wise prediction based on an already reconstructed sample.

FIG. 29 illustrates a block diagram of a video encoding apparatus that can perform sample-wise prediction based on an already reconstructed sample.

A video encoding apparatus 2900 may include a splitter 2910, a candidate selector 2920, a predictor 2930, and an encoder 2940. The video encoding apparatus 2900 may include a central processor (not illustrated) that collectively controls the splitter 2910, the candidate selector 2920, the predictor 2930, and the encoder 2940. Alternatively, the splitter 2910, the candidate selector 2920, the predictor 2930, and the encoder 2940 may be driven by their individual processors (not illustrated) that interoperate with one another to collectively control the video encoding apparatus 2900. Alternatively, the splitter 2910, the candidate selector 2920, the predictor 2930, and the encoder 2940 may be controlled under control of an external processor (not illustrated) disposed outside the video encoding apparatus 2900.

The video encoding apparatus 2900 may include one or more data storages (not illustrated) that store input and output data of the splitter 2910, the candidate selector 2920, the predictor 2930, and the encoder 2940. The video encoding apparatus 2900 may include a memory controller (not illustrated) that manages data input and output of the data storages (not illustrated).

In order to output a result of video encoding, the video encoding apparatus 2900 may operate in connection with an internal video encoding processor or an external video encoding processor, so as to perform the video encoding operation including prediction. The internal video encoding processor of the video encoding apparatus 2900 may be an independent processor for performing a video encoding operation. Also, the video encoding apparatus 2900, the central processor, or a graphic processor may include a video encoding processing module to perform a basic video encoding operation.

The video encoding apparatus 2900 may be included in the video encoding apparatus 100 of FIG. 1. Specifically, the splitter 2910 may be included in the largest coding unit splitter 110 and the coding unit determiner 120, the candidate selector 2920 and the predictor 2930 may be included in the intra predictor 420, and the encoder 2940 may be included in the transformer 425, the quantizer 430, and the entropy encoder 435. Therefore, the descriptions provided above with reference to FIGS. 1 and 4 will be omitted.

The splitter 2910 splits an image into at least one block. The term 'block' may refer to a largest coding unit, a coding unit, a transformation unit, or a prediction unit, which is split from an image to be encoded or decoded.

The type of the block may be a square, a rectangle, or any geometric shape. The block is not limited to a data unit having a constant size.

The candidate selector 2920 selects at least one adjacent sample adjacent to the current sample in the current block. Also, the candidate selector 2920 may select a first candidate sample adjacent to a candidate adjacent sample having a closest value to the adjacent sample of the current sample from among a plurality of candidate samples included in at least one previous block reconstructed earlier than the current block.

The predictor 2930 obtains a prediction value of the current sample by using the first candidate sample selected by the candidate selector 2920. Specifically, the predictor 2930 may obtain the prediction value of the current sample by using a reconstruction value of the first candidate sample included in the previous block reconstructed earlier than the current block.

The encoder 2940 encodes a residual value of the current sample. Specifically, the encoder 2940 may obtain a residual value between an original value of the current sample and a prediction value of the current sample obtained by the predictor 2930, transform the residual value of the current sample, perform entropy encoding on the transformed residual value, and output the entropy-encoded residual value in a bitstream.

Figure 30:
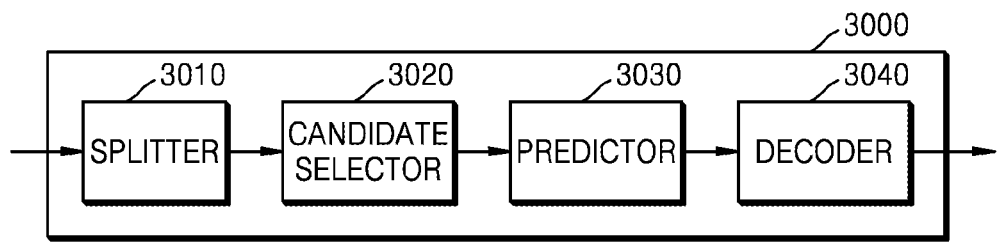
FIG. 30 illustrates a block diagram of a video decoding apparatus that can perform sample-wise prediction based on an already reconstructed sample.

FIG. 30 illustrates a block diagram of a video decoding apparatus that can perform sample-wise prediction based on an already reconstructed sample.

A video decoding apparatus 3000 may include a splitter 3010, a candidate selector 3020, a predictor 3030, and a decoder 3040. The video decoding apparatus 3000 may include a central processor (not illustrated) that collectively controls the splitter 3010, the candidate selector 3020, the predictor 3030, and the decoder 3040. Alternatively, the splitter 3010, the candidate selector 3020, the predictor 3030, and the decoder 3040 may be driven by their individual processors (not illustrated) that interoperate with one another to collectively control the video decoding apparatus 3000. Alternatively, the splitter 3010, the candidate selector 3020, the predictor 3030, and the decoder 3040 may be controlled under control of an external processor (not illustrated) disposed outside the video decoding apparatus 3000.

The video decoding apparatus 3000 may include one or more data storages (not illustrated) that store input and output data of the splitter 3010, the candidate selector 3020, the predictor 3030, and the decoder 3040. The video decoding apparatus 3000 may include a memory controller (not illustrated) that manages data input and output of the data storages (not illustrated).

In order to output a result of video decoding, the video decoding apparatus 3000 may operate in connection with an internal video encoding processor or an external video encoding processor, so as to perform the video decoding operation including prediction. The internal video decoding processor of the video decoding apparatus 3000 may be an independent processor for performing a video decoding operation. Also, the video decoding apparatus 3000, the central processor, or a graphic processor may include a video decoding processing module to perform a basic video decoding operation.

The video decoding apparatus 3000 may be included in the video decoding apparatus 200 of FIG. 2. Specifically, the splitter 3010 may be included in the receiver 210, and the predictor 3030, the candidate selector 3020, and the decoder 3040 may be included in the image data decoder 230. Therefore, the descriptions provided above with reference to FIG. 2 will be omitted.

The splitter 3010 splits an image into at least one block. The term 'block' may refer to a largest coding unit, a coding unit, a transformation unit, or a prediction unit, which is split from an image to be encoded or decoded.

The type of the block may be a square, a rectangle, or any geometric shape. The block is not limited to a data unit having a constant size.

The candidate selector 3020 selects at least one adjacent sample adjacent to the current sample in the current block. Also, the candidate selector 3020 may select a first candidate sample adjacent to a candidate adjacent sample having a closest value to the adjacent sample of the current sample, from among a plurality of candidate samples included in at least one previous block reconstructed earlier than the current block.

The predictor 3030 obtains a prediction value of the current sample by using the first candidate sample selected by the candidate selector 3020. Specifically, the predictor 3030 may obtain the prediction value of the current sample by using a reconstruction value of the first candidate sample included in the previous block reconstructed earlier than the current block.

The decoder 3040 decodes an image. Specifically, the decoder 3040 may reconstruct the image by using the residual value of the current sample obtained from the bitstream and the prediction value of the current sample obtained by the predictor 3030.

Figure 31:
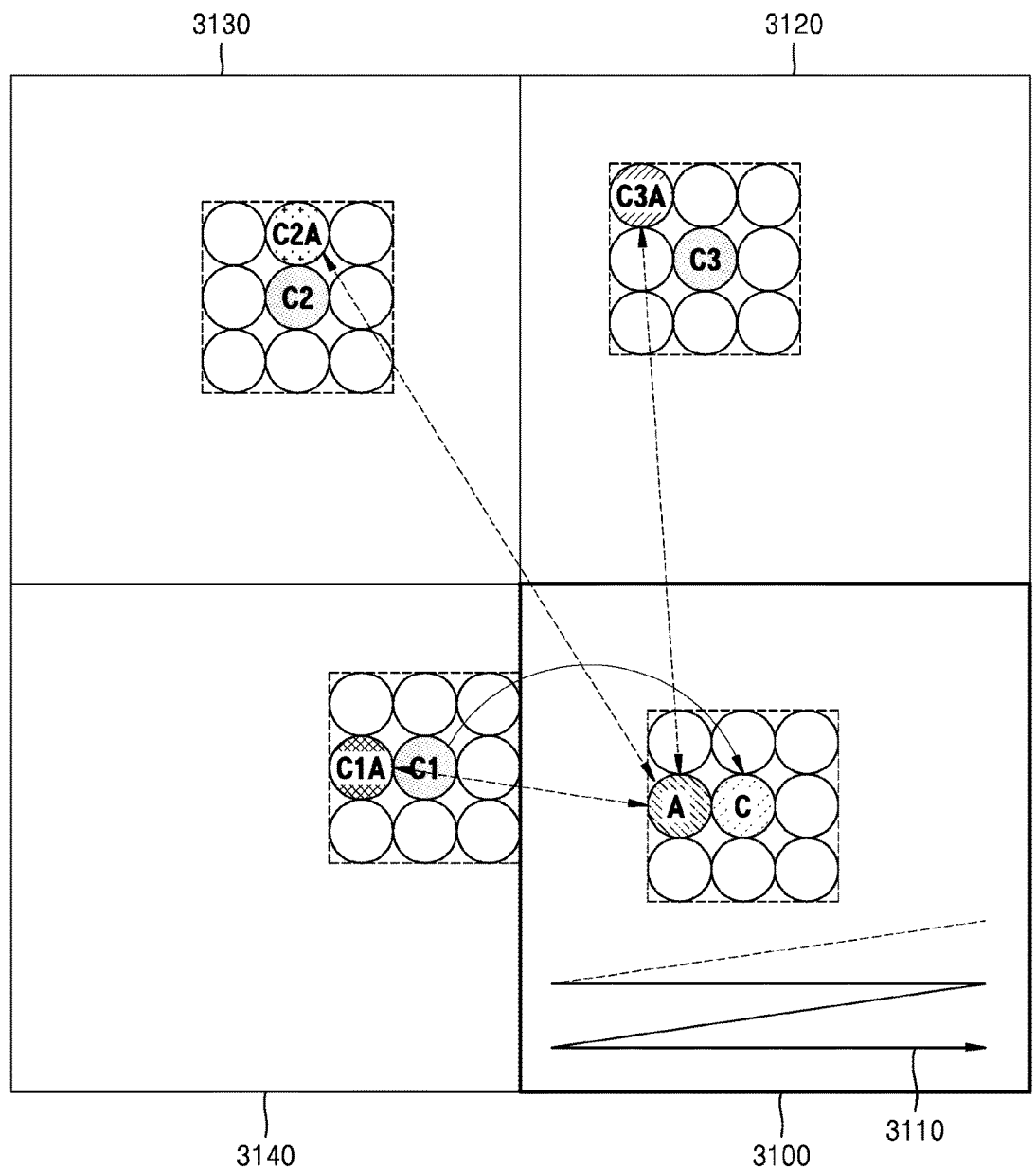
FIG. 31 illustrates an operation of sample-wise prediction to predict a current sample based on an already reconstructed sample.

FIG. 31 illustrates an operation of sample-wise prediction to predict a current sample based on an already reconstructed sample.

The candidate selectors 2920 and 3020 may select at least one adjacent sample A predicted earlier than a current sample C in a current block 3100 split from an image and being adjacent to the current sample C.

At least one adjacent sample used for predicting the current sample C from among samples adjacent to the current sample C may change according to a prediction direction of the current block 3100. For example, when horizontal prediction 3110 is sequentially performed from an uppermost row (i=0) to a lowermost row (i=7) in the current block 3100 having a size of 8×8, a left adjacent sample A of the current sample C from among the adjacent samples of the current sample C may be selected as the sample for selecting the current sample C.

The candidate selectors 2920 and 3020 may select a first candidate sample C1 adjacent to a candidate adjacent sample C1A having a closest value to the adjacent sample A, from among candidate samples C1, C2, and C3 included in at least one previous block 3120, 3130, and 3140 reconstructed earlier than the current block 3100.

In the encoding apparatus 2900, the candidate samples C1, C2, and C3 of the current sample C may include all samples included in at least one previous block 3120, 3130, and 3140 reconstructed earlier than the current block 3100. Also, in the encoding apparatus 2900, the candidate samples C1, C2, and C3 of the current sample C may include samples located within a predetermined distance from the current sample C from among samples included in at least one previous block 3120, 3130, and 3140 reconstructed earlier than the current block 3100. The distance may be set based on a size of the current block 3100 and a position of the current block 3100 in the image. For example, as the size of the current block 3100 increases, the distance may increase. As the decoding order of the current block 3100 in the image is later than other blocks, the distance may increase.

The candidate selector 2920 of the encoding apparatus 2900 may select the first candidate sample C1 from among the candidate samples C1, C2, and C3, based on costs between the candidate samples C1, C2, and C3 and the current sample C. Specifically, the candidate selector 2920 of the encoding apparatus 2900 may calculate costs between the candidate samples C1, C2, and C3 and the current sample C and select the first candidate sample C1 having the minimum cost with respect to the current sample C from among the candidate samples C1, C2, and C3. The costs between one candidate sample (one of the candidate samples C1, C2, and C3) and the current sample C may denote a numerical index of dissimilarity between the candidate sample and the current sample. Therefore, the predictor 2930 of the encoding apparatus 2900 may predict the current sample C by using the first candidate sample C1 that has the lowest cost with respect to the current sample and is most similar to the current sample C from among the candidate samples C1, C2, and C3.

For example, the cost between the first candidate sample C1 and the current sample C may be obtained based on a difference between at least one candidate adjacent sample C1A adjacent to the first candidate sample C1 and at least one adjacent sample A adjacent to the current sample C. As the difference between the candidate adjacent sample C1A of the first candidate sample C1 and the adjacent sample A of the current sample C becomes smaller, the first candidate sample C1 may be similar to the current sample C. Thus, the cost between the first candidate sample C1 and the current sample C may decrease.

Also, the cost between the first candidate sample C1 and the current sample C may be corrected based on a distance between the current sample C and the first candidate sample C1, a direction in which the candidate adjacent sample C1A is adjacent to the candidate sample C1, and a direction in which the adjacent sample A is adjacent to the current sample C. Specifically, as the difference between the first candidate sample C1 and the current sample C becomes shorter, the first candidate sample C1 may be similar to the current sample C. Thus, the cost between the first candidate sample C1 and the current sample C may decrease. On the other hand, as the difference between the first candidate sample C1 and the current sample C becomes longer, the first candidate sample C1 may be dissimilar to the current sample C. Thus, the cost between the first candidate sample C1 and the current sample C may increase. Also, if the direction in which the candidate adjacent sample C1A is adjacent to the first candidate sample C1 matches the direction in which the adjacent sample A is adjacent to the current sample C, the first candidate sample C1 may be similar to the current sample C. Thus, the cost between the first candidate sample C1 and the current sample C may decrease. On the other hand, if the direction in which the candidate adjacent sample C1A is adjacent to the first candidate sample C1 does not match the direction in which the adjacent sample A is adjacent to the current sample C, the first candidate sample C1 may be dissimilar to the current sample C. Thus, the cost between the first candidate sample C1 and the current sample C may increase.

For example, the cost between one candidate sample and the current sample may be obtained based on Equation 6 below:

$$\text{Cost} = w_1 \times \|p\text{TemplateCand}[y] - p\text{Teplate}[x]\| + w4 \cdot \text{distance}^2 + \text{orientation penalty};$$

$$\text{Minimum Cost} \rightarrow \text{Pred}[i_p, j_p] = \text{Candidate}[i_c, j_c];$$

$$\|p\text{TemplateCand}[y] - p\text{Template}[x]\| = \text{abs}(p\text{TemplateCand}[y] - p\text{Template}[x])$$

$$\text{distance}^2 = (i_p - i_c)^2 + (j_p - j_c)^2 \qquad \text{[Equation 6]}$$

In Equation 6, pTemplateCand[y] may denote a candidate adjacent sample adjacent to a candidate sample Candidate [ic, jc] located at an $ic^{th}$ row and a $jc^{th}$ column in the image. Like the candidate sample, the candidate adjacent sample may be included in at least one previous block 3120, 3130, and 3140 decoded earlier than the current block 3100. An index y of the candidate adjacent sample pTemplateCand[y] may denote a direction in which the candidate adjacent sample is adjacent to the candidate sample. For example, when y=1, the candidate adjacent sample may be adjacent to a left side of the candidate sample, when y=2, the candidate adjacent sample may be adjacent to an upper side of the candidate sample, and when y=3, the candidate adjacent sample may be adjacent to a left upper side of the candidate sample. For example, as illustrated in FIG. 31, a y index of a left candidate adjacent sample C1A of a C1 candidate sample may be 1, a y index of an upper candidate adjacent sample C2A of a C2 candidate sample may be 1, and a y index of a left upper candidate adjacent sample C3A of a C3 candidate sample may be 2.

In Equation 6, pTemplate[x] may denote a candidate sample adjacent to a current sample Pred[ip, jp] located at an $ip^{th}$ row and a $jp^{th}$ column in an image. An index x of an adjacent sample pTemplate[x] may denote a direction in which the adjacent sample is adjacent to the current sample. For example, when x=1, the adjacent sample may be adjacent to a left side of the current sample, when x=2, the adjacent sample may be adjacent to an upper side of the current sample, and when x=3, the adjacent sample may be adjacent to a left upper side of the current sample. For example, as illustrated in FIG. 31, an x index of a left adjacent sample A of the current sample C may be 1.

In order to reduce a computation amount of the decoding apparatus 3000, the encoding apparatus 2900 may transmit information about the candidate sample to the decoding apparatus 3000.

For example, the encoding apparatus 2900 may encode information indicating the first candidate sample C1 having the minimum cost with respect to the current sample C from among the samples included in at least one previous block 3120, 3130, and 3140 and transmit the encoded information to the decoding apparatus 3000. When the encoding apparatus 2900 transmits the information indicating the first candidate sample C1 to the decoding apparatus 3000, the candidate selector 3020 of the decoding apparatus 3000 may select the first candidate sample C1 from among the candidate samples C1, C2, and C3 based on the received information, without calculating the costs of the candidate samples C1, C2, and C3 with respect to the current sample C. Also, the predictor 3030 of the decoding apparatus 3000 may obtain a prediction value of the current sample C by using a reconstruction value of the first candidate sample C1.

In another example, the encoding apparatus 2900 may encode a candidate sample list indicating the candidate samples C1, C2, and C3 having costs equal to or less than a threshold value with respect to the current sample C from among the samples included in at least one previous block 3120, 3130, and 3140 and transmit the encoded candidate sample list to the decoding apparatus 3000. When the encoding apparatus 2900 transmits the candidate sample list to the decoding apparatus 3000, the candidate selector 3020 of the decoding apparatus 3000 may select the first candidate sample from among the candidate samples C1, C2, and C3 included in the candidate sample list. Specifically, the candidate selector 3020 of the decoding apparatus 3000 may select the first candidate sample C1 having the minimum cost with respect to the current sample C from among the candidate samples C1, C2, and C3 included in the candidate sample list. Also, the predictor 3030 of the decoding apparatus 3000 may predict the current sample C by using a reconstruction value of the selected first candidate sample C1.

In another example, the encoding apparatus 2900 may encode a predetermined distance for selecting the candidate samples C1, C2, and C3 located within a predetermined distance from the current sample C from among the samples included in at least one previous block 3120, 3130, and 3140 and transmit the encoded predetermined distance to the decoding apparatus 3000. When the encoding apparatus 2900 transmits the predetermined distance to the decoding apparatus 3000, the candidate selector 3020 of the decoding apparatus 3000 may select the candidate samples C1, C2, and C3 included in at least one previous block 3120, 3130, and 3140 based on the received predetermined distance. Also, the candidate selector 3020 of the decoding apparatus 3000 may select the first candidate sample C1 having the minimum cost with respect to the current sample C from among the candidate samples C1, C2, and C3 located within the predetermined distance from the current sample C. Also, the predictor 3030 of the decoding apparatus 3000 may predict the current sample C by using a reconstruction value of the selected first candidate sample C1.

When the predetermined distance for selecting the candidate samples C1, C2, and C3 located within a predetermined distance from the current sample C from among the samples included in at least one previous block 3120, 3130, and 3140 is determined based on a size of the current block 3100, the candidate selector 3020 of the decoding apparatus 3000 may select the candidate samples C1, C2, and C3 based on size information of the current block 3100 or split information of the current block 3100 obtained from the bitstream. Specifically, the candidate selector 3020 of the decoding apparatus 3000 may obtain the predetermined distance based on the size information of the current block 3100 or the split information of the current block 3100 obtained from the bitstream. Also, the candidate selector 3020 of the decoding apparatus 3000 may select the first candidate sample C1 having the minimum cost with respect to the current sample C from among the candidate samples C1, C2, and C3 located within the predetermined distance from the current sample C. Also, the predictor 3030 of the decoding apparatus 3000 may predict the current sample C by using a reconstruction value of the selected first candidate sample C1.

If the current sample is predicted based on the sample already predicted in the same block, the encoding and decoding apparatuses and the encoding and decoding methods may perform adaptive prediction according to the position of the current sample, and encoding and decoding performance may be improved.

Figure 32:
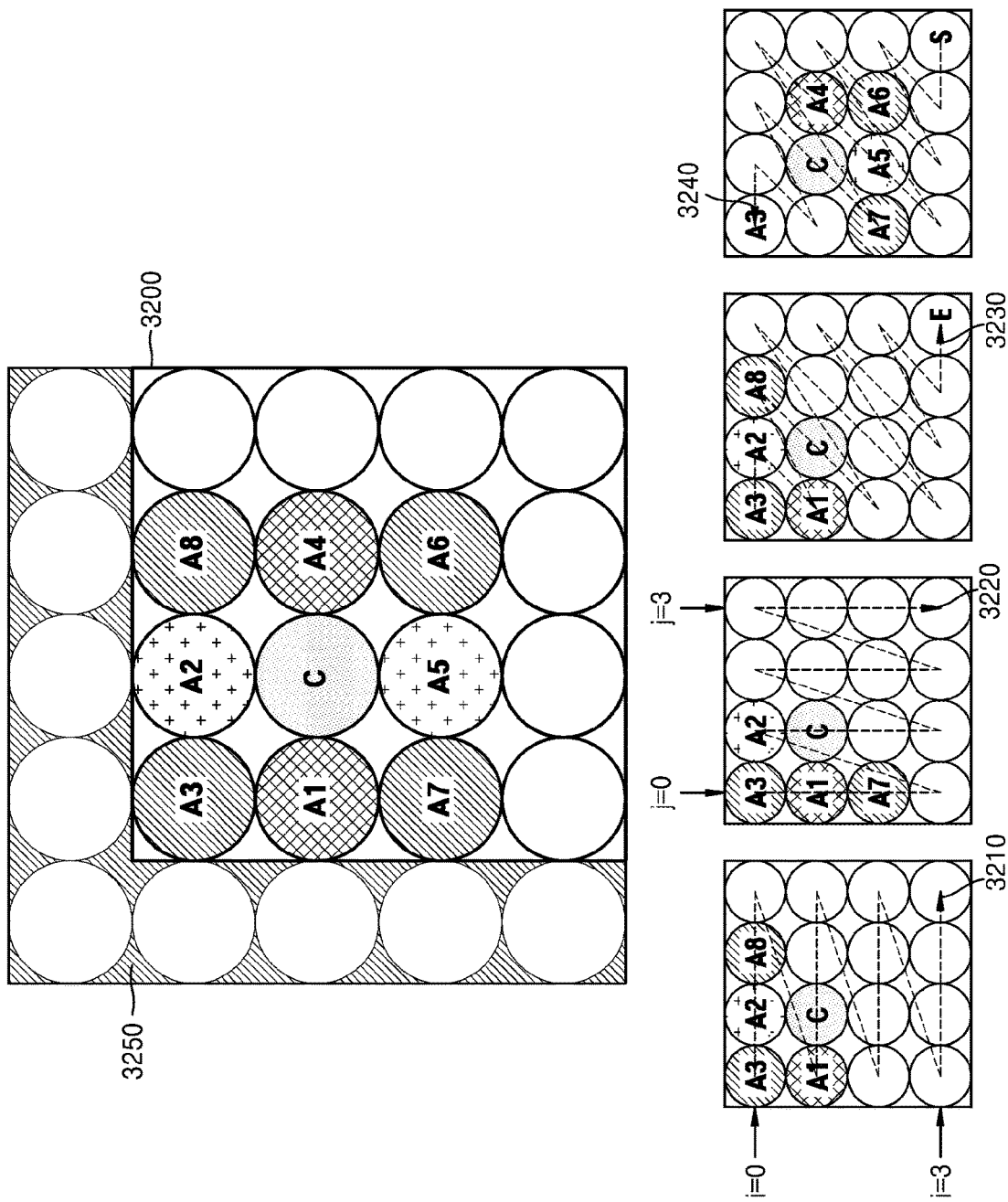
FIG. 32 illustrates adjacent samples available for predicting a current sample.

FIG. 32 illustrates adjacent samples available for predicting a current sample.

As described above, in order to select the first candidate sample from among the candidate samples, at least one adjacent sample may be selected from among the adjacent samples A1, A2, A3, A4, A5, A6, A7, and A8 of the current sample C. The adjacent samples A1, A2, A3, A4, A5, A6, A7, and A8 of the current sample C may include samples closest to the current sample C, such as the samples A1 and A4 adjacent to the current sample C in a horizontal direction and the samples A2 and A5 adjacent to the current sample C in a vertical direction. Also, the adjacent samples of the current sample C may include samples adjacent to the current sample C in a diagonal direction, such as the sample A3 adjacent to a left upper side of the current sample C, the sample A6 adjacent to a right lower side of the current sample C, the sample A7 adjacent to a left lower side of the current sample C, and the sample A8 adjacent to a right upper side of the current sample C.

The candidate selectors 2920 and 3020 may determine at least one sample for predicting the current sample C from among the adjacent samples A1, A2, A3, A4, A5, A6, A7, and A8 of the current sample C within the current block 3200 and reference samples 3250 of the current block 3200 outside the current block 3200. For example, as illustrated in FIG. 32, when the current sample C in the current block 3200 is not located at the boundary of the current block 3200 having a size of 4×4, the candidate selectors 2920 and 3020 may determine at least one adjacent sample for predicting the current sample C from among a left adjacent sample A1, an upper adjacent sample A2, a left upper adjacent sample A3, a right adjacent sample A4, a lower adjacent sample A5, a right lower adjacent sample A6, a left lower adjacent sample A7, and a right upper adjacent sample A8, which are located in the current block 3200. In another example, when the current sample C is located at the boundary of the current block 3200 like the sample A3, the candidate selectors 2920 and 3020 may determine at least one adjacent sample for predicting the current sample C from among the reference samples 3250 of the current block 3200. The candidate selectors 2920 and 3020 may determine at least one adjacent sample for predicting the current sample C from among the adjacent samples A1, A2, A3, A4, A5, A6, A7, and A8 of the current sample C based on the prediction order in the current block 3200. Since the current sample c can be predicted by using the sample whose prediction order is ahead of the prediction order of the current sample C, the adjacent sample available for predicting the current sample may change according to the prediction order in the current block.

For example, when horizontal prediction 3210 is sequentially performed from an uppermost row (i=0) to a lowermost row (i=3) in the current block 3200 having a size of 4×4, at least one of the left adjacent sample A1, the upper adjacent sample A2, the left upper adjacent sample A3, and the right upper adjacent sample A8 of the current sample C may be used to predict the current sample C.

In another example, when vertical prediction 3220 is sequentially performed from a leftmost column (j=0) to a rightmost column (j=3) in the current block 3200 having a size of 4×4, at least one of the left adjacent sample A1, the upper adjacent sample A2, the left upper adjacent sample A3, and the left lower adjacent sample A7 of the current sample C may be used to predict the current sample C.

In another example, when left lower diagonal prediction 1930 is sequentially performed from a leftmost upper sample A3 to a rightmost lower sample E in the current block 3230 having a size of 4×4, at least one of the left adjacent sample A1, the upper adjacent sample A2, the left upper adjacent sample A3, and the right upper adjacent sample A8 of the current sample C may be used to predict the current sample C.

In another example, when right upper diagonal prediction 1930 is sequentially performed from a rightmost lower sample S to a leftmost upper sample A3 in the current block 3240 having a size of 4×4, at least one of the right adjacent sample A4, the lower adjacent sample A5, the right lower adjacent sample 63, and the left lower adjacent sample A7 of the current sample C may be used to predict the current sample C.

The prediction direction of the current block 3200 is not limited to the horizontal prediction 1910, the vertical prediction 1920, the left lower diagonal prediction 1930, and the right upper diagonal prediction 1940 of FIG. 19. The samples used to predict the current sample C may change based on the position of the current sample C in the current block 3200 and the prediction direction of the current block 3200.

Figure 33:
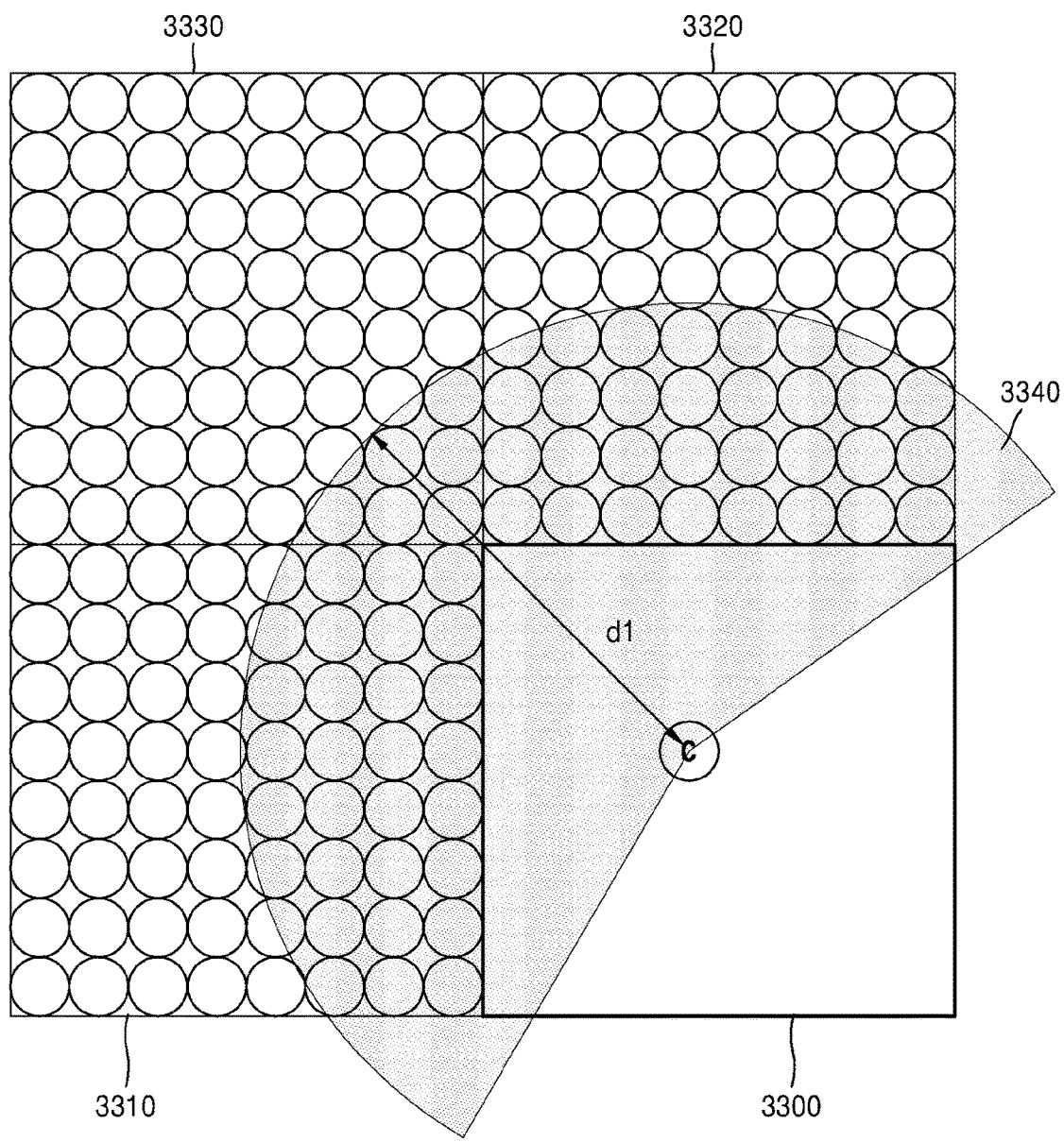
FIG. 33 illustrates candidate samples located within a predetermined distance from a current sample.

FIG. 33 illustrates candidate samples located within a predetermined distance from a current sample.

The candidate selectors 2920 and 3020 may select candidate samples located within a certain distance d1 from a current sample C from among samples included in at least one previous block 3310, 3320, and 3330 decoded earlier than the current block 3300 split from an image. For example, samples included in a circle 3340 having a radius corresponding to the certain distance d1 around the current sample C may be candidate samples.

The certain distance d1 for defining the candidate samples among from the samples in the image may be determined based on a size of the current block 3300 and decoding order of the current block 3300 in the image. For example, as the size of the current block 3300 increases, more candidate samples are required. Thus, the distance d1 may increase. In another example, as the decoding order of the current block 3300 is later, samples that can be referred to increase. Thus, the distance d1 may increase.

Figure 34:
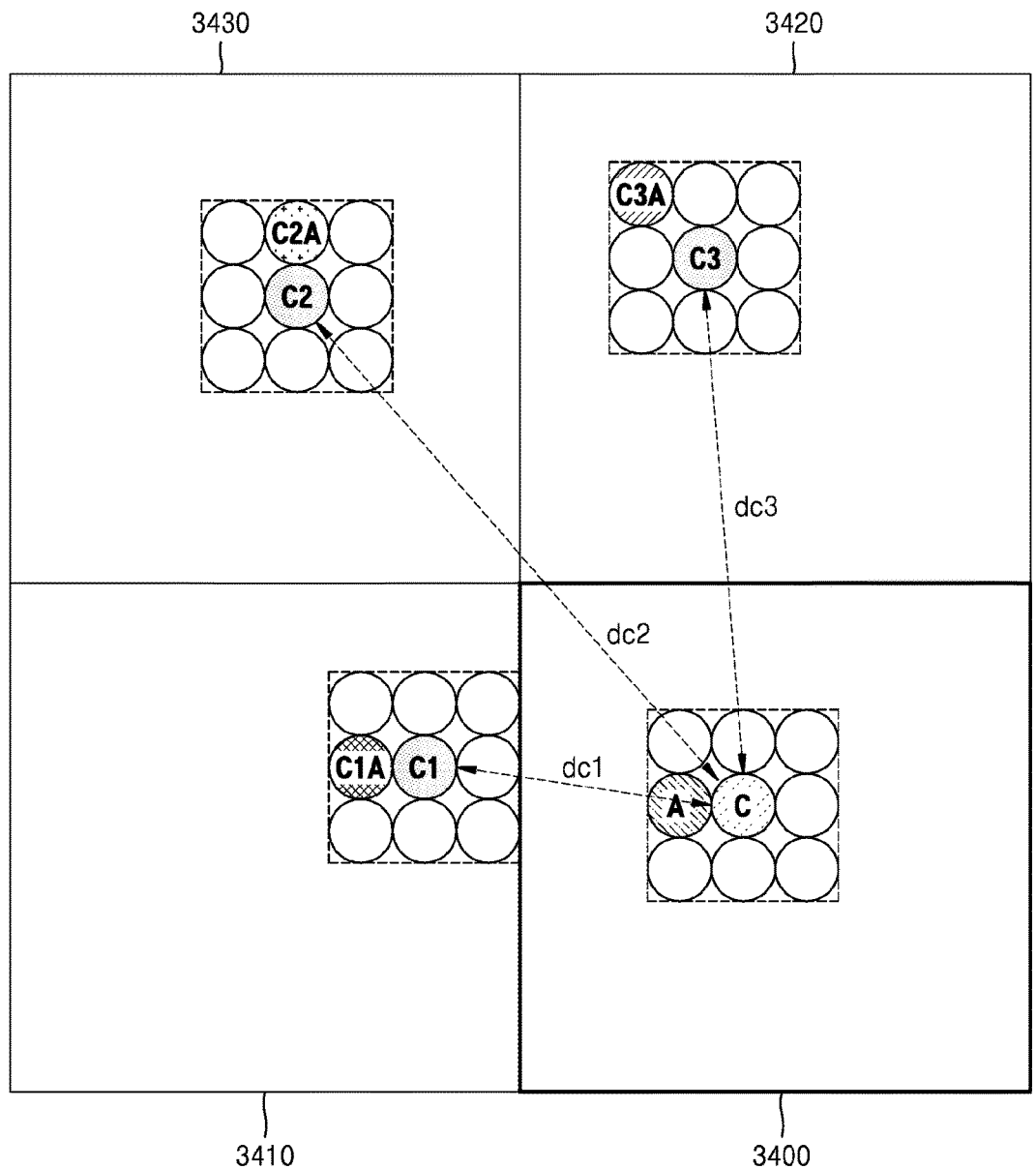
FIG. 34 illustrates an operation of correcting costs based on a distance between a current sample and a candidate sample.

FIG. 34 illustrates an operation of correcting costs based on a distance between a current sample and a candidate sample.

The candidate selectors 2920 and 3020 may select a first candidate sample C1 for predicting the current sample C from among candidate samples C1, C2, and C3 based on a difference value between an adjacent sample A adjacent to the current sample C and each of candidate adjacent samples C1A, C2A, and C3A adjacent to the candidate samples C1, C2, and C3.

Specifically, the candidate selectors 2920 and 3020 may obtain costs between the candidate adjacent samples C1A, C2A, and C3A and the adjacent sample A and correct the costs based on a distance between the candidate samples C1, C2, and C3 and the current sample C. The candidate selectors 2920 and 3020 may select the first candidate sample C1 having a corrected minimum cost from among the candidate samples C1, C2, and C3.

For example, as the distance between the candidate samples C1, C2, and C3 and the current sample C decreases, the cost between the candidate sample (one of the candidate samples C1, C2, and C3) and the current sample C may decrease. On the other hand, as the distance between the candidate sample (one of the candidate samples C1, C2, and C3) and the current sample C increases, the cost between the candidate sample (one of the candidate samples C1, C2, and C3) and the current sample C may increase.

As illustrated in FIG. 31, when a distance dc3 between the current sample C and the third candidate sample C3 is longer than a distance dc1 between the current sample C and the first candidate sample C1 and shorter than a distance dc2 between the current sample C and the second candidate sample C2, an increasing amount of the cost between the current sample C and the candidate sample C3 may be larger than an increasing amount of the cost between the current sample C1 and the candidate sample C1 and smaller than an increasing amount of the cost between the current sample C and the candidate sample C2.

Figure 35:
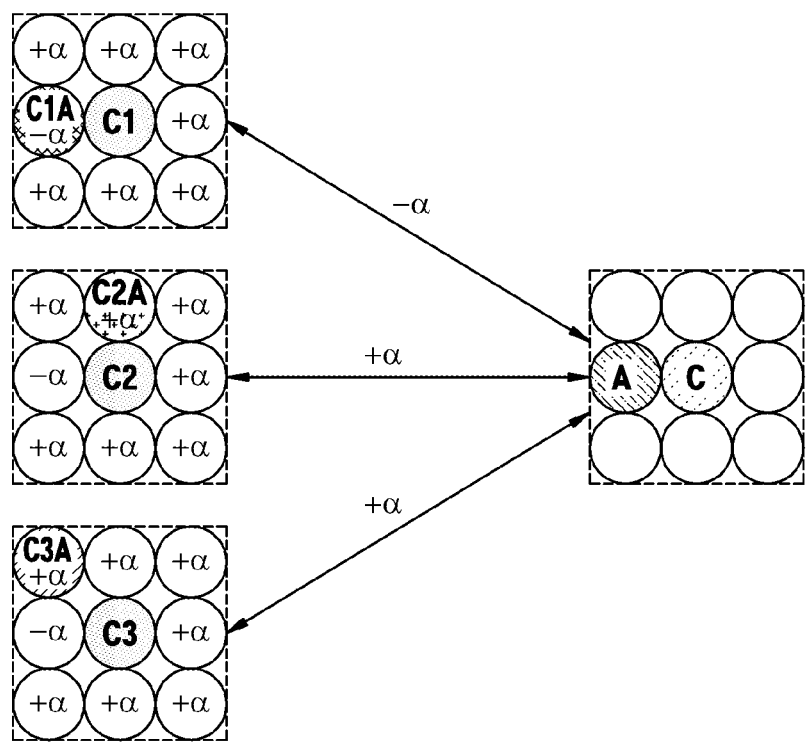
FIG. 35 illustrates an operation of correcting costs based on a direction in which a candidate adjacent sample is adjacent to a candidate sample.

FIG. 35 illustrates an operation of correcting costs based on a direction in which a candidate adjacent sample is adjacent to a candidate sample.

The candidate selectors 2920 and 3020 may select a first candidate sample C1 for predicting the current sample C from among candidate samples C1, C2, and C3 based on a difference value between an adjacent sample A adjacent to the current sample and each of candidate adjacent samples adjacent to candidate samples C1, C2, and C3, a direction in which the current sample C is adjacent to the adjacent sample A, and a direction in which the candidate samples C1, C2, and C3 are adjacent to the candidate adjacent samples C1A, C2A, and C3A.

Specifically, the candidate selectors 2920 and 3020 may obtain costs between the candidate adjacent samples C1A, C2A, and C3A and the adjacent sample A and correct the costs based on the direction in which the candidate adjacent samples C1A, C2A, and C3A are adjacent to the candidate samples C1, C2, and C3 and the direction in which the adjacent sample A is adjacent to the current sample C.

For example, if the direction in which the candidate adjacent sample C1A is adjacent to the candidate sample C1 matches the direction in which the adjacent sample A is adjacent to the current sample C, the cost between the first candidate sample C1 and the current sample C may decrease by alpha. On the other hand, if the direction in which the candidate adjacent samples C2A and C3A is adjacent to the candidate samples C2 and C3 matches the direction in which the adjacent sample A is adjacent to the current sample C, the cost between the candidate samples C2 and C3 and the current sample C may increase by alpha.

Figure 36:
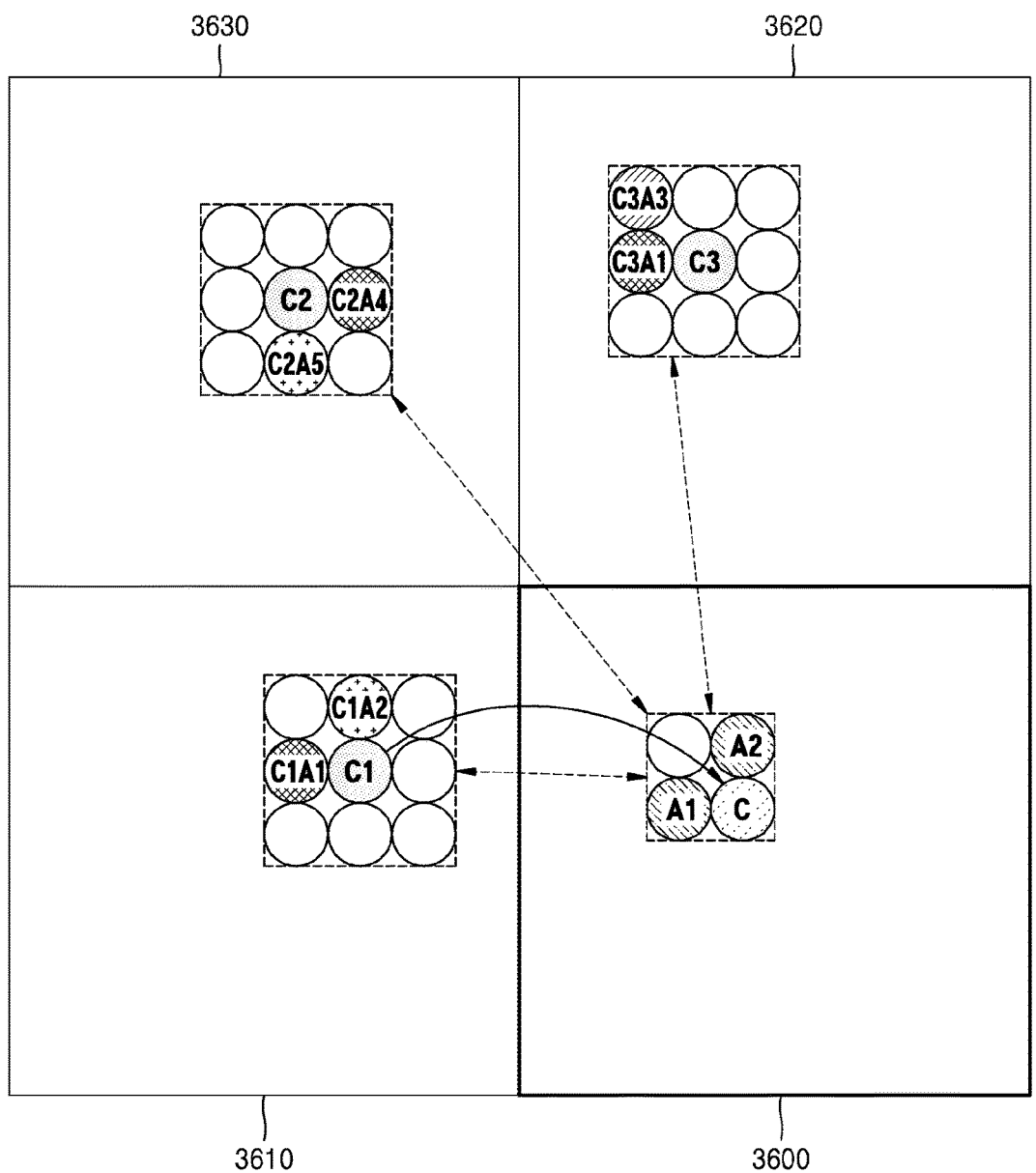
FIG. 36 illustrates an operation of sample-wise prediction to predict a current sample based on a plurality of already reconstructed samples.

FIG. 36 illustrates an operation of sample-wise prediction to predict a current sample based on a plurality of already reconstructed samples.

The candidate selectors 2920 and 3020 may select a plurality of adjacent samples A1 and A2 predicted earlier than a current sample C in a current block 3600 split from an image and being adjacent to the current sample C.

The candidate selectors 2920 and 3020 may select a first candidate sample C1 adjacent to a plurality of candidate adjacent samples C1A1 and C1A2 having a closest value to a plurality of adjacent samples A1 and A2, from among candidate samples C1, C2, and C3 included in at least one previous block 3620, 3630, and 3640 reconstructed earlier than the current block 3600.

The candidate selector 2920 of the encoding apparatus 2900 may select the first candidate sample C1 from among the candidate samples C1, C2, and C3, based on costs between the candidate samples C1, C2, and C3 and the current sample C. Specifically, the candidate selector 2920 of the encoding apparatus 2900 may calculate costs between the candidate samples C1, C2, and C3 and the current sample C and select the first candidate sample C1 having a minimum cost with respect to the current sample C from among the candidate samples C1, C2, and C3. For example, the cost between one candidate sample and the current sample may be obtained based on Equation 7 below:

$$\text{Cost} = w_1 \times \|p\text{TemplateCand}[y1] - p\text{Template}[x1]\| + w_2 \times \|p\text{TemplateCand}[y2] - p\text{Template}[x2]\| + w_4 \cdot \text{distance}^2 + \text{orientation penalty};$$

$$\text{MinimumCost} \rightarrow \text{Pred}[i_p, j_p] = \text{Candidate}[i_c, j_c];$$

$$\|p\text{TemplateCand}[y] - p\text{Template}[x]\| = \text{abs}(p\text{TemplateCand}[y] - p\text{Template}[x])$$

$$\text{distance}^2 = (i_p - i_c)^2 + (j_p - j_c)^2 \qquad \text{[Equation 7]}$$

Specifically, the candidate selectors 2920 and 3020 may obtain the cost between the current sample C and the C1 candidate sample by using a value obtained by applying a weight w1 to a difference between the C1A1 candidate adjacent sample and the A1 adjacent sample and a value obtained by applying a weight w2 to a difference between the C1A2 candidate adjacent sample and the A2 adjacent sample. The candidate selectors 2920 and 3020 may correct the cost between the C1 candidate sample and the current sample C based on a distance between the C1 candidate sample and the current sample C. The candidate selectors 2920 and 3020 may correct the cost between the C1 candidate sample and the current sample C based on a direction in which the C1A1 candidate adjacent sample is adjacent to the C1 candidate sample, a direction in which the C1A2 candidate adjacent sample is adjacent to the C1 candidate sample, a direction in which the A1 adjacent sample is adjacent to the current sample C, and a direction in which the A2 adjacent sample is adjacent to the current sample C.

The candidate selectors 2920 and 3020 may obtain the cost between the current sample C and the C2 candidate sample by using a value obtained by applying a weight w1 to a difference between the C2A4 candidate adjacent sample and the A1 adjacent sample and a value obtained by applying a weight w2 to a difference between the C2A5 candidate adjacent sample and the A2 adjacent sample. The candidate selectors 2920 and 3020 may correct the cost between the C2 candidate sample and the current sample C based on a distance between the C2 candidate sample and the current sample C. The candidate selectors 2920 and 3020 may correct the cost between the C2 candidate sample and the current sample C based on a direction in which the C2A4 candidate adjacent sample is adjacent to the C2 candidate sample, a direction in which the C2A5 candidate adjacent sample is adjacent to the C2 candidate sample, a direction in which the A1 adjacent sample is adjacent to the current sample C, and a direction in which the A2 adjacent sample is adjacent to the current sample C.

The candidate selectors 2920 and 3020 may obtain the cost between the current sample C and the C3 candidate sample by using a value obtained by applying a weight w1 to a difference between the C3A1 candidate adjacent sample and the A1 adjacent sample and a value obtained by applying a weight w2 to a difference between the C3A3 candidate adjacent sample and the A2 adjacent sample. The candidate selectors 2920 and 3020 may correct the cost between the C3 candidate sample and the current sample C based on a distance between the C3 candidate sample and the current sample C. The candidate selectors 2920 and 3020 may correct the cost between the C3 candidate sample and the current sample C based on a direction in which the C3A1 candidate adjacent sample is adjacent to the C3 candidate sample, a direction in which the C3A3 candidate adjacent sample is adjacent to the C3 candidate sample, a direction in which the A1 adjacent sample is adjacent to the current sample C, and a direction in which the A2 adjacent sample is adjacent to the current sample C.

As described above with reference to FIG. 21, the weight w1 for the A1 adjacent sample adjacent to the current sample in the horizontal direction may be proportional to the vertical gradient of the current block 3600. As described above with reference to FIG. 21, the weight w1 for the left adjacent sample A of the current sample may be proportional to the vertical gradient of the current block 3600. Also, as described above with reference to FIG. 22, the weight w2 for the A2 adjacent sample adjacent to the current sample in the vertical direction may be proportional to the horizontal gradient of the current block 3600. Also, the weight w1 and the weight w2 may be preset to have the same value.

The candidate selectors 2920 and 3020 may select the first candidate sample C1 having a minimum cost with respect to the current sample from among the candidate samples C1, C2, and C3 and obtain a prediction value of the current sample C by using a reconstruction value of the first candidate sample C1.

Figure 37:
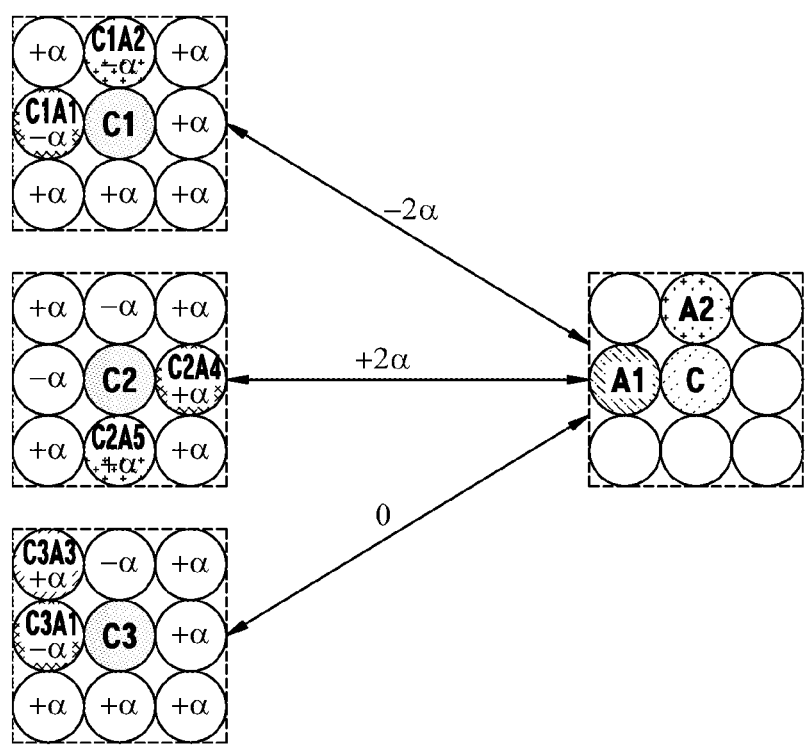
FIG. 37 illustrates an operation of correcting costs based on a direction in which a plurality of candidate adjacent samples are adjacent to a candidate sample.

FIG. 37 illustrates an operation of correcting costs based on a direction in which a plurality of candidate adjacent samples are adjacent to a candidate sample.

The candidate selectors 2920 and 3020 may correct the cost between the C1 candidate sample and the current sample C based on a direction in which the C1A1 candidate adjacent sample and the C1A2 candidate adjacent sample are adjacent to the C1 candidate sample and a direction in which the A1 adjacent sample and the A2 adjacent sample are adjacent to the current sample C.

The candidate selectors 2920 and 3020 may correct the cost between the C2 candidate sample and the current sample C based on a direction in which the C2A4 candidate adjacent sample and the C2A5 candidate adjacent sample are adjacent to the C2 candidate sample and a direction in which the A1 adjacent sample and the A2 adjacent sample are adjacent to the current sample C.

The candidate selectors 2920 and 3020 may correct the cost between the C3 candidate sample and the current sample C based on a direction in which the C3A1 candidate adjacent sample and the C3A3 candidate adjacent sample are adjacent to the C3 candidate sample and a direction in which the A1 adjacent sample and the A2 adjacent sample are adjacent to the current sample C.

For example, the cost corrected based on a direction in which n candidate adjacent samples are adjacent to the candidate sample may be in a range of −n*alpha to +n*alpha. Specifically, if the directions in which the n candidate adjacent samples are adjacent to the candidate sample match a direction in which the adjacent samples are adjacent to the current sample, a correction value of the cost may be −n*alpha. On the other hand, if the directions in which the n candidate adjacent samples are adjacent to the candidate sample do not match a direction in which the adjacent samples are adjacent to the current sample, a correction value of the cost may be +n*alpha.

For example, since the directions in which the C1A2 candidate adjacent sample and the C1A2 candidate adjacent sample are adjacent to the C1 candidate sample match the direction in which the A1 adjacent sample and the A2 adjacent sample are adjacent to the current sample C, a correction value of the cost between the C1 candidate sample and the current sample C may be −2*alpha.

Also, since the directions in which the C2A4 candidate adjacent sample and the C2A5 candidate adjacent sample are adjacent to the C2 candidate sample match the direction in which the A1 adjacent sample and the A2 adjacent sample are adjacent to the current sample C, a correction value of the cost between the C2 candidate sample and the current sample C may be +2*alpha.

Also, since the direction in which the C3A1 candidate adjacent sample is adjacent to the C3 candidate sample matches the direction in which the A1 adjacent sample is adjacent to the current sample C but the direction in which the C3A3 candidate adjacent sample is adjacent to the C3 candidate sample does not match the direction in which the A2 adjacent sample is adjacent to the current sample C, a correction value of the cost between the C3 candidate sample and the current sample C may be alpha-alpha=0.

Figure 38:
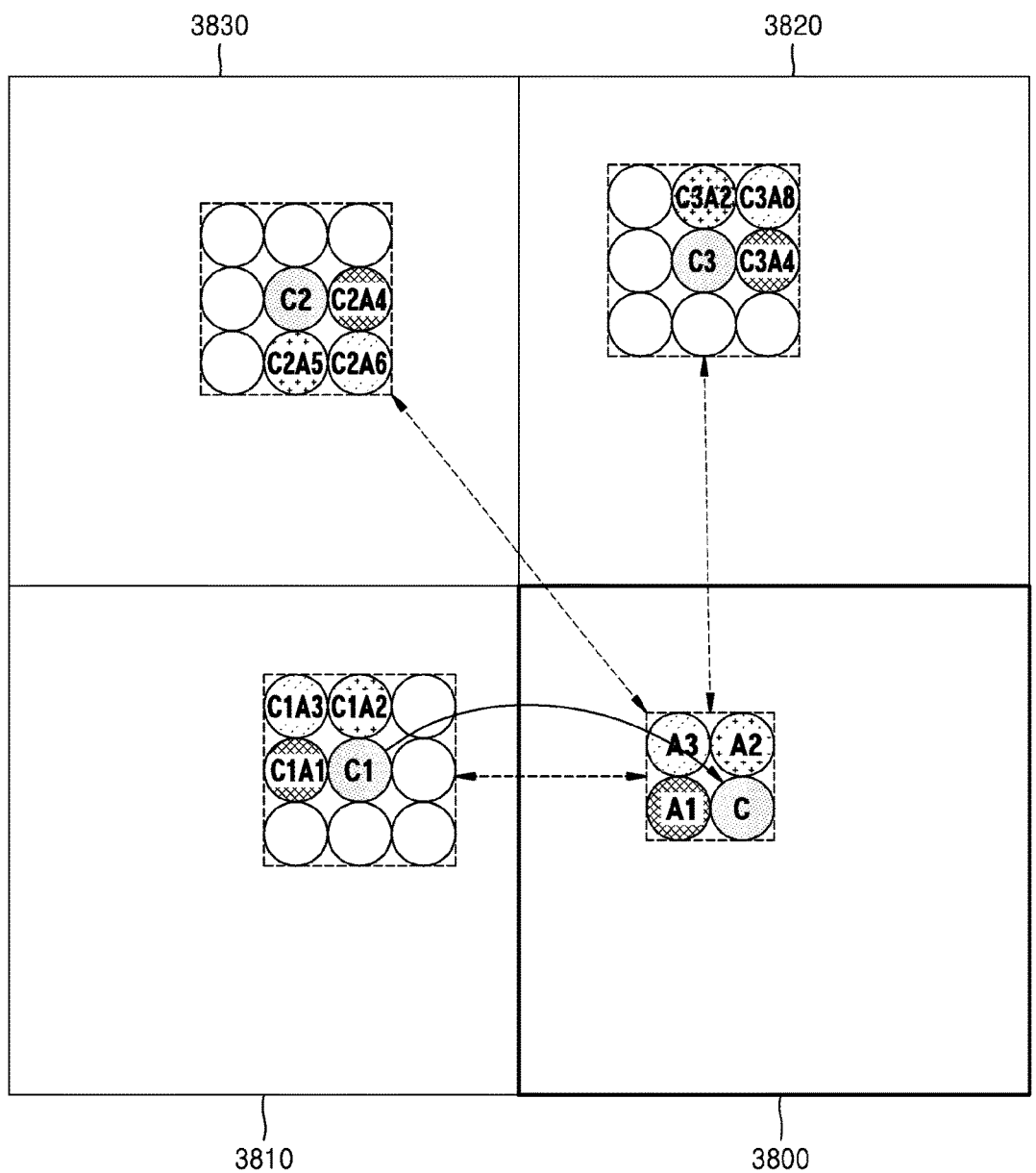
FIG. 38 illustrates another operation of sample-wise prediction to predict a current sample based on a plurality of already reconstructed samples.

FIG. 38 illustrates another operation of sample-wise prediction to predict a current sample based on a plurality of already reconstructed samples.

The candidate selectors 2920 and 3020 may select a plurality of adjacent samples A1, A2, and A3 predicted earlier than a current sample C in a current block 3800 split from an image and being adjacent to the current sample C.

The candidate selectors 2920 and 3020 may select a first candidate sample C1 adjacent to a plurality of candidate adjacent samples C1A1, C1A2, and C1A3 having a closest value to a plurality of adjacent samples A1, A2, and A3, from among candidate samples C1, C2, and C3 included in at least one previous block 3820, 3830, and 3840 reconstructed earlier than the current block 3800.

The candidate selector 2920 of the encoding apparatus 2900 may select the first candidate sample C1 from among the candidate samples C1, C2, and C3, based on costs between the candidate samples C1, C2, and C3 and the current sample C. Specifically, the candidate selector 2920 of the encoding apparatus 2900 may calculate costs between the candidate samples C1, C2, and C3 and the current sample C and select the first candidate sample C1 having a minimum cost with respect to the current sample C from among the candidate samples C1, C2, and C3. For example, the cost between one candidate sample and the current sample may be obtained based on Equation 8 below:

$$\text{Cost} = w_1 \times \|p\text{TemplateCand}[y1] - p\text{Template}[x1]\| + w_2 \times \|p\text{TemplateCand}[y2] - p\text{Template}[x2]\| + w_3 \times \|p\text{TemplateCand}[y3] - p\text{Template}[x3]\| + w_4 \cdot \text{distance}^2 + \text{orientation penalty};$$

$$\text{Minimum Cost} \rightarrow \text{Pred}[i_p, j_p] = \text{Candidate}[i_c, j_c];$$

$$\|p\text{TemplateCand}[y] - p\text{Template}[x]\| = \text{abs}(p\text{TemplateCand}[y] - p\text{Template}[x])$$

$$\text{distance} = (i_p - i_c)^2 + (j_p - j_c)^2 \qquad [\text{Equation 8}]$$

Specifically, the candidate selectors 2920 and 3020 may obtain the cost between the current sample C and the C1 candidate sample by using a value obtained by applying a weight w1 to a difference between the C1A1 candidate adjacent sample and the A1 adjacent sample, a value obtained by applying a weight w2 to a difference between the C1A2 candidate adjacent sample and the A2 adjacent sample, and a value obtained by applying a weight w3 to a difference between the C1A3 candidate adjacent sample and the A3 adjacent sample. The candidate selectors 2920 and 3020 may correct the cost between the C1 candidate sample and the current sample C based on a distance between the C1 candidate sample and the current sample C. The candidate selectors 2920 and 3020 may correct the cost between the C1 candidate sample and the current sample C based on a direction in which the C1A1 candidate adjacent sample is adjacent to the C1 candidate sample, a direction in which the C1A2 candidate adjacent sample, the C1A2 candidate adjacent sample, and the C1A3 candidate adjacent sample are adjacent to the C1 candidate sample, and a direction in which the A1 adjacent sample, the A2 adjacent sample, and the A3 adjacent sample are adjacent to the current sample C.

The candidate selectors 2920 and 3020 may obtain the cost between the current sample C and the C2 candidate sample by using a value obtained by applying a weight w1 to a difference between the C2A4 candidate adjacent sample and the A1 adjacent sample, a value obtained by applying a weight w2 to a difference between the C2A5 candidate adjacent sample and the A2 adjacent sample, and a value obtained by applying a weight w3 to a difference between the C2A6 candidate adjacent sample and the A3 adjacent sample. The candidate selectors 2920 and 3020 may correct the cost between the C2 candidate sample and the current sample C based on a distance between the C2 candidate sample and the current sample C. The candidate selectors 2920 and 3020 may correct the cost between the C2 candidate sample and the current sample C based on a direction in which the C2A4 candidate adjacent sample, the C2A5 candidate adjacent sample, and the C2A6 candidate adjacent sample are adjacent to the C2 candidate sample and a direction in which the A1 adjacent sample, the A2 adjacent sample, and the A3 adjacent sample are adjacent to the current sample C.

The candidate selectors 2920 and 3020 may obtain the cost between the current sample C and the C3 candidate sample by using a value obtained by applying a weight w1 to a difference between the C3A4 candidate adjacent sample and the A1 adjacent sample, a value obtained by applying a weight w2 to a difference between the C3A2 candidate adjacent sample and the A2 adjacent sample, and a value obtained by applying a weight w3 to a difference between the C3A8 candidate adjacent sample and the A3 adjacent sample. The candidate selectors 2920 and 3020 may correct the cost between the C3 candidate sample and the current sample C based on a distance between the C3 candidate sample and the current sample C. The candidate selectors 2920 and 3020 may correct the cost between the C3 candidate sample and the current sample C based on a direction in which the C3A2 candidate adjacent sample, the C3A4 candidate adjacent sample, and the C3A8 candidate adjacent sample are adjacent to the C3 candidate sample and a direction in which the A1 adjacent sample, the A2 adjacent sample, and the A3 adjacent sample are adjacent to the current sample C.

As described above with reference to FIG. 21, the weight w1 for the A1 adjacent sample adjacent to the current sample in the horizontal direction may be proportional to the vertical gradient of the current block 3800. As described above with reference to FIG. 21, the weight w1 for the left adjacent sample A of the current sample may be proportional to the vertical gradient of the current block 3800. Also, as described above with reference to FIG. 22, the weight w2 for the A2 adjacent sample adjacent to the current sample in the vertical direction may be proportional to the horizontal gradient of the current block 3800. Also, the weight w1 and the weight w2 may be preset to have the same value. Also, the weight w3 may be set based on the weight w1 and the weight w2.

The candidate selectors 2920 and 3020 may select the first candidate sample C1 having a minimum cost with respect to the current sample from among the candidate samples C1, C2, and C3 and obtain a prediction value of the current sample C by using a reconstruction value of the first candidate sample C1.

Figure 39:
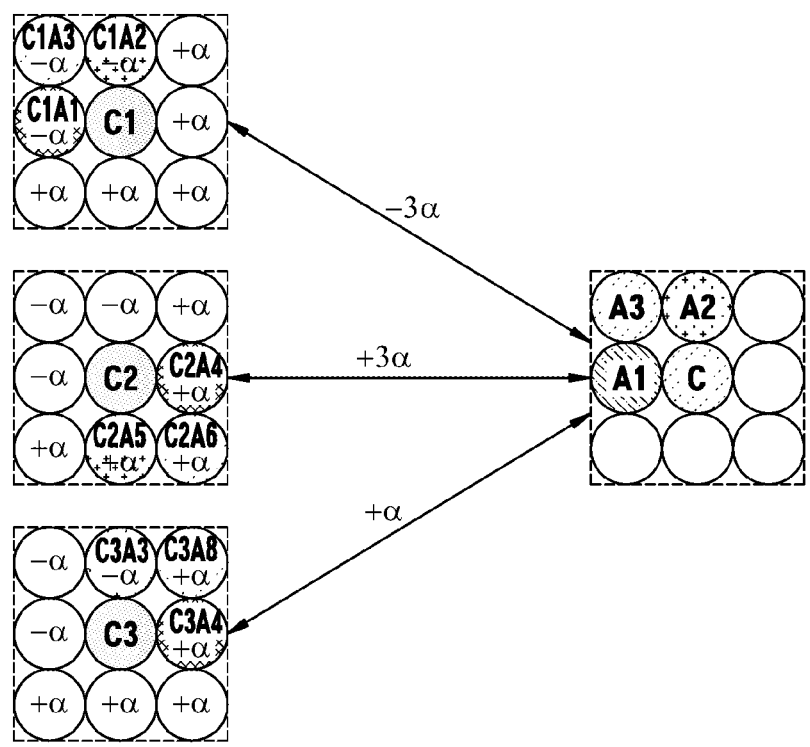
FIG. 39 illustrates an operation of correcting costs based on a direction in which a plurality of candidate adjacent samples are adjacent to a candidate sample.

FIG. 39 illustrates an operation of correcting costs based on a direction in which a plurality of candidate adjacent samples are adjacent to a candidate sample.

The candidate selectors 2920 and 3020 may correct the cost between the C1 candidate sample and the current sample C based on a direction in which the C1A1 candidate adjacent sample, the C1A2 candidate adjacent sample, and the C1A3 candidate adjacent sample are adjacent to the C1 candidate sample and a direction in which the A1 adjacent sample, the A2 adjacent sample, and the A3 adjacent sample are adjacent to the current sample C.

The candidate selectors 2920 and 3020 may correct the cost between the C2 candidate sample and the current sample C based on a direction in which the C2A4 candidate adjacent sample, the C2A5 candidate adjacent sample, and the C2A6 candidate adjacent sample are adjacent to the C2 candidate sample and a direction in which the A1 adjacent sample, the A2 adjacent sample, and the A3 adjacent sample are adjacent to the current sample C.

The candidate selectors 2920 and 3020 may correct the cost between the C3 candidate sample and the current sample C based on a direction in which the C3A2 candidate adjacent sample, the C3A4 candidate adjacent sample, and the C3A8 candidate adjacent sample are adjacent to the C3 candidate sample and a direction in which the A1 adjacent sample, the A2 adjacent sample, and the A3 adjacent sample are adjacent to the current sample C.

For example, the cost corrected based on a direction in which n candidate adjacent samples are adjacent to the candidate sample may be in a range of $-n*alpha$ to $+n*alpha$. Specifically, if a direction in which the n candidate adjacent samples are adjacent to the candidate sample matches a direction in which the current samples are adjacent to the current sample, the corrected cost may be $-n*alpha$. On the other hand, if the directions in which the n candidate adjacent samples are adjacent to the candidate sample do not match a direction in which the adjacent samples are adjacent to the current sample, a correction value of the cost may be $+n*alpha$.

For example, since the directions in which the C1A1 candidate adjacent sample, the C1A2 candidate adjacent sample, and the C1A3 candidate adjacent sample are adjacent to the C1 candidate sample match the direction in which the A1 adjacent sample, the A2 adjacent sample, and the A3 adjacent sample are adjacent to the current sample C, a correction value of the cost between the C1 candidate sample and the current sample C may be $-3*alpha$.

Also, since the directions in which the C2A4 candidate adjacent sample, the C2A5 candidate adjacent sample, and the C2A6 candidate adjacent sample are adjacent to the C2 candidate sample match the direction in which the A1 adjacent sample, the A2 adjacent sample, and the A3 adjacent sample are adjacent to the current sample C, a correction value of the cost between the C2 candidate sample and the current sample C may be +3*alpha.

Also, since the direction in which the C3A2 candidate adjacent sample is adjacent to the C3 candidate sample matches the direction in which the A2 adjacent sample is adjacent to the current sample C but the directions in which the C3A4 candidate adjacent sample and the C3A8 candidate adjacent sample are adjacent to the C3 candidate sample do not match the direction in which the A1 adjacent sample and the A3 adjacent sample are adjacent to the current sample C, a correction value of the cost between the C3 candidate sample and the current sample C may be 2alpha−alpha=alpha.

Figure 40:
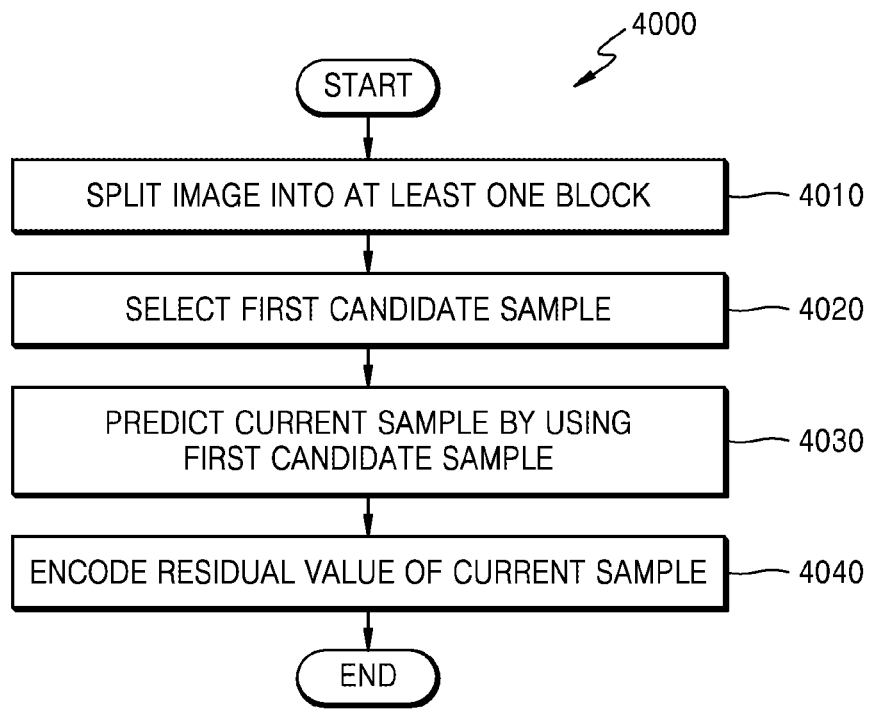
FIG. 40 is a flowchart of a video encoding method that can perform sample-wise prediction based on an already reconstructed adjacent sample.

FIG. 40 is a flowchart of a video encoding method that can perform sample-wise prediction based on an already reconstructed adjacent sample.

In operation 4010, a video encoding method 4000 splits an image into at least one block. The term 'block' may refer to a largest coding unit, a coding unit, a transformation unit, or a prediction unit, which is split from an image to be encoded or decoded. Operation 4010 may be performed by the splitter 2910 of the video encoding apparatus 2900.

In operation 4020, the video encoding method 4000 selects at least one adjacent sample adjacent to a current sample in a current block. Also, the video encoding method 4000 may select a first candidate sample adjacent to a candidate adjacent sample having a closest value to the adjacent sample of the current sample from among a plurality of candidate samples included in at least one previous block reconstructed earlier than the current block. Operation 4020 may be performed by the candidate selector 2920 of the video encoding apparatus 2900.

In operation 4030, the video encoding method 4000 obtains a prediction value of the current sample by using the first candidate sample selected in operation 4020. Specifically, the video encoding method 4000 may obtain the prediction value of the current sample by using a reconstruction value of the first candidate sample included in the previous block reconstructed earlier than the current block. Operation 4030 may be performed by the predictor 2930 of the video encoding apparatus 2900.

In operation 4040, the video encoding method 4000 encodes a residual value of the current sample. Specifically, the video encoding method 4000 may obtain a residual value between an original value of the current sample and a prediction value of the current sample obtained in operation 4020, transform the residual value of the current sample, perform entropy encoding on the transformed residual value, and output the entropy-encoded residual value in a bitstream. Operation 4040 may be performed by the encoder 2940 of the video encoding apparatus 2900.

Figure 41:
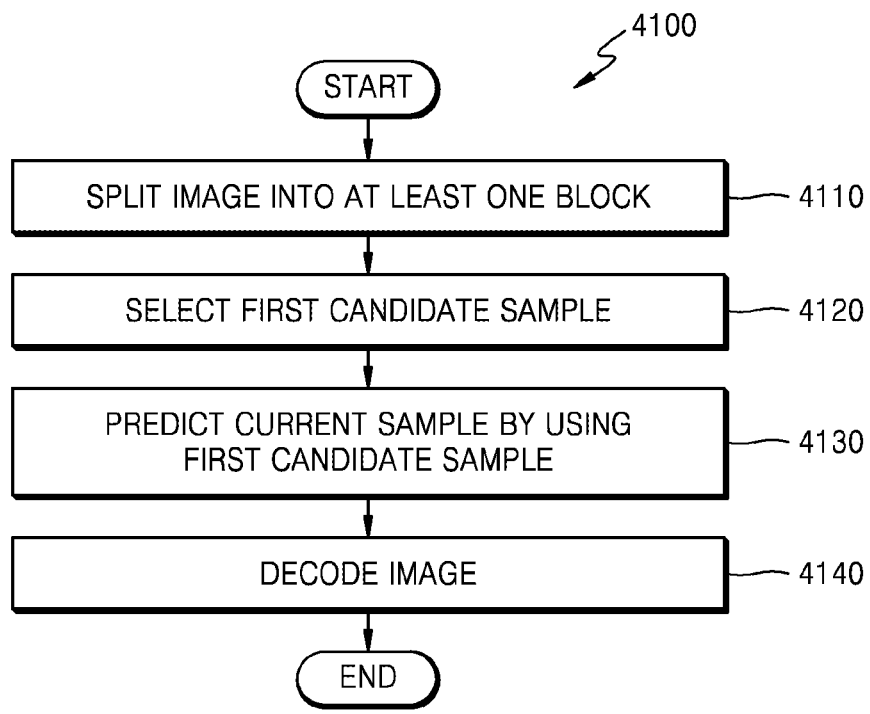
FIG. 41 is a flowchart of a video decoding method that can perform sample-wise prediction based on an already reconstructed adjacent sample.

FIG. 41 is a flowchart of a video decoding method that can perform sample-wise prediction based on an already reconstructed adjacent sample.

In operation 4110, a video decoding method 4100 splits an image into at least one block. The term 'block' may refer to a largest coding unit, a coding unit, a transformation unit, or a prediction unit, which is split from an image to be encoded or decoded. Operation 4110 may be performed by the splitter 3010 of the video decoding apparatus 3000.

In operation 4120, the video decoding method 4100 selects at least one adjacent sample adjacent to a current sample in a current block. Also, the video decoding method 4100 may select a first candidate sample adjacent to a candidate adjacent sample having a closest value to the adjacent sample of the current sample from among a plurality of candidate samples included in at least one previous block reconstructed earlier than the current block. Operation 4120 may be performed by the candidate selector 3020 of the video decoding apparatus 3000.

In operation 4130, the video decoding method 4100 obtains a prediction value of the current sample by using the first candidate sample selected in operation 4120. Specifically, the video decoding method 4100 may obtain the prediction value of the current sample by using a reconstruction value of the first candidate sample included in the previous block reconstructed earlier than the current block. Operation 4130 may be performed by the predictor 3030 of the video decoding apparatus 3000.

In operation 4140, the video decoding method 4100 encodes a residual value of the current sample. Specifically, the video decoding method 4100 may reconstruct the image by using the residual value of the current sample obtained from the bitstream and the prediction value of the current sample obtained by the predictor 3030. Operation 4140 may be performed by the encoder 3041 of the video decoding apparatus 3000.

The encoding and decoding apparatuses and the encoding and decoding methods, which can perform sample-wise prediction described above with reference to FIGS. 16 through 41, may perform adaptive prediction according to the position of the current sample, and encoding and decoding performance may be improved.

The one or more embodiments may be written as computer programs and may be implemented in general-use digital computers that execute the programs by using a non-transitory computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the image encoding methods and/or the video encoding method, which are described with reference to FIGS. 1 through 41, will be collectively referred to as 'the video encoding method'. Also, the image decoding methods and/or the video decoding method, which are described with reference to FIGS. 1 through 41, will be collectively referred to as 'the video decoding method'.

A non-transitory computer-readable recording medium such as a disc 26000 that stores the programs according to an embodiment will now be described in detail.

Figure 42:
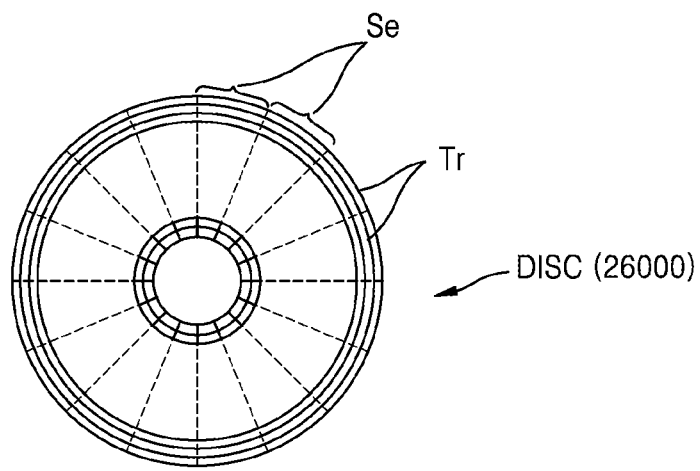
FIG. 42 is a diagram of a physical structure of a disc in which a program is stored, according to an embodiment.

FIG. 42 illustrates a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 44.

Figure 43:
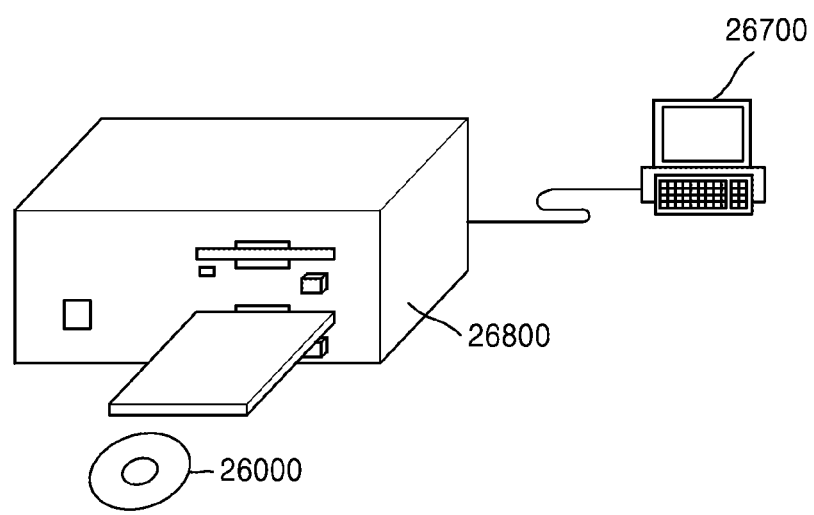
FIG. 43 is a diagram of a disc drive for recording and reading a program by using the disc.

FIG. 43 illustrates a disc drive 26800 for recording and reading a program by using the disc 26000. A computer system 26700 may store a program that executes at least one of the video encoding method and the video decoding method according to an embodiment, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of the video encoding method and the video decoding method according to an embodiment may be stored not only in the disc 26000 illustrated in FIGS. 42 and 43 but may also be stored in a memory card, a ROM cassette, or a solid state drive (SSD).

A system to which the video encoding method and the video decoding method described above are applied will be described below.

Figure 44:
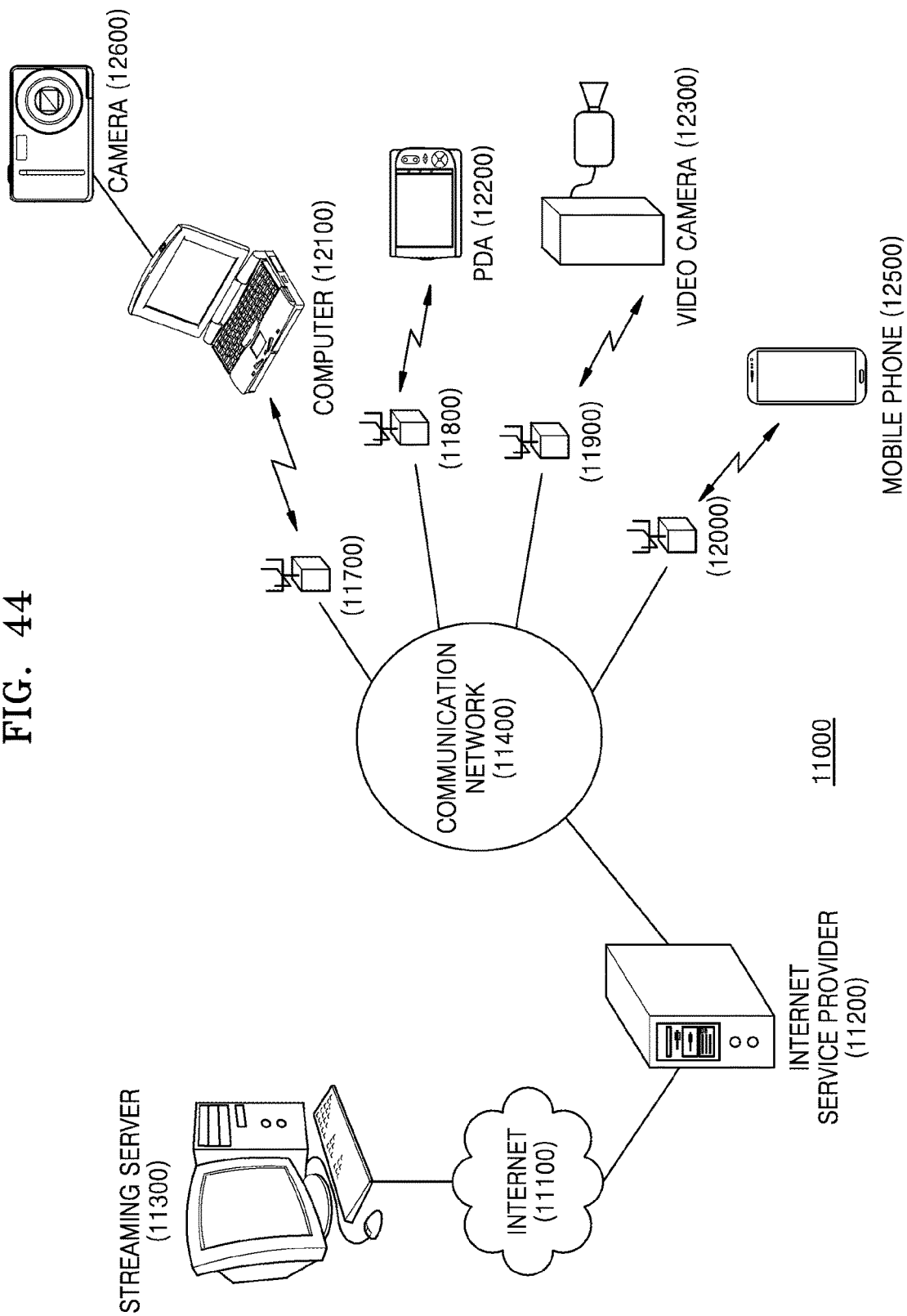
FIG. 44 is a diagram of an overall structure of a content supply system for providing a content distribution service.

FIG. 44 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 46:
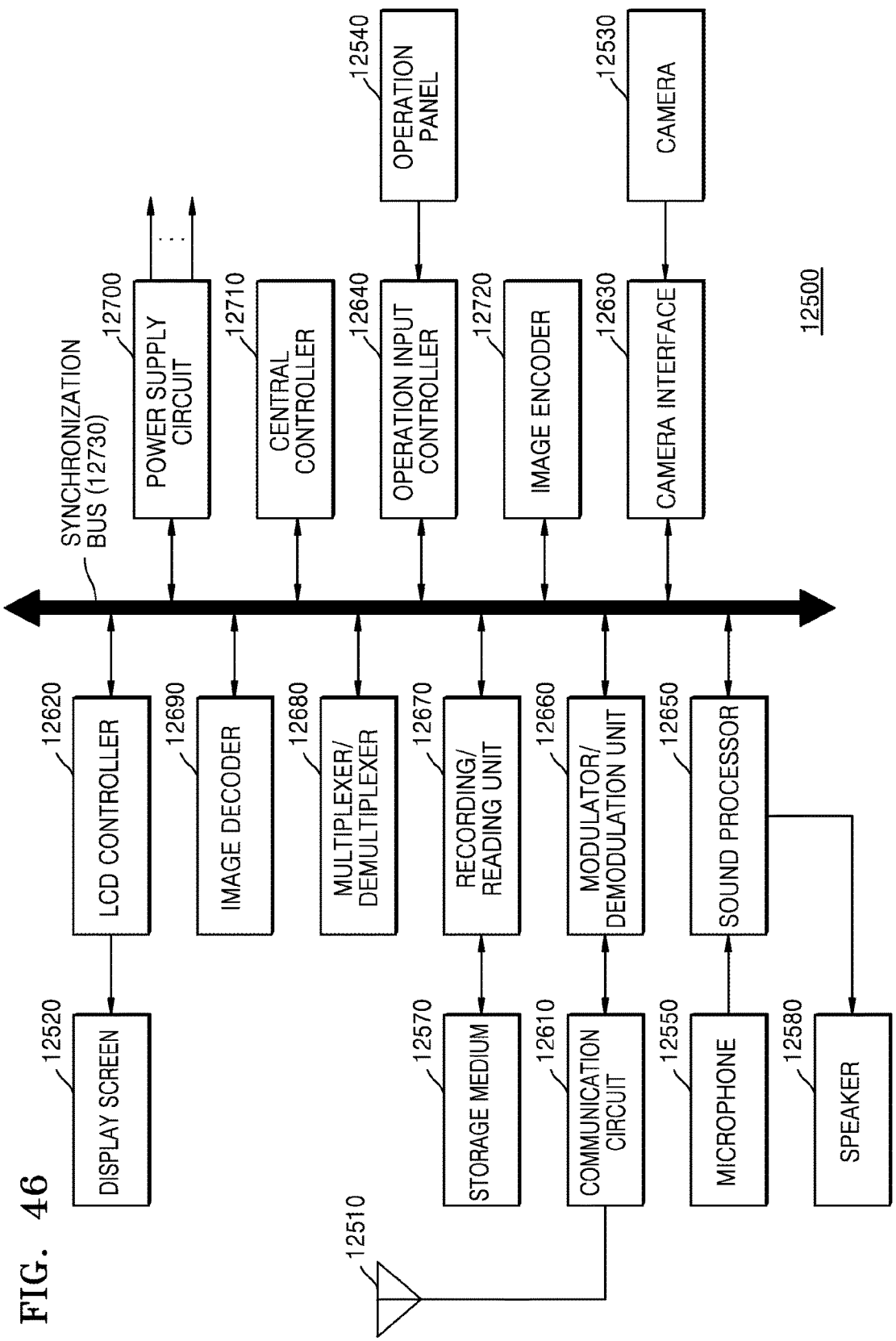

However, the content supply system 11000 is not limited to the structure as illustrated in FIG. 46, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11800 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of the video encoding apparatus and the video decoding apparatus according to an embodiment.

Figure 45:
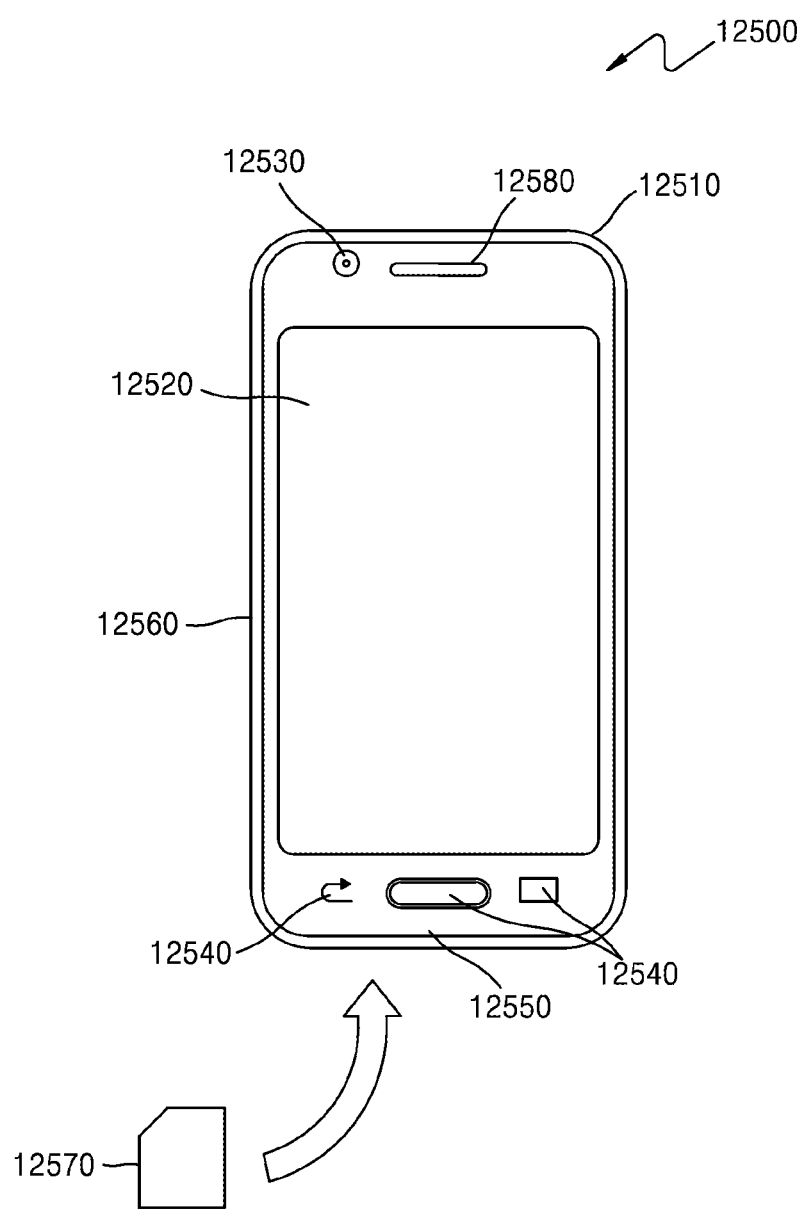
FIGS. 45 and 46 illustrate external and internal structures of a mobile phone to which a video encoding method and a video decoding method are applied, according to embodiments.

With reference to FIGS. 45 and 46, the mobile phone 12500 included in the content supply system 11000 according to an embodiment will now be described in detail.

FIG. 45 illustrates an external structure of the mobile phone 12500 to which the video encoding method and the video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12420 for displaying images captured by a camera 12310 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12420 is a touch screen, the operation panel 12540 further includes a touch sensing panel of the display screen 12420. The mobile phone 12500 includes a speaker 12580 for outputting voice and sound or another type of a sound output unit, and a microphone 12550 for inputting voice and sound or another type of a sound input unit. The mobile phone 12500 further includes the camera 12310, such as a charge-coupled device (CCD) camera, to capture video and still images. The mobile phone 12500 may further include a storage medium 12570 for storing encoded/decoded data, e.g., video or still images captured by the camera 12310, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 46 illustrates an internal structure of the mobile phone 12500. In order to systemically control parts of the mobile phone 12500 including the display screen 12420 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12710 via the operation input controller 12640. By the control of the central controller 12710, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12310 is provided to the image encoder 12720 via the camera interface 12630. The image data captured by the camera 12310 may be directly displayed on the display screen 12420 via the camera interface 12630 and the LCD controller 12620.

A structure of the image encoder 12720 may correspond to that of the video encoding apparatus 100 according to an embodiment. The image encoder 12720 may transform the image data received from the camera 12310 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 so as to convert the received signal into a digital signal. The modulation/demodulation unit 12660 modulates a frequency band of the digital signal. The frequency-band modulated digital signal is transmitted to the image decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580 by the control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12420 via the LCD controller 12620, by using the aforementioned video decoding method.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment, may be a transmitting terminal including only the video encoding apparatus according to an embodiment, or may be a receiving terminal including only the video decoding apparatus according to an embodiment.

Figure 47:
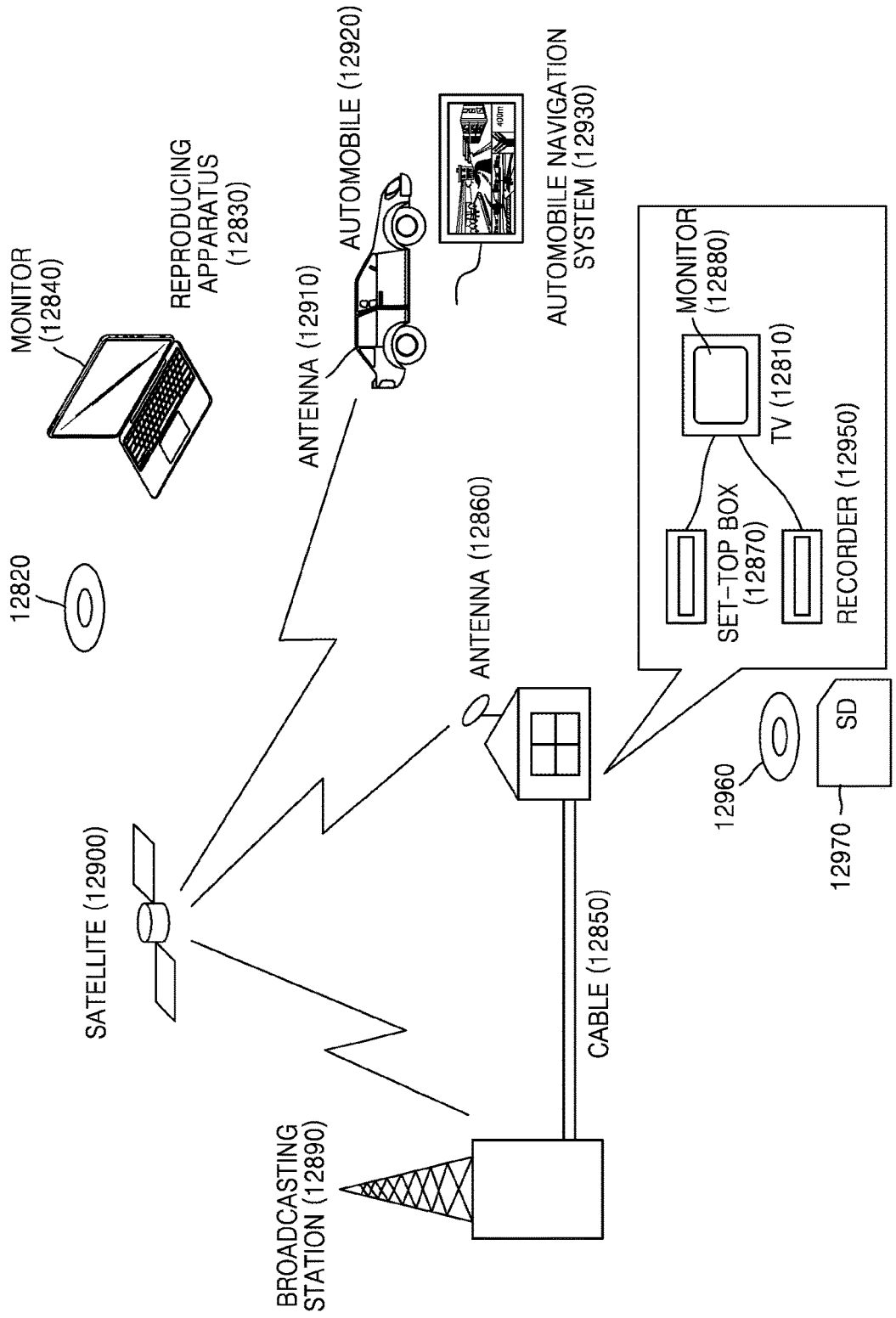
FIG. 47 illustrates a digital broadcasting system employing a communication system according to an embodiment.

A communication system according to an embodiment is not limited to the communication system described above with reference to FIG. 46. For example, FIG. 47 illustrates a digital broadcasting system employing a communication system, according to various embodiments. The digital broadcasting system of FIG. 47 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to an embodiment is implemented in a reproducing apparatus 12130, the reproducing apparatus 12130 may parse and decode an encoded video stream recorded on a storage medium 12120, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to an embodiment may be installed. Data output from the set-top box 12870 may also be reproduced on a TV monitor 12880.

As another example, the video decoding apparatus according to an embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to an embodiment and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

Figure 48:
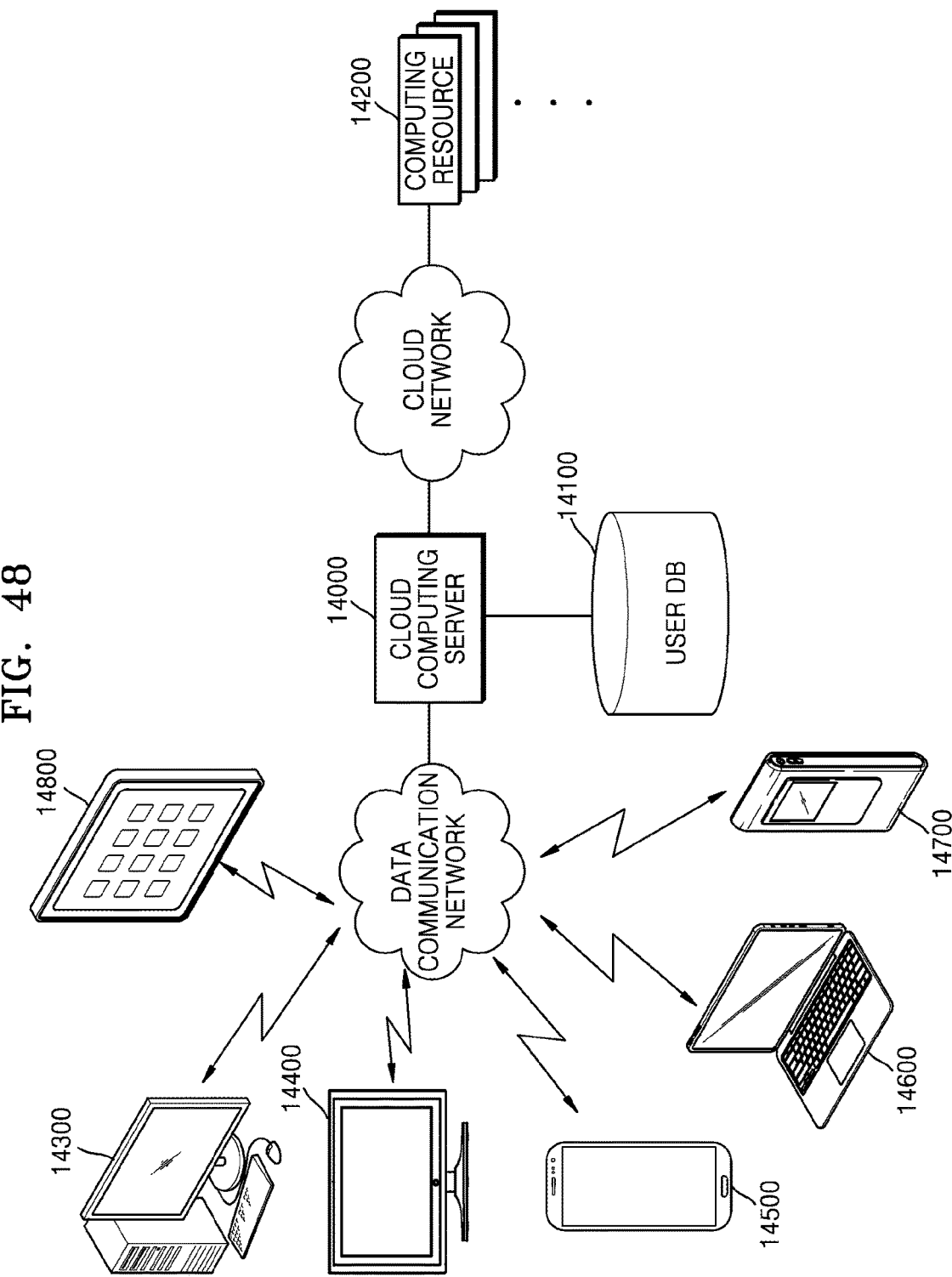
FIG. 48 illustrates a network structure of a cloud computing system using a video encoding apparatus and a video decoding apparatus, according to an embodiment.

The automobile navigation system 12930 may not include the camera 12310, the camera interface 12630, and the image encoder 12720 of FIG. 48. For example, the computer 12100 and the TV receiver 12810 may not include the camera 12310, the camera interface 12630, and the image encoder 12720 of FIG. 48.

FIG. 48 illustrates a network structure of a cloud computing system using the video encoding apparatus and the video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 46.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this regard, the user terminal may include the video decoding apparatus according to an embodiment as described above with reference to FIGS. 1 through 19. As another example, the user terminal may include the video encoding apparatus according to an embodiment as described above with reference to FIGS. 1 through 20. Alternatively, the user terminal may include both the video encoding apparatus and the video decoding apparatus according to an embodiment as described above with reference to FIGS. 1 through 19.

Various applications of the image encoding method, the image decoding method, the image encoding apparatus, and the image decoding apparatus described above with reference to FIGS. 1 through 19 are described above with reference to FIGS. 42 through 48. However, various embodiments of methods of storing the video encoding method and the video decoding method in a storage medium or various embodiments of methods of implementing the video encoding apparatus and the video decoding apparatus in a device described above with reference to FIGS. 1 through 19 are not limited to the embodiments of FIGS. 42 through 48.

While the present disclosure has been particularly shown and described with reference to embodiments thereof, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. A video decoding apparatus comprising:
a splitter configured to split an image into at least one block;
a predictor configured to predict a current sample by using at least one of a value obtained by applying a first weight to a first sample predicted earlier than the current sample in a current block and being adjacent to the current sample in a horizontal direction and a value obtained by applying a first weight to a second sample predicted earlier than the current sample in the current block and being adjacent to the current sample in a vertical direction; and
a decoder configured to decode the image by using a residual value of the current sample obtained from a bitstream and a prediction value of the current sample.

2. The video decoding apparatus of claim 1, wherein the first weight is proportional to a difference value between the first sample adjacent to the current sample in the horizontal direction and a third sample predicted earlier than the current sample in the current block and being adjacent to the current sample in a diagonal direction.

3. The video decoding apparatus of claim 1, wherein the second weight is proportional to a difference value between the second sample adjacent to the current sample in the vertical direction and a third sample predicted earlier than the current sample in the current block and being adjacent to the current sample in a diagonal direction.

4. The video decoding apparatus of claim 1, wherein the first weight and the second weight are equal to each other.

5. The video decoding apparatus of claim 1, wherein the first sample is located at a boundary of the current sample,
the first sample is predicted by using at least one of a value obtained by applying a fourth weight to a first reference sample outside the current block and adjacent to the first sample in the horizontal direction and a value obtained by applying a fifth weight to a third sample predicted earlier than the current sample in the current block and being adjacent to the current sample in a diagonal direction,
the fourth weight is proportional to a difference value between the first reference sample and a second reference sample outside the current block and adjacent to the first sample in a diagonal direction, and
the fifth weight is proportional to a difference value between the third sample and the second reference sample.

6. The video decoding apparatus of claim 1, wherein the second sample is located at a boundary of the current sample,
the second sample is predicted by using at least one of a value obtained by applying a fourth weight to a third sample predicted earlier than the current sample in the current block and being adjacent to the current sample in a diagonal direction and a value obtained by applying a fifth weight to a first reference sample outside the current block and adjacent to the second sample in a vertical direction,
the fourth weight is proportional to a difference value between the third sample and a second reference sample outside the current block and adjacent to the second sample in a diagonal direction, and
the fifth weight is proportional to a difference value between the first reference sample and the second reference sample.

7. The video decoding apparatus of claim 1, wherein a third sample predicted earlier than the current sample in the current block and being adjacent to the current sample in a diagonal direction is located at a boundary of the current block,
the third sample is obtained by using at least one of a value obtained by applying a fourth weight to a first reference sample outside the current block and adjacent to the third sample in a horizontal direction and a value obtained by applying a fifth weight to a second reference sample outside the current block and adjacent to the third sample in a vertical direction,
the fourth weight is proportional to a difference value between the first reference sample and a third reference sample adjacent to the third sample in a diagonal direction, and
the fifth weight is proportional to a difference value between the second reference sample and the third reference sample.

8. A video decoding method comprising:
splitting an image into at least one block;
predicting a current sample by using at least one of a value obtained by applying a first weight to a first sample predicted earlier than the current sample in a current block and being adjacent to the current sample in a horizontal direction and a value obtained by applying a second weight to a second sample predicted earlier than the current sample in the current block and being adjacent to the current sample in a vertical direction; and
decoding the image by using a residual value of the current sample obtained from a bitstream and a prediction value of the current sample.

* * * * *